(12) United States Patent
Elenga et al.

(10) Patent No.: US 11,152,882 B2
(45) Date of Patent: Oct. 19, 2021

(54) OSCILLATING-RESONANT-MODULE CONTROLLER

(71) Applicant: RESONANT SYSTEMS, INC., Seattle, WA (US)

(72) Inventors: Robin Elenga, Seattle, WA (US); Dan Knodle, Seattle, WA (US); Brian Pepin, Oakland, CA (US)

(73) Assignee: RESONANT SYSTEMS, INC., Seattle, WA (US)

( * ) Notice: Subject to any disclaimer, the term of this patent is extended or adjusted under 35 U.S.C. 154(b) by 0 days.

(21) Appl. No.: 16/806,925

(22) Filed: Mar. 2, 2020

(65) Prior Publication Data

US 2020/0274475 A1 Aug. 27, 2020

Related U.S. Application Data

(63) Continuation-in-part of application No. 15/043,584, filed on Feb. 14, 2016, now abandoned.

(60) Provisional application No. 62/116,144, filed on Feb. 13, 2015.

(51) Int. Cl.
*H02P 25/032* (2016.01)

(52) U.S. Cl.
CPC .................. *H02P 25/032* (2016.02)

(58) Field of Classification Search
CPC .......... H02P 25/032; A61H 2201/5005; A61H 2201/5061; A61H 220/5084; A61H 23/0218; A61H 7/004
See application file for complete search history.

(56) References Cited

U.S. PATENT DOCUMENTS

| 2007/0256428 | A1* | 11/2007 | Unger | H02K 11/33 62/6 |
| 2012/0133308 | A1* | 5/2012 | Elenga | H02P 25/032 318/128 |
| 2012/0232780 | A1* | 9/2012 | Delson | A63F 13/06 701/400 |
| 2013/0237751 | A1* | 9/2013 | Alexander | A61H 19/44 600/38 |

* cited by examiner

*Primary Examiner* — Zoheb S Imtiaz
(74) *Attorney, Agent, or Firm* — Olympic Patent PLLC

(57) ABSTRACT

The current document is directed to various types of oscillating resonant modules ("ORMs"), including linear-resonant vibration modules, that can be incorporated in a wide variety of appliances, devices, and systems to provide vibrational forces. The vibrational forces are produced by back-and-forth oscillation of a weight or member along a path, generally a segment of a space curve. A controller controls each of one or more ORMs to produce driving oscillations according to a control curve or control pattern for the ORM that specifies the frequency of the driving oscillations with respect to time. The driving oscillations, in turn, elicit a desired vibration response in the device, appliance, or system in which the one or more ORMs are included. The desired vibration response is achieved by selecting and scaling control patterns in view of known resonance frequencies of the device, appliance, or system.

20 Claims, 53 Drawing Sheets

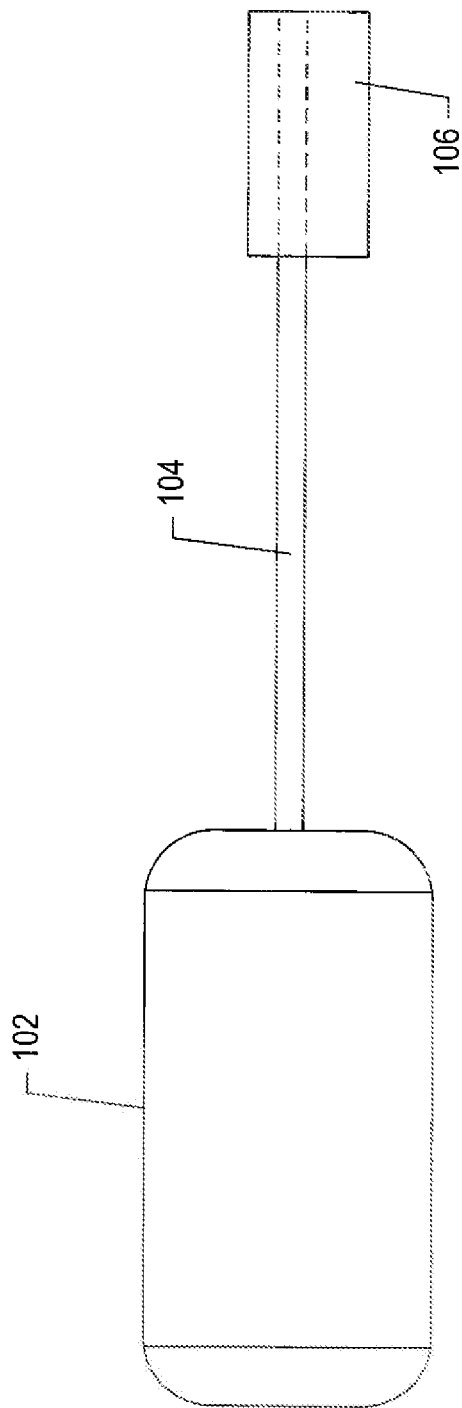
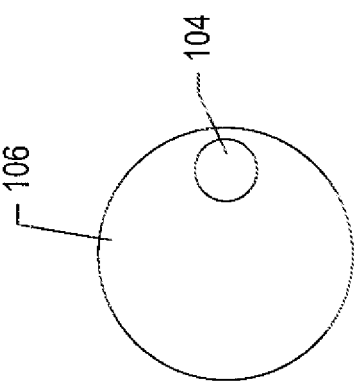
FIG. 1A
–Prior Art–
FIG. 1B
–Prior Art–

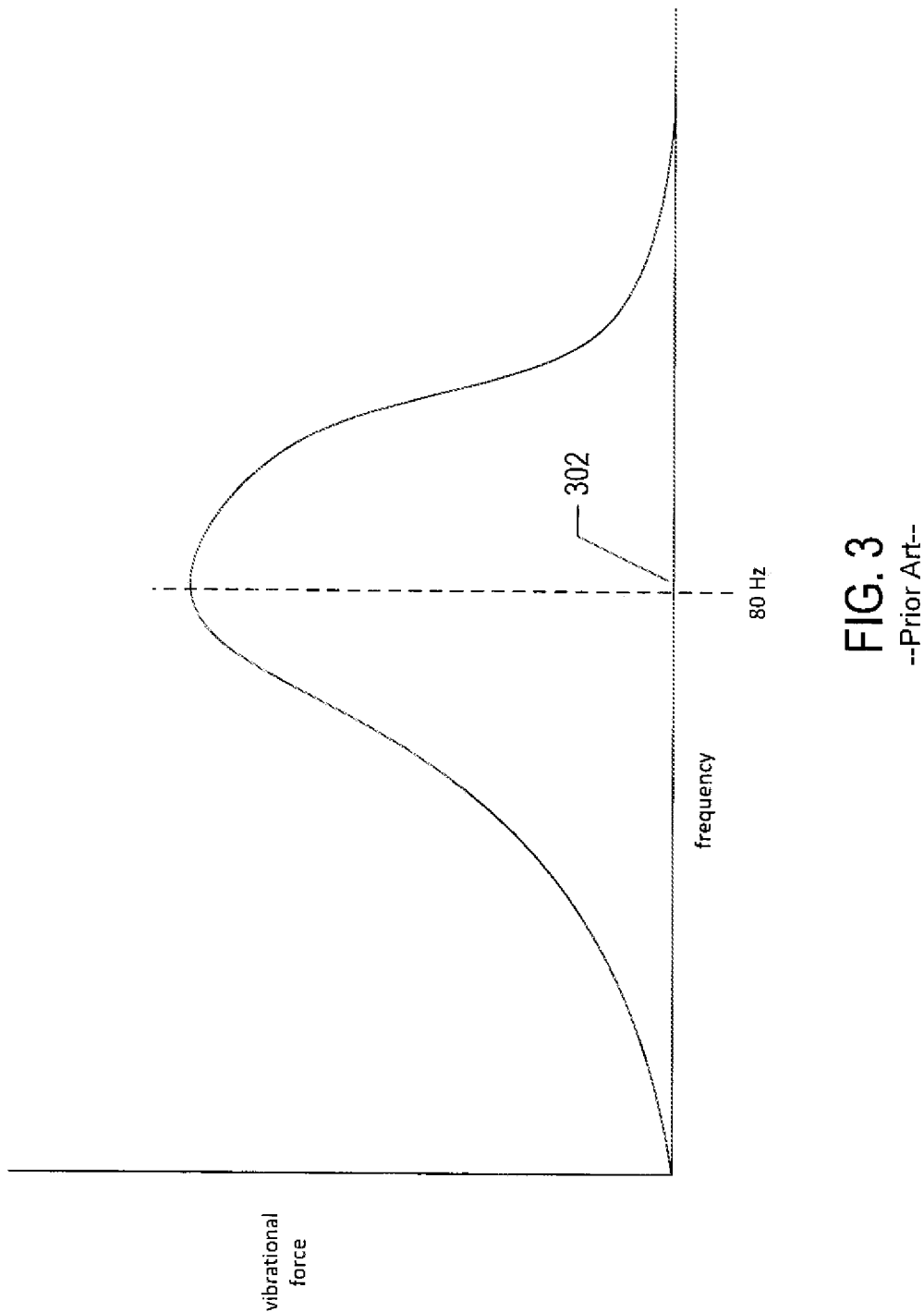

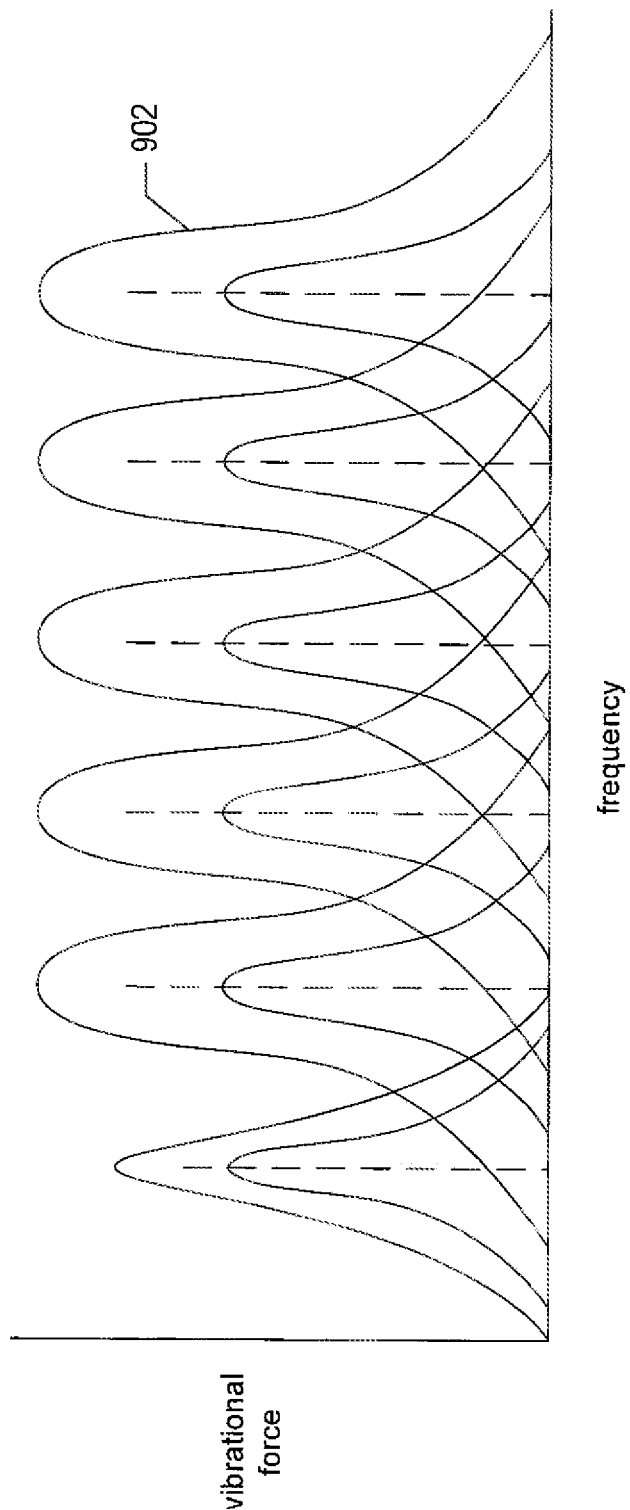

FIG. 27

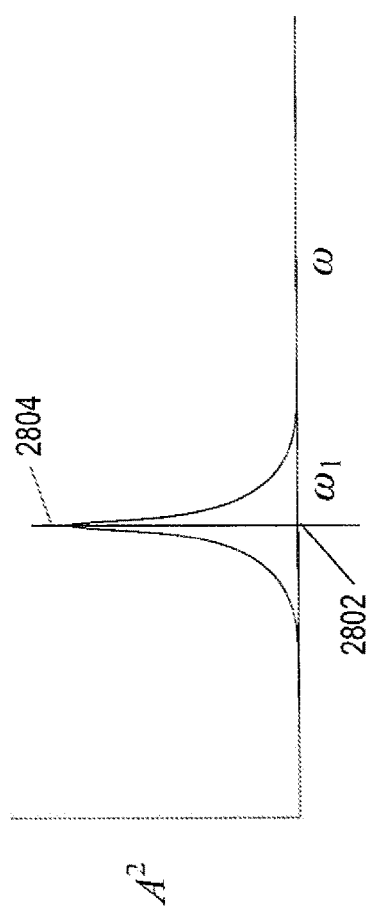
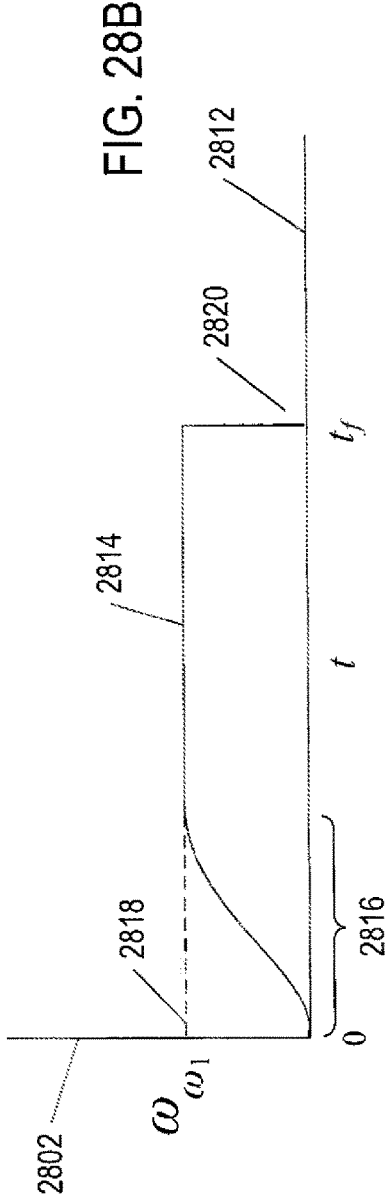
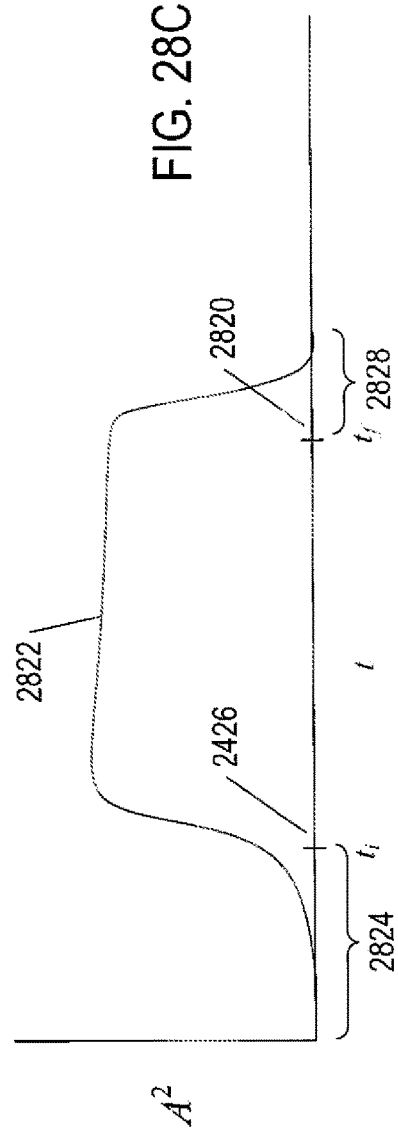

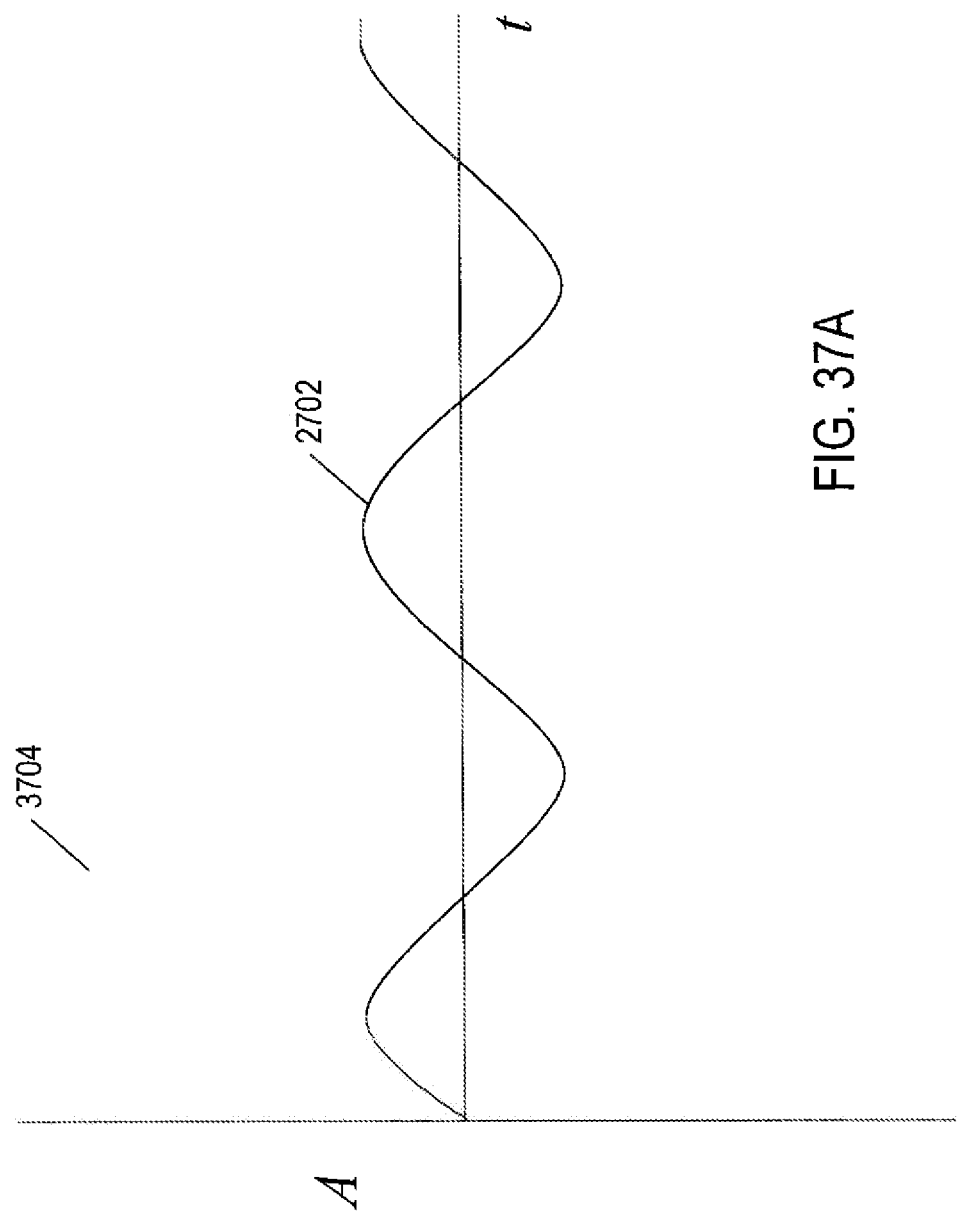

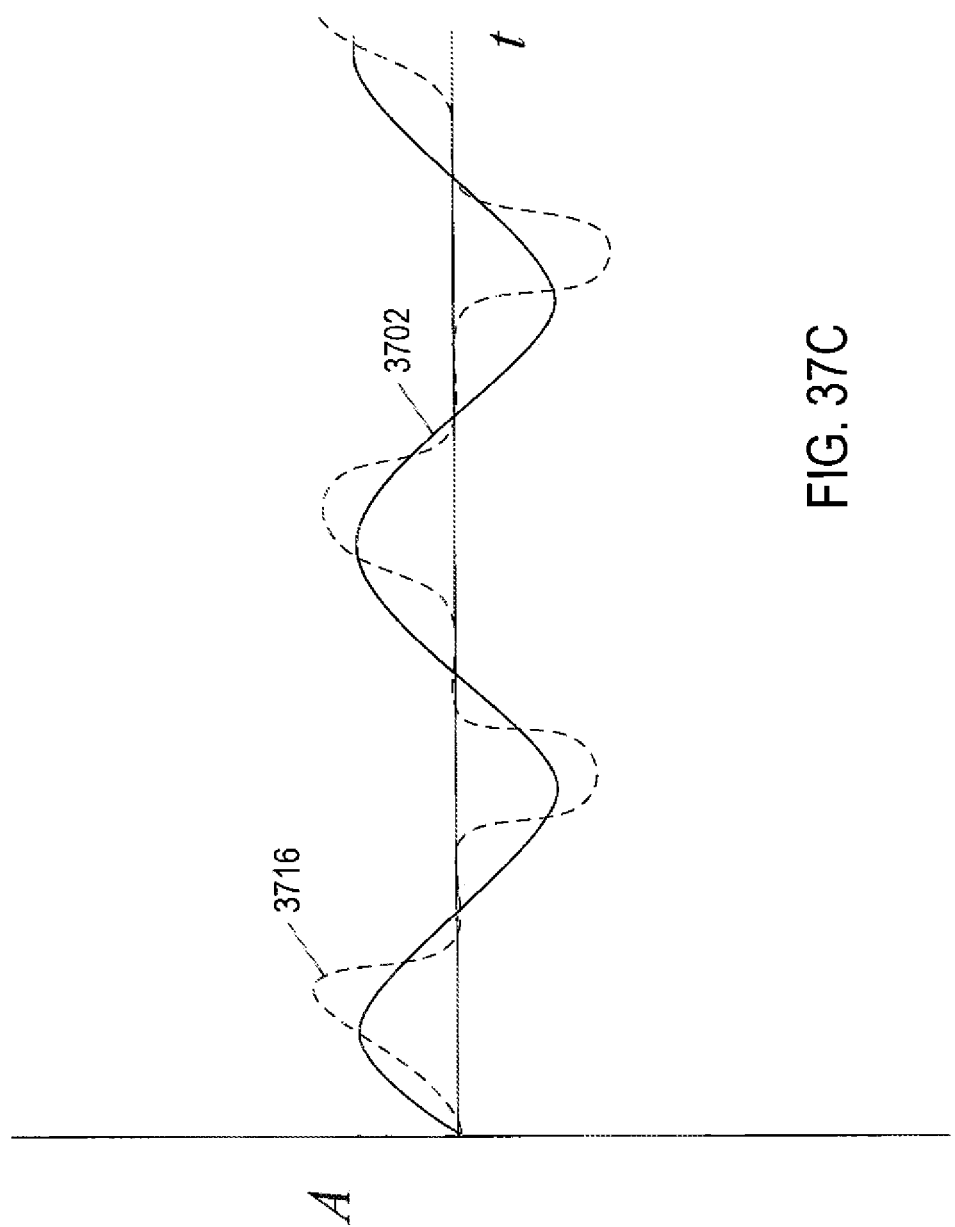

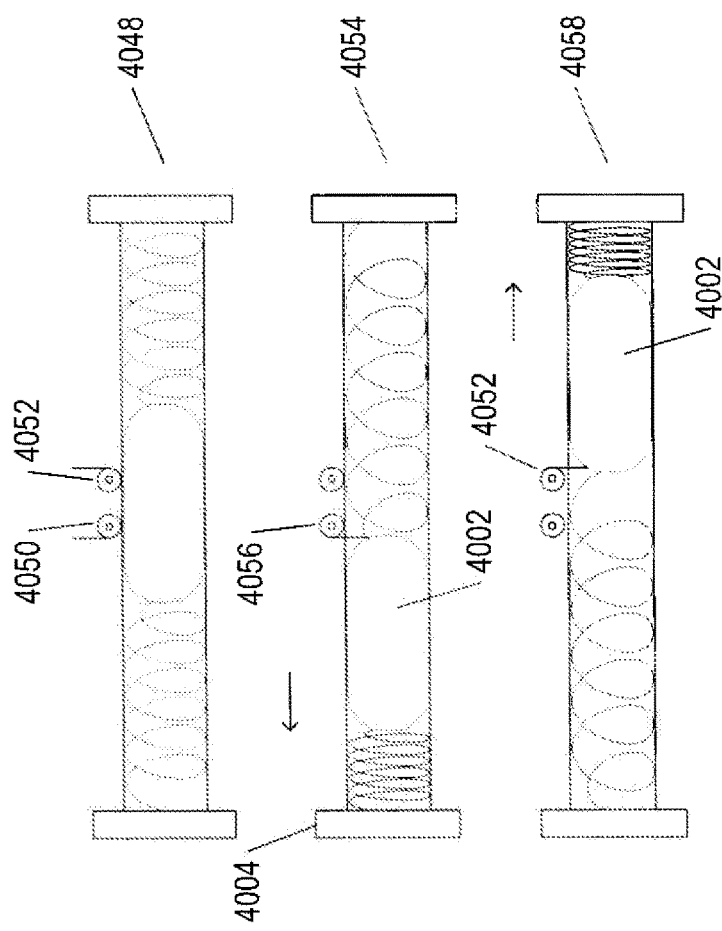
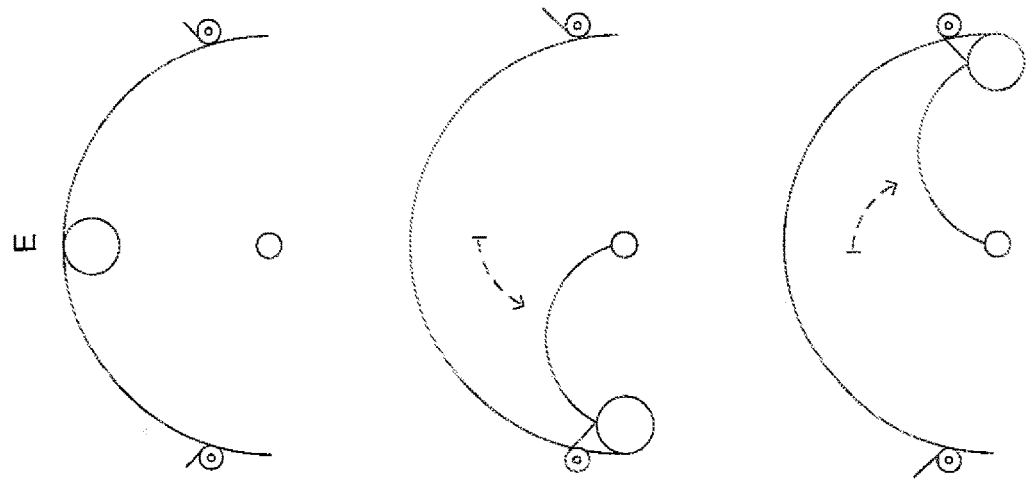
FIG. 40E
FIG. 40F

OSCILLATING-RESONANT-MODULE CONTROLLER

CROSS-REFERENCE TO RELATED APPLICATIONS

This application is a continuation-in-part of application Ser. No. 15/043,584, filed Feb. 14, 2016, which claims the benefit of Provisional Patent Application No. 62/116,144, filed Feb. 13, 2015.

TECHNICAL FIELD

The current document is related to vibration-generating devices and, in particular, to vibration modules that can be incorporated into a wide variety of different types of electromechanical devices and systems to produce predetermined vibration responses.

BACKGROUND

Vibration-inducing motors and mechanisms have been used for many years in a wide variety of different consumer appliances, toys, and other devices and systems. Examples include vibration signals generated by pagers, smart phones, vibration-driven appliances, such as hair-trimming appliances, electric toothbrushes, electric toy football games, and many other appliances, devices, and systems. The most common electromechanical system used for generating vibrations is an intentionally unbalanced electric motor.

FIGS. 1A-B illustrate an unbalanced electric motor typically used for generating vibrations in a wide variety of different devices. As shown in FIG. 1A, a small, relatively low-power electric motor 102 rotates a cylindrical shaft 104 onto which a weight 106 is asymmetrically or mounted. FIG. 1B shows the weight asymmetrically mounted to the shaft, looking down at the weight and shaft in the direction of the axis of the shaft. As shown in FIG. 1B, the weight 106 is mounted off-center on the electric-motor shaft 104. FIGS. 2A-B illustrate the vibrational motion produced by the unbalanced electric motor shown in FIGS. 1A-B. As shown in FIGS. 2A-B, the asymmetrically-mounted weight creates an elliptical oscillation of the end of the shaft, normal to the shaft axis, when the shaft is rotated at relatively high speed by the electric motor. FIG. 2A shows displacement of the weight and shaft from the stationary shaft axis as the shaft is rotated, looking down on the weight and shaft along the shaft axis, as in FIG. 1B. In FIG. 2A, a small mark 202 is provided at the periphery of the disk-shaped end the of electric-motor shaft to illustrate rotation of the shaft. When the shaft rotates at high speed, a point 204 on the edge of the weight traces an ellipsoid 206 and the center of the shaft 208 traces a narrower and smaller ellipsoid 210. Were the shaft balanced, the center of the shaft would remain at a position 212 in the center of the diagram during rotation, but the presence of the asymmetrically-mounted weight attached to the shaft, as well as other geometric and weight-distribution characteristics of the electric motor, shaft, and unbalanced weight together create forces that move the end of the shaft along the elliptical path 210 when the shaft is rotated at relatively high speed. The movement can be characterized, as shown in FIG. 2B, by a major axis 220 and minor axis 222 of vibration, with the direction of the major axis of vibration equal to the direction of the major axis of the ellipsoids, shown in FIG. 2A, and the length of the major axis corresponding to the amplitude of vibration in this direction. In many applications, in which oscillation back and forth along a defined path is desired, designers seek to force the major-axis-amplitude/minor-axis-amplitude ratio to be as large as possible, to approach a linear path, but, because the vibration is produced by a rotational force, it is generally not possible to achieve oscillation back and forth along a defined path. In many cases, the path traced by the shaft center may be close to circular. The frequency of vibration of the unbalanced electric motor is equal to the rotational frequency of the electric-motor shaft, and is therefore constrained by the rate at which the motor can rotate the shaft. At low rotational speeds, little vibration is produced.

While effective in producing vibrations, there are many problems associated with the unbalanced-electric-motor vibration-generating units, such as that shown in FIG. 1A, commonly used in the various devices, systems, and applications discussed above. Unbalancing the shaft of an electric motor not only produces useful vibrations that can be harnessed for various applications, but also produces destructive, unbalanced forces within the motor that contribute to rapid deterioration of motor parts. Enormous care and effort is undertaken to precisely balance rotating parts of motors, vehicles, and other types of machinery, and the consequences of unbalanced rotating parts are well known to anyone familiar with automobiles, machine tools, and other such devices and systems. The useful lifetimes of many devices and appliances, particularly hand-held devices and appliances, that employ unbalanced electric motors for generating vibrations may range from a few tens of hours to a few thousands of hours of use, after which the vibrational amplitude produced by the devices declines precipitously as the electric motor and other parts deteriorate. Unbalanced electric motors are relatively inefficient at producing vibrational motion. A far greater amount of power is consumed by an unbalanced electrical motor to produce a given vibrational force than the theoretical minimum power required to produce the given vibrational force. As a result, many hand-held devices that employ unbalanced electric motors for generating vibrations quickly consume batteries during use. Unbalanced electric motors, as discussed above, oscillating motion back and forth along a predefined-path, or space curve, cannot generally be produced by unbalanced electric motors. Unbalanced electric motors generate vibrations in only a very limited portion of the total vibrational-force/frequency space. FIG. 3 shows a graph of vibrational force with respect to frequency for various types of unbalanced electric motors. The graph is shown as a continuous hypothetical curve, although, of course, actual data would be discrete. As shown in FIG. 3, for relatively low-power electric motors used in hand-held appliances, only a fairly narrow range of frequencies centered about 80 Hz (302 in FIG. 3) generate a significant vibrational force. Moreover, the vibrational force is relatively modest. The bulk of energy consumed by an unbalanced electric motor is used to spin the shaft and unbalanced weight and to overcome frictional and inertial forces within the motor. Only a relatively small portion of the consumed energy is translated into desired vibrational forces.

Because of the above-discussed disadvantages with the commonly employed unbalanced-electric-motor vibration-generation units, designers, manufacturers, and, ultimately, users of a wide variety of different vibration-based devices, appliances, and systems continue to seek more efficient and capable vibration-generating units for incorporation into many consumer appliances, devices, and systems.

SUMMARY

The current document is directed to various types of oscillating resonant modules ("ORMs"), including linear-resonant vibration modules, that can be incorporated in a wide variety of appliances, devices, and systems to provide vibrational forces. The vibrational forces are produced by back-and-forth oscillation of a weight or member along a path, generally a segment of a space curve. A controller controls each of one or more ORMs to produce driving oscillations according to a control curve or control pattern for the ORM that specifies the frequency of the driving oscillations with respect to time. The driving oscillations, in turn, elicit a desired vibration response in the device, appliance, or system in which the one or more ORMs are included. The desired vibration response is achieved by selecting and scaling control patterns in view of known resonance frequencies of the device, appliance, or system.

BRIEF DESCRIPTION OF THE DRAWINGS

FIGS. 1A-B illustrate an unbalanced electric motor typically used for generating vibrations in a wide variety of different devices.

FIG. 3 shows a graph of vibrational force with respect to frequency for various types of unbalanced electric motors.

FIG. 9 represents the range of frequencies and vibrational forces that can be achieved by different implementations of ORM and ORM control programs.

FIG. 27 provides an example resonant-frequency table for the generic ORM-containing device discussed above with reference to FIG. 25.

FIGS. 28A-C illustrate how an ORM control scheme combines with a resonant frequency to produce a vibration response.

FIGS. 37A-D illustrate pulse-width modulation control of an ORM.

FIGS. 40A-40F illustrate movable mechanical stops and mechanical latches, two types of mechanical control features that may be included in various types of ORMs.

DETAILED DESCRIPTION

The current document is directed to various oscillating resonant modules ("ORMs"), including various types of linear oscillating resonant modules ("linear ORMs"), that can be used within a wide variety of different types of appliances, devices, and systems, to generate vibrational forces. ORMs produce vibrational forces by oscillation of a weight or component within the ORM along a segment of a space curve, rather than as a by-product of an unbalanced rotation, as in the case of unbalanced electric motors. The oscillatory nature of the ORM vibration-inducing motion effectively addresses many problems associated with unbalanced electric motors. Combining an ORM with feedback control, so that the driving frequency produced by the ORM falls close to the resonant frequency of a device in which the ORM is included, results in optimal power consumption with respect to the amplitude and frequency of vibration produced by the ORM as well as maximal vibration energy of the device. Oscillation within a ORM may translate into highly directional driving forces produced by the ORM to drive a vibration response in an appliance or device that incorporates the ORM. The current document includes a first subsection, in which various types of ORMs are described, a second subsection on which an ORM controller is discussed, and a third subsection in which accurate methods for ORM control, to which the current document is directed, are described in detail.

ORMs

Figure 2A:
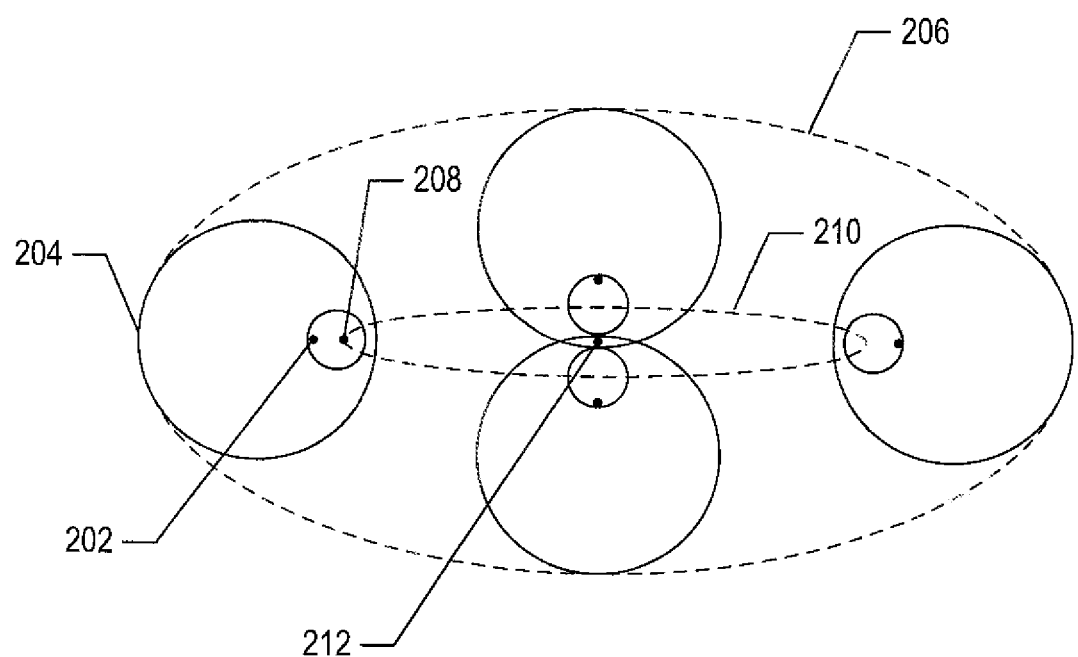
FIGS. 2A-B illustrate the vibrational motion produced by the unbalanced electric motor shown in FIGS. 1A-B.
Figure 2B:
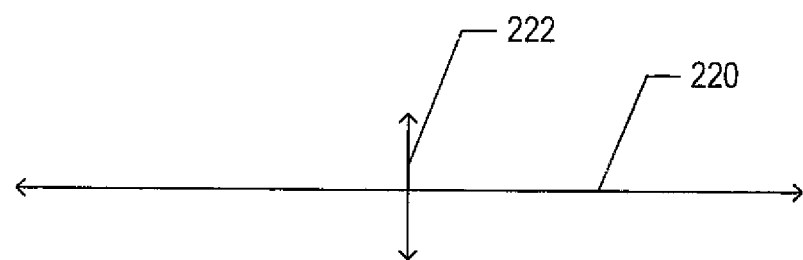
Figure 4B:
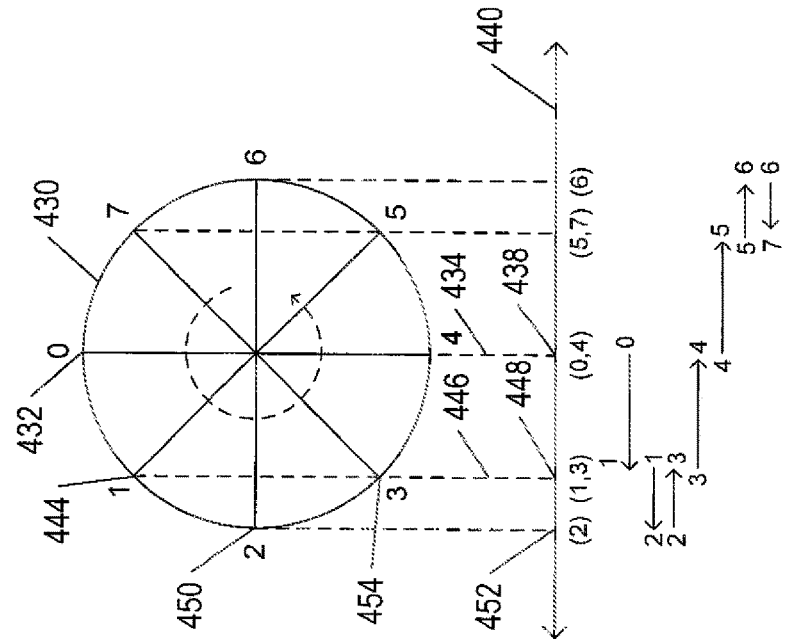
FIGS. 4A-D illustrate, in part, what is meant by the phrase "oscillating resonant module" in the current document.
Figure 4A:
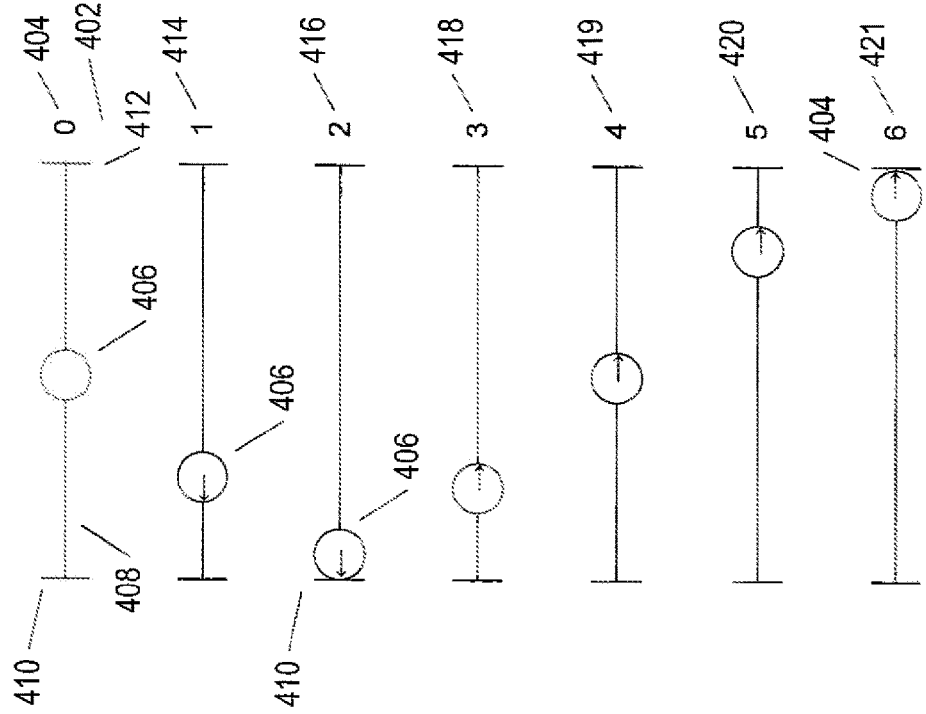

FIGS. 4A-D illustrate, in part, what is meant by the phrase "oscillating resonant module" in the current document. In contrast to the above-discussed unbalanced electric motors often used to generate vibrations in vibration-driven appliances, an oscillating resonant module contains a weight, or mass, that oscillates back and forth along a path. The path may be a linear path, or line segment, but, in the general case, can be potentially any particular segment of a space curve. FIG. 4A illustrates operation of a linear oscillating resonant module. In a first diagram 402, labeled with the time "0," the linear ORM is depicted at time 0 (404 in FIG. 4A), with the mass or weight 406 centered within a linear path 408 bounded by two stops 410 and 412. When the linear ORM is activated, the weight begins moving to the left, as shown in diagram 414. The small arrow 415 within the disk-like mass 406 indicates the direction of movement. The mass continues to move, as shown in diagram 416, until the mass strikes the left-hand stop 410, at which point the direction of travel of the mass reverses and the mass begins moving back in the opposite direction, as shown in diagram 418. In diagrams 419 and 420, the mass continues in its rightward direction of travel during time intervals 4 and 5. At time 6, as shown in diagram 421, the mass strikes the right-hand stop 404 and reverses direction, traveling back in the leftward direction, as shown in diagram 422. Ellipses 424 indicate that this process continues indefinitely during operation of the linear ORM. The mass oscillates back and forward along the linear path. The period of oscillation and the maximum amplitude of oscillation can generally be controlled by control signals input to an ORM.

FIG. 4B illustrates a mapping of a continuous logical movement of the weight along a circle to the actual linear motion of the weight within a linear ORM, as discussed above with reference to FIG. 4A. In FIG. 4B, the position of the weight is plotted along a circle 430. At time 0, represented by point 432, the weight position is vertically mapped, as indicated by dotted line 434 as well as by the solid line 436 within the circle 430, to a central point 438 on the linear path 440 shown below the circle. The position of the weight travels along the circle, in a counter-clockwise direction, as long as the linear ORM operates, as indicated by the dashed circular arrow 442. At time 1, indicated by point 444 on circle 430, the position of the mass is mapped, by vertical dashed line 446, to point 448 on linear path 440. At time 2, represented by point 450, the position of the mass on the linear path 440 is point 452. At time 3, represented by point 454 along the circle, the position of the mass is again point 448. Thus, as the position of the mass plotted along the circle has moved from point 444 to point 454, the direction of movement of the mass has reversed and the mass is now continuing in the opposite direction from the direction in which it originally moved. Small horizontal arrows, such as arrow 456, shown below the linear path 440, illustrate the linear motion of the mass of the linear ORM between each pair of adjacent time points. Thus, the back-and-forth oscillation of the mass in a linear ORM can be described by a logical revolution of a mass about a circle. If the circle has a radius of 1, then the position x at time t of the mass along the actual path of travel can be expressed as:

$$x(t) = \cos\left(\omega t - \frac{\pi}{2}\right),$$

where $\omega$ is the angular velocity at which the point representing the mass moves around the circle.

Figure 4D:
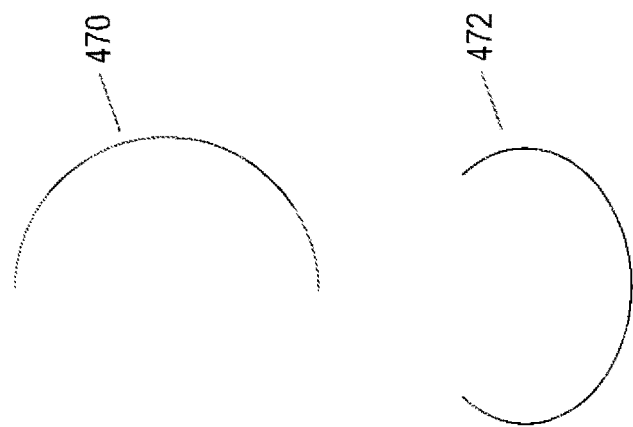
Figure 4C:
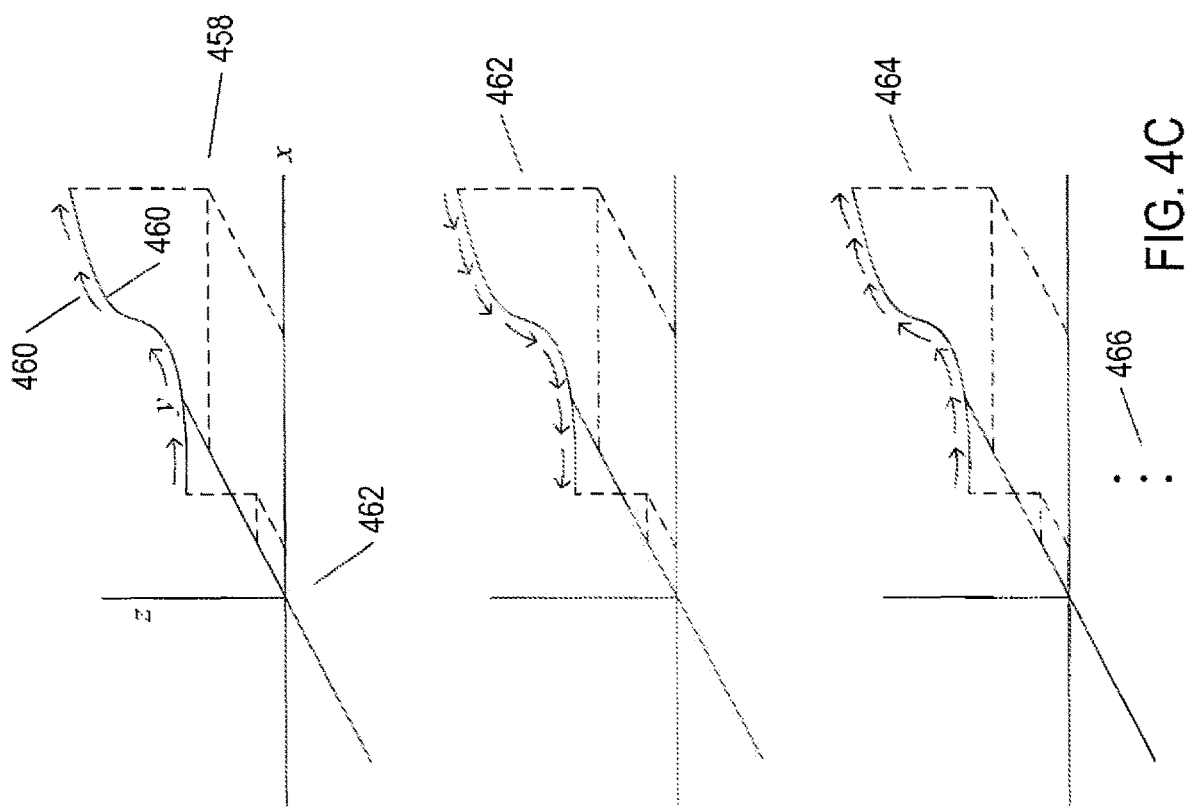

FIG. 4C illustrates a general space-curve segment path. In FIG. 4C, a short space-curve segment 460 is shown plotted in a three-dimensional Cartesian coordinate system 462. The weight or mass of an oscillating resonant module ("ORM") may oscillate back and forth along such a space-curve-segment path. In the first plot in FIG. 4C 458, the weight or mass moves from left to right along the path, as indicated by the small curved arrows, such as curved arrow 460. As shown in the second plot 462 in FIG. 4C, once the weight or mass reaches the left-hand end of the space-curve segment, it reverses directions and move to the left. As shown in the third plot 464 in FIG. 4C, once the weight or mass reaches the left-hand end of the space-curve segment, it again reverses direction and moves to the right. Ellipses 466 indicate that this back-and-forth oscillation continues while the ORM operates. The space-curve-segment path of the weight in an ORM is defined by the physical implementation and operation of the ORM.

FIG. 4D illustrates two additional example paths along which the weight or mass of an ORM may oscillate. The first path is a circular arc 470 and the second path is a partially elliptical arc-like path 472. As mentioned above, many additional different types of space-curve-segment paths for ORMs are possible.

FIGS. 5A-G illustrate one particular type of ORM. FIGS. 5A-G all use the same illustration conventions, next discussed with reference to FIG. 5A. The ORM includes a cylindrical housing 502 within which a solid, cylindrical mass 504, or weight, can move linearly along the inner, hollow, cylindrically shaped chamber 506 within the cylindrical housing or tube 502. The weight is a magnet, in the described implementation, with polarity indicated by the "+" sign 510 on the right-hand end and the "−" sign 512 on the left-hand end of the weight 504. The cylindrical chamber 506 is capped by two magnetic disks 514 and 516 with polarities indicated by the "+" sign 518 and the "−" sign 519. The disk-like magnets 514 and 518 are magnetically oriented opposite from the magnetic orientation of the weight 504, so that when the weight moves to either the extreme left or extreme right sides of the cylindrical chamber, the weight is repelled by one of the disk-like magnets at the left or right ends of the cylindrical chamber. In other words, the disk-like magnets act much like springs, to facilitate deceleration and reversal of direction of motion of the weight and to minimize or prevent mechanical-impact forces of the weight and the end caps that close off the cylindrical chamber. Finally, a coil of conductive wire 520 girdles the cylindrical housing, or tube 502 at approximately the mid-point of the cylindrical housing.

Figure 5A:
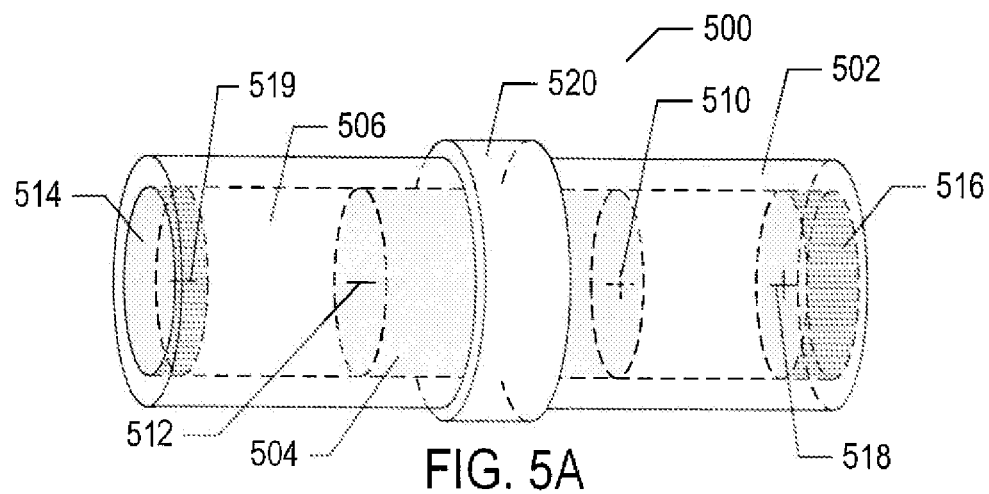
FIGS. 5A-G illustrate one particular type of ORM.
Figure 5B:
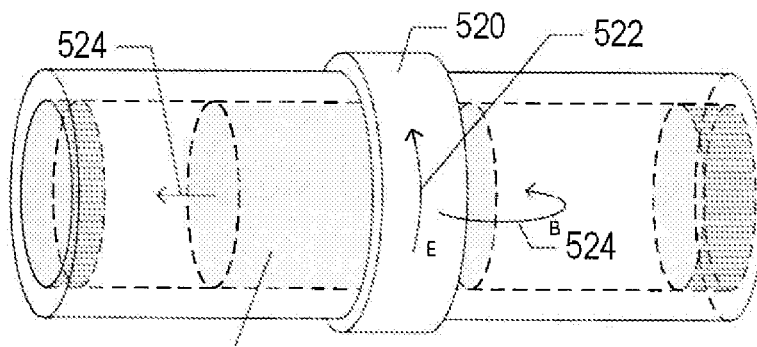
Figure 5C:
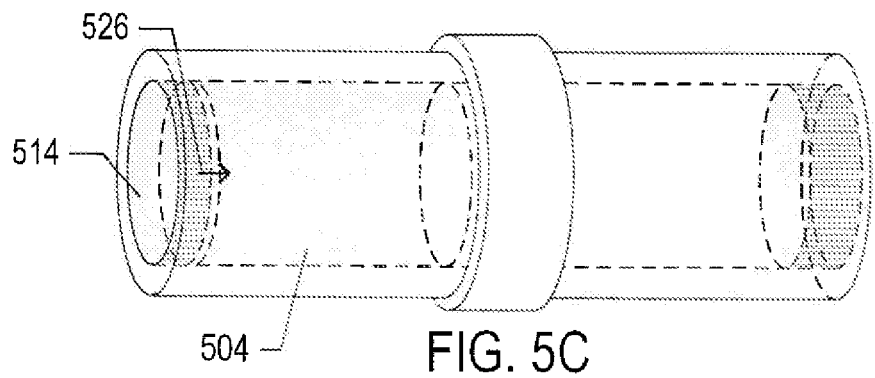
Figure 5D:
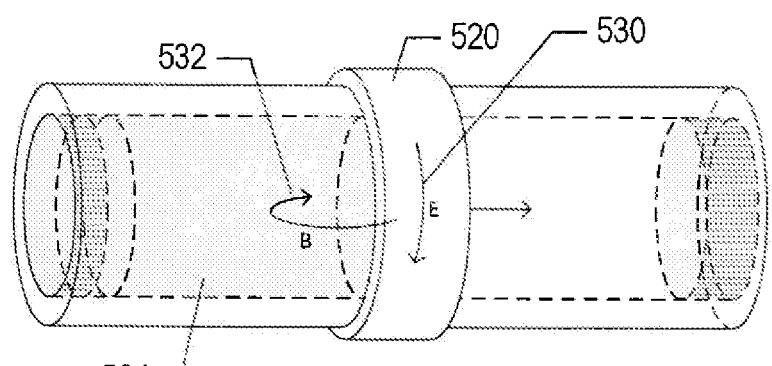
Figure 5E:
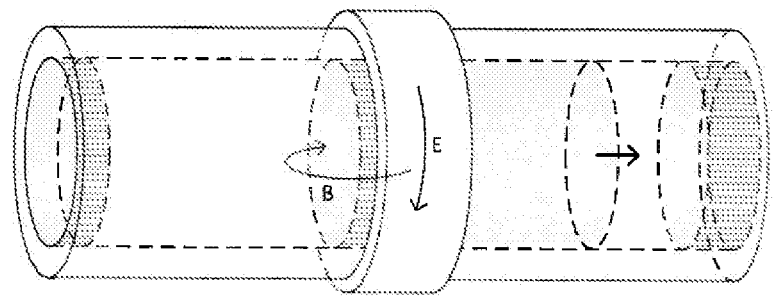
Figure 5F:
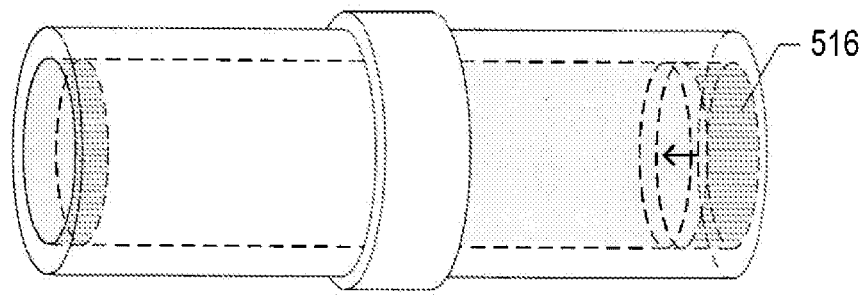
Figure 5G:
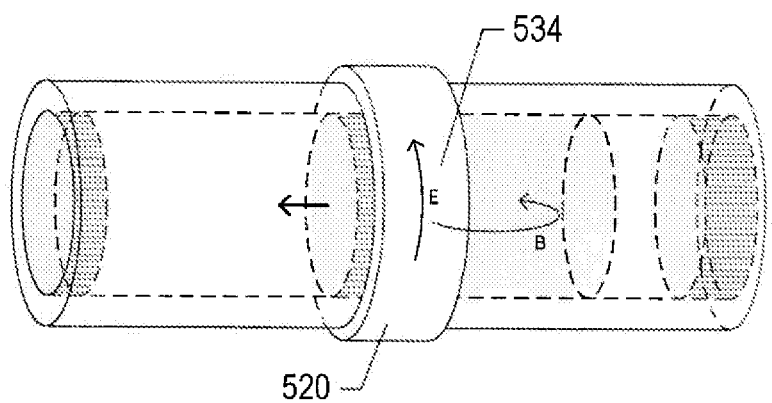

FIGS. 5B-G illustrate operation of the ORM shown in FIG. 5A. When an electric current is applied to the coil 520 in a first direction 522, a corresponding magnetic force 524 is generated in a direction parallel to the axis of the cylindrical chamber, which accelerates the weight 504 in the direction of the magnetic force 524. When the weight reaches a point at or close to the corresponding disk-like magnet 514, as shown in FIG. 5C, a magnetic force due to the repulsion of the disk-like magnet 514 and the weight 504, 526, is generated in the opposite direction, decelerating the weight and reversing its direction. As the weight reverses direction, as shown in FIG. 5D, current is applied in an opposite direction 530 to the coil 520, producing a magnetic force 532 in an opposite direction from the direction of the magnetic force shown in FIG. 5B, which accelerates the weight 504 in a direction opposite to the direction in which the weight is accelerated in FIG. 5B. As shown in FIG. 5E, the weight then moves rightward until, as shown in FIG. 5F, the weight is decelerated, stopped, and then accelerated in the opposite direction by repulsion of the disk-like magnet 516. An electrical current is then applied to the coil 520 in the same direction 534 as in FIG. 5B, again accelerating the solid cylindrical mass in the same direction as in FIG. 5B. Thus, by a combination of a magnetic field with rapidly reversing polarity, generated by alternating the direction of current applied to the coil, and by the repulsive forces between the weight magnet and the disk-like magnets at each end of the hollow, cylindrical chamber, the weight linearly oscillates back and forth within the cylindrical housing 502, imparting a directional force at the ends of the cylindrical chamber with each reversal in direction.

Clearly, the amplitude of the vibration and other characteristics of the vibrational forces produced within the ORM are related to the length of the hollow chamber in which the weight oscillates, the current applied to the coil, the mass of the weight, the acceleration of the weight produced by the coil, and the mass of the entire ORM. All of these parameters are essentially design parameters for the ORM, and thus the ORM can be designed to produce a wide variety of different amplitudes.

Figure 6B:
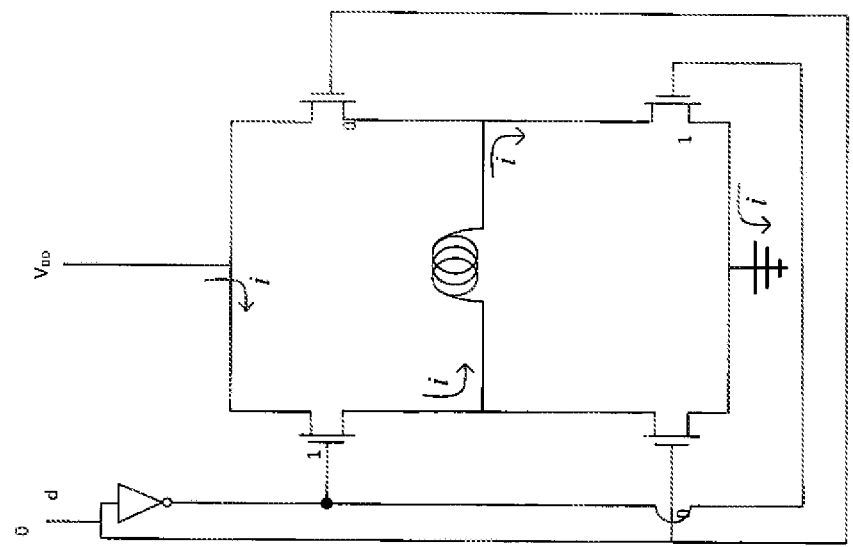
FIGS. 6A-B illustrate an H-bridge switch that can be used, in various ORMs, to change the direction of current applied to a coil that drives back-and-forth oscillation within the ORM.
Figure 6A:
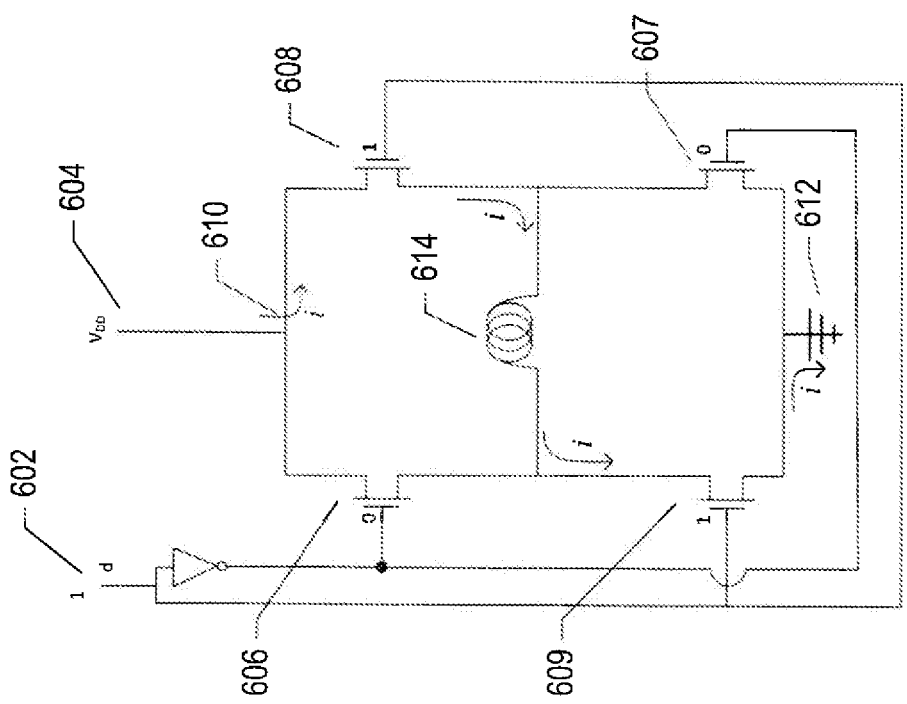

The frequency of the oscillation of the solid, cylindrical mass is determined by the frequency at which the direction of the current applied to the coil is changed. FIGS. 6A-B illustrate an H-bridge switch that can be used, in various ORMs, to change the direction of current applied to a coil that drives back-and-forth oscillation within the ORM. FIGS. 6A-B both use the same illustration conventions, described next with respect to FIG. 6A. The H-bridge switch receives, as input, a directional signal d 602 and direct-current ("DC") power 604. The direction-control signal d 602 controls four switches 606-609, shown as transistors in FIG. 6A. When the input control signal d 602 is high, or "1," as shown in FIG. 6A, switches 608 and 609 are closed and switches 606 and 607 are open, and therefore current flows, as indicated by curved arrows, such as curved arrow 610, from the power-source input 604 to ground 612 in a leftward direction through the coil 614. When the input-control signal d is low, or "0," as shown in FIG. 6B, the direction of the current through the coil is reversed. The H-bridge switch, shown in FIGS. 6A-B, is but one example of various different types of electrical and electromechanical switches that can be used to rapidly alternate the direction of current within the coil of an ORM.

Figure 7:
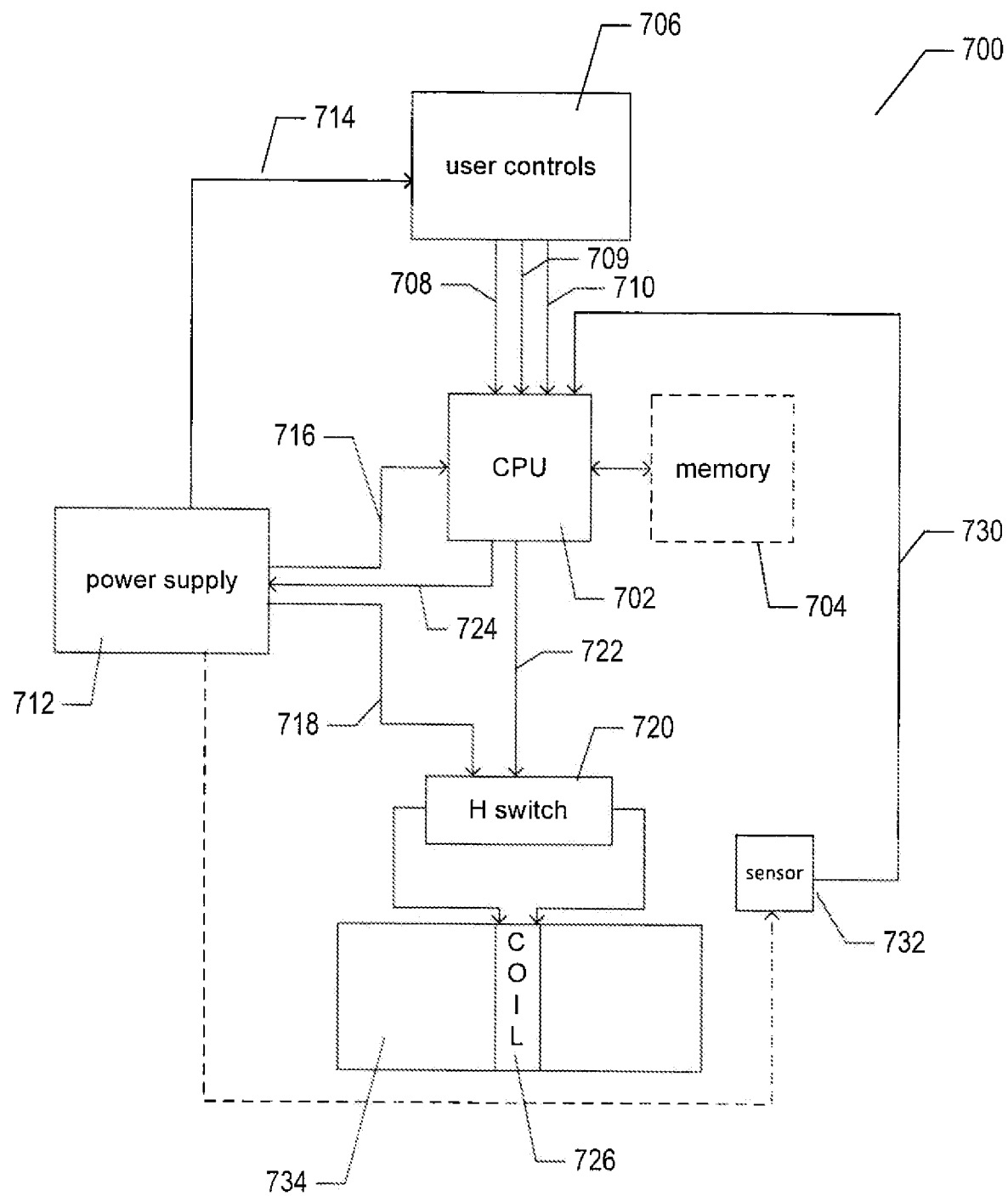
FIG. 7 provides a block diagram of the ORM, illustrated in FIGS. 5A-G.

FIG. 7 provides a block diagram of the ORM, illustrated in FIGS. 5A-G. The ORM, in addition to the cylindrical housing, coil, and internal components shown in FIG. 5A, includes a power supply, a user interface, generally comprising electromechanical buttons or switches, the H-bridge switch, discussed above with reference to FIGS. 7A-B, a central processing unit ("CPU"), generally a small, low-powered microprocessor, and one or more electromechanical sensors. All of these components are packaged together as an ORM within a vibration-based appliance, device, or system.

As shown in FIG. 7, the ORM 700 is controlled by a control program executed by the CPU microprocessor 702. The microprocessor may contain sufficient on-board memory to store the control program and other values needed during execution of the control program, or, alternatively, may be coupled to a low-powered memory chip 704 or flash memory for storing the control program. The CPU receives inputs from the user controls 706 that together comprise a user interface. These controls may include any of various dials, pushbuttons, switches, or other electromechanical-control devices. As one example, the user controls may include a dial to select a strength of vibration, which corresponds to the current applied to the coil, a switch to select one of various different operational modes, and a power button. The user controls generate signals input to the CPU 708-710. A power supply 712 provides power, as needed, to user controls 714, to the CPU 716 and optional, associated memory, to the H-bridge switch 718, and, when needed, to one or more sensors 732. The voltage and current supplied by the power supply to the various components may vary, depending on the operational characteristics and requirements of the components. The H-bridge switch 720 receives a control-signal input d 722 from the CPU. The power supply 712 receives a control input 724 from the CPU to control the current supplied to the H-bridge switch 718 for transfer to the coil 726. The CPU receives input 730 from one or more electromechanical sensors 732 that generate a signal corresponding to the strength of vibration currently being produced by the linearly oscillating mass 734. Sensors may include one or more of accelerometers, piezoelectric devices, pressure-sensing devices, or other types of sensors that can generate signals corresponding to the strength of desired vibrational forces.

Figure 8A:
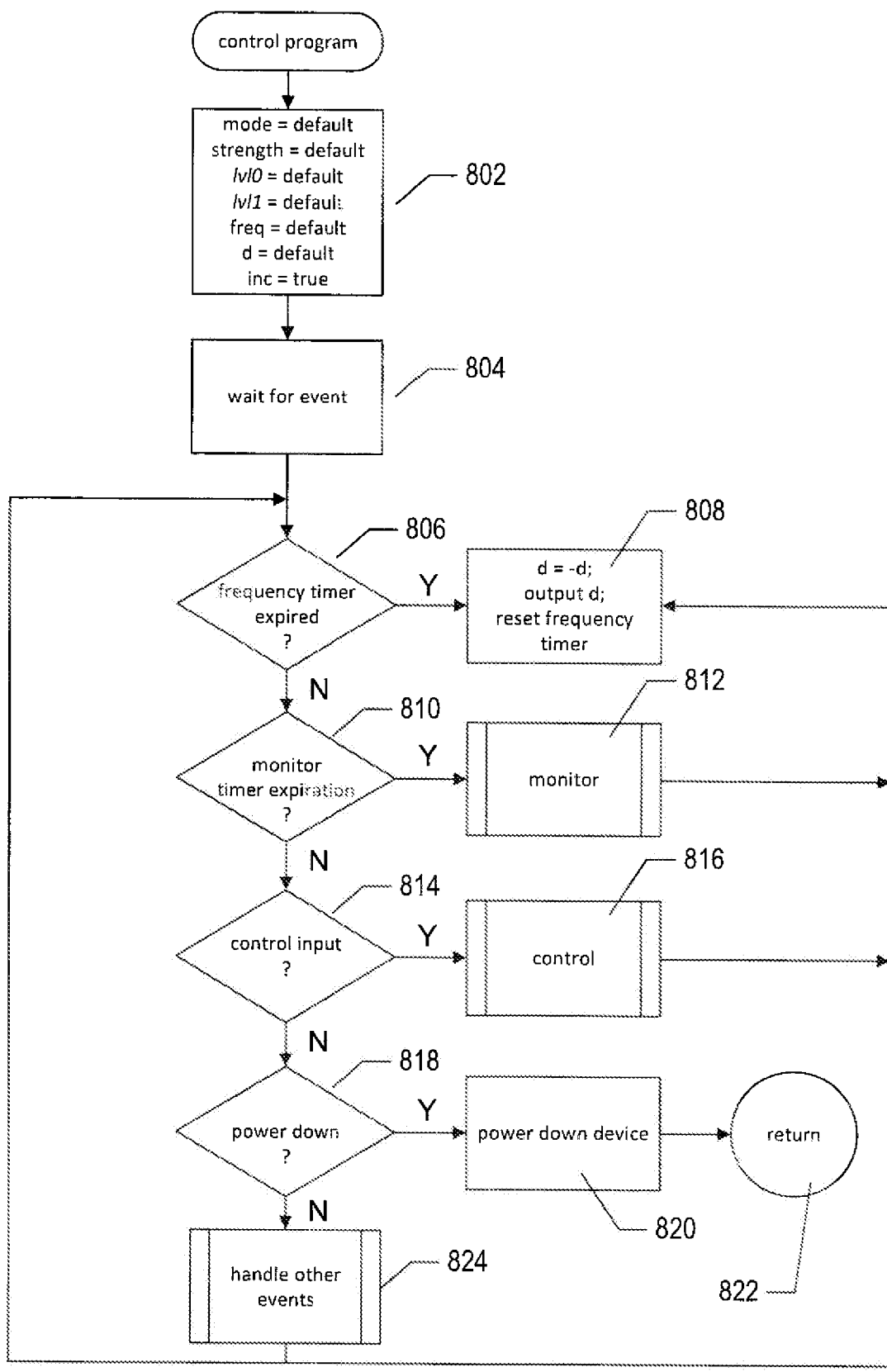
FIGS. 8A-C provide control-flow diagrams that illustrate the control program, executed by the CPU, that controls operation of an ORM.
Figure 8B:
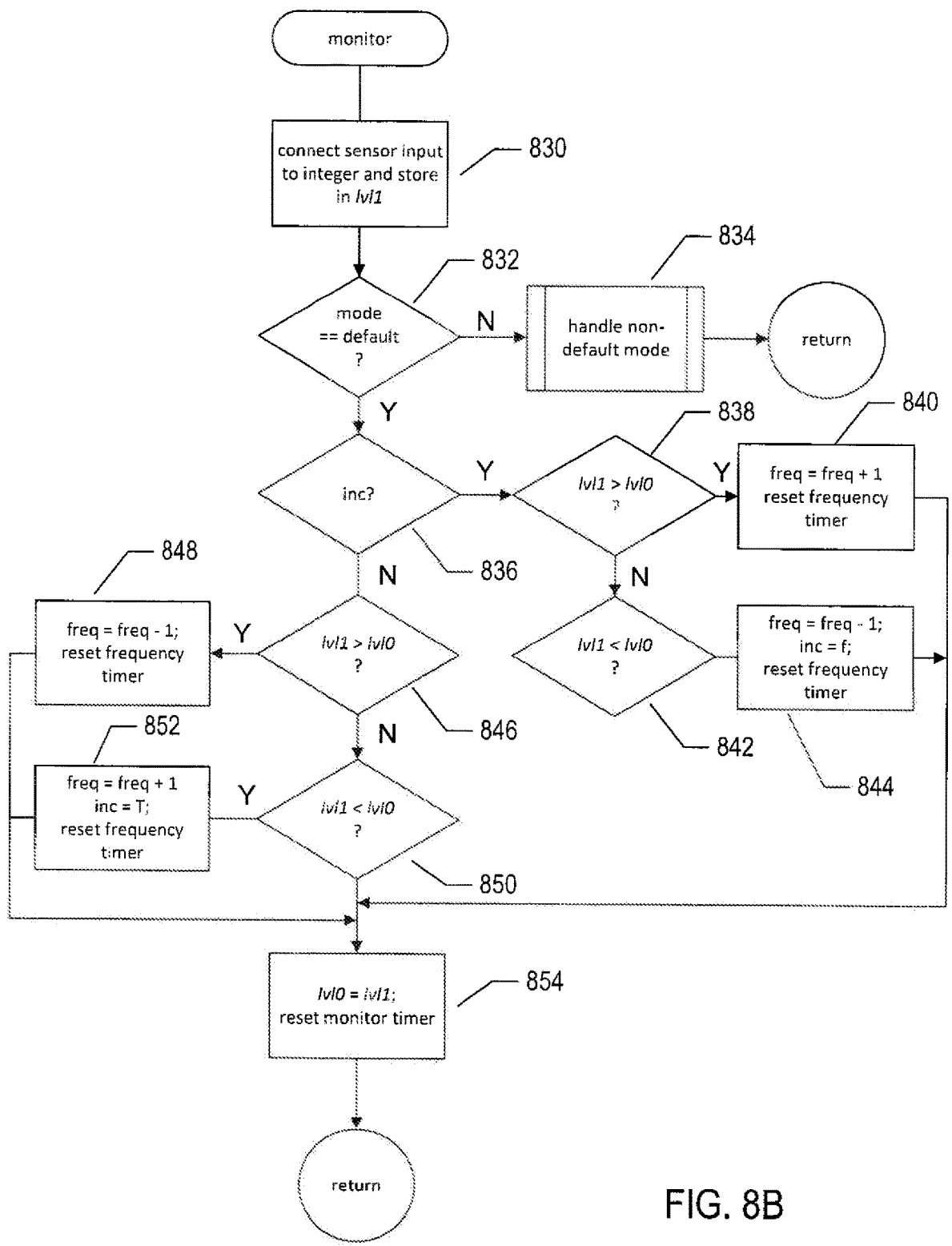
Figure 8C:
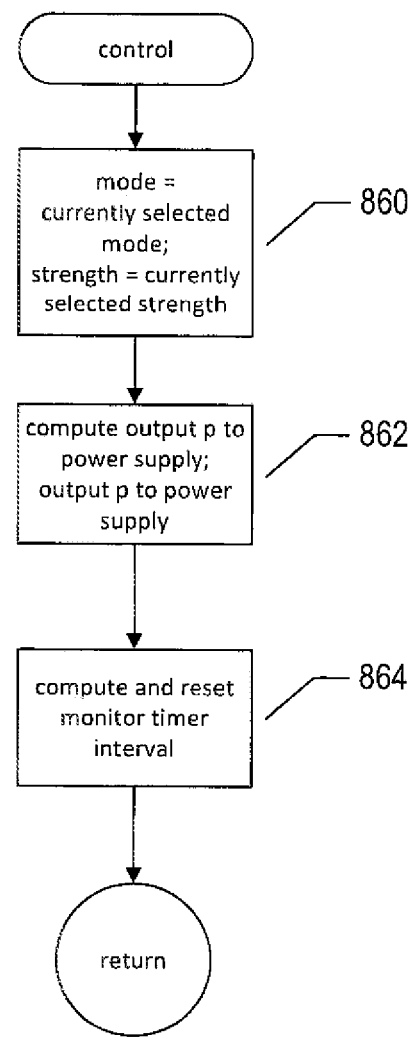

FIGS. 8A-C provide control-flow diagrams that illustrate the control program, executed by the CPU, that controls operation of an ORM. FIG. 8A provides a control-flow diagram for the high-level control program. The program begins execution, in step 802, upon a power-on event invoked by a user through a power button or other user control. In step 802, various local variables are set to default values, including the variables: (1) mode, which indicates the current operational mode of the device; (2) strength, a numerical value corresponding to the current user-selected strength of operation, corresponding to the electrical current applied to the coil; (3) lvl0, a previously sensed vibrational strength; (4) lvl1, a currently sensed vibrational strength; (6) freq, the current frequency at which the direction of current is alternated in the coil; (6) d, the control output to the H-bridge switch; and (7) inc, a Boolean value that indicates that the frequency is currently being increased. Next, in step 804, the control program waits for a next event. The remaining steps represent a continuously executing loop, or event handler, in which each event that occurs is appropriately handled by the control program. In certain implementations of the control program, events may be initiated by interrupt-like mechanisms and stacked for execution while, in more primitive implementations, certain events that overlap in time may be ignored or dropped. In the implementation illustrated in FIGS. 8A-C, two timers are used, one for controlling the change in direction of the current applied to the coil, at a currently established frequency, and the other for controlling a monitoring interval at which the control program monitors the vibrational force currently produced. Rather than using a formal timer mechanism, certain implementations may simply employ counted loops or other simple programming techniques for periodically carrying out tasks. When an event occurs, the control program begins a series of tasks, the first of which is represented by the conditional step 806, to determine what event has occurred and appropriately handle that event. When the frequency timer has expired, as determined in step 806, the value of the output signal d is flipped, in step 808, and output to the H-bridge switch, with the frequency timer being reset to trigger a next frequency-related event. The frequency-timer interval is determined by the current value of the variable freq. Otherwise, when the event is a monitor timer expiration event, as determined in step 810, then a routine "monitor" is called in step 812. Otherwise, when the event corresponds to a change in the user input through the user interface, as determined in step 814, the routine "control" is called in step 816. Otherwise, when the event is a power-down event, as determined in step 818, resulting from deactivation of a power button by the user, then the control program appropriately powers down the device, in step 820, and the control program terminates in step 822. Any other of various types of events that may occur are handled by a default event handler 824. These events may include various error conditions that arise during operation of the device.

FIG. 8B provides a control-flow diagram for the routine "monitor." called in step 812 of FIG. 8A. In step 830, the routine "monitor" converts the sensor input to an integer representing the current vibrational force produced by the ORM and stores the integer value in the variable lvl1. Next, in step 832, the routine "monitor" determines whether or not the ORM is currently operating in the default mode. In the default mode, the ORM uses continuous feedback control to optimize the vibrational force produced by the ORM by continuously seeking to operate the ORM at a frequency as close as possible to the resonant frequency for the ORM. Other, more complex operational modes may be handled by various more complex routines, represented by step 834 in FIG. 8B. More complex vibrational modes may systematically and/or periodically alter the frequency or produce various complex, multi-component vibrational modes useful in certain applications, appliances, devices, and systems. These more complex modes are application dependent, and are not further described in the control-flow diagrams. In the case that the operational mode is the default mode, in which the control program seeks to optimize the vibrational force generated by the device, in step 836, the routine "monitor" determines whether the local variable inc is set to TRUE. If so, then the control program is currently increasing the frequency at which the device operates in order to obtain the resonance frequency. When lvl1 is greater than lvl0, as determined in step 838, then the vibrational force has been recently increased by increasing the frequency, and so the routine "monitor" increases the frequency again, in step 840, and correspondingly resets the frequency timer. Otherwise, when lvl1 is less than lvl0, as determined in step 842, then the control program has increased the frequency past the resonance frequency, and therefore, in step 844, the control program decreases the frequency, sets the variable inc to FALSE, and correspondingly resets the frequency timer. In similar fashion, when the variable inc is initially FALSE, as determined in step 836, and when lvl1 is greater than lvl0, as determined in step 846, the routine "monitor" decreases the value stored in the variablefreq, in step 848 and resets the frequency timer. Otherwise, when lvl1 is less than lvl0, as determined in step 860, then the routine "monitor" increases the value stored in the variable freq, sets the variable inc to TRUE, and resets the frequency timer in step 862. Finally, the value in lvl1 is transferred to lvl0 and the monitor timer is reset, in step 864.

FIG. 8C provides a control-flow diagram for the routine "control," called in step 816 in FIG. 8A. This routine is invoked when a change in the user controls has occurred. In step 860, the variables mode and strength are set to the currently selected mode and vibrational strength, represented by the current states of control features in the user interface. Next, in step 862, the routine "control" computes an output value p corresponding to the currently selected strength, stored in the variable strength, and outputs the value p to the power supply so that the power supply outputs an appropriate current to the coil. Finally, in step 864, the routine "control" computes a new monitor timer interval and resets the monitor timer accordingly.

The control program described with reference to FIGS. 8A-C is one example of many different implementations of the control program that can be carried out, depending on requirements of the ORM, the parameters and characteristics inherent in a particular ORM, the types of control inputs received from a particular user interface, the nature of the power supply, and the types of operational modes that are implemented for the ORM.

Figure 10:
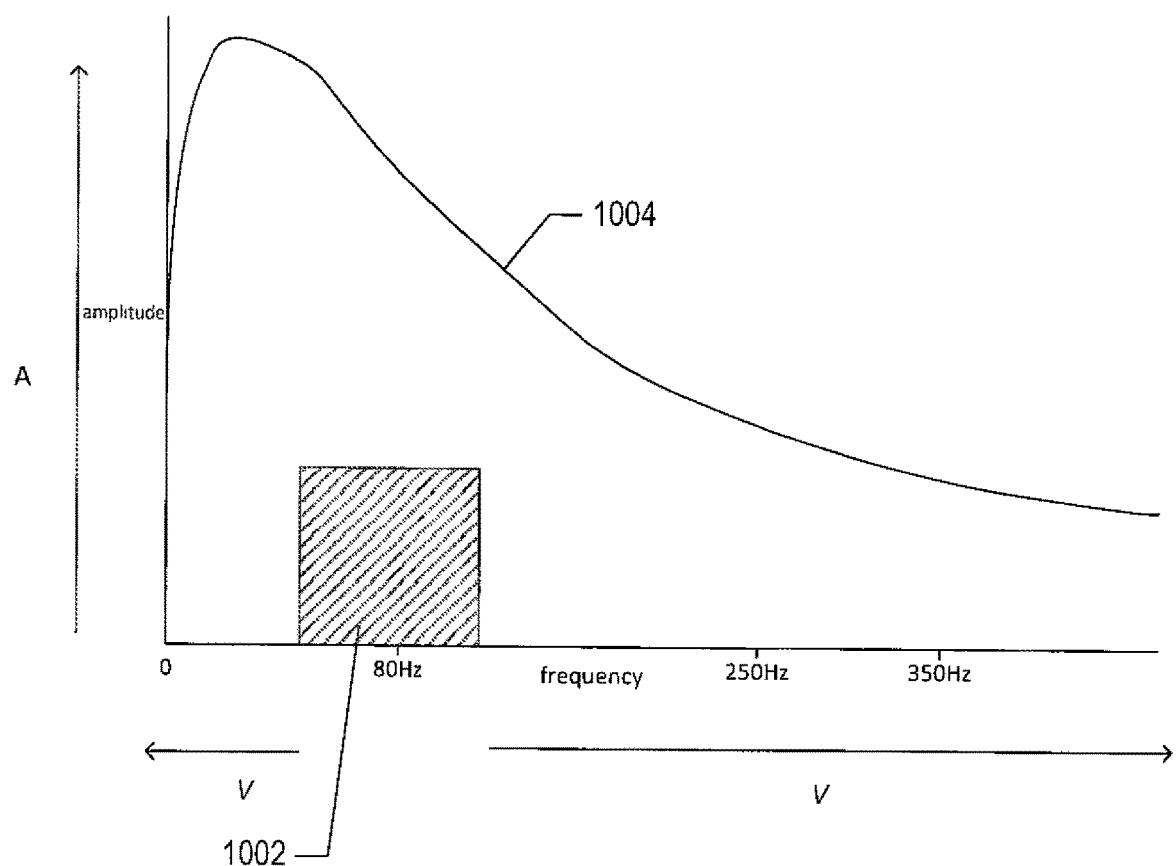
FIG. 10 shows a plot of the amplitude/frequency space and regions in that space that can be operationally achieved by unbalanced electrical motors and by ORMs.

FIG. 9 represents the range of frequencies and vibrational forces that can be achieved by different implementations of ORM and ORM control programs. FIG. 9 has the same axes as the graph shown in FIG. 3. However, unlike FIG. 3, FIG. 9 includes many different curves, such as curve 902, each representing the vibrational forces and frequencies that can be obtained from a particular ORM implementation. Again, an ORMs generally has at least one resonant frequency that is characteristic of the geometry and weights of various components of the ORM, and each ORM is naturally operated at a frequency close to this resonant frequency in order to achieve maximum vibrational force. Thus, rather than being restricted, over all possible implementations, to a relatively narrow range of frequencies and vibrational forces, as in the case of unbalanced electrical motors, ORMs can be designed and implemented to produce desired vibrational forces over a wide range of vibrational frequencies, and desired vibrational frequencies over a wide range of desired vibrational forces. The contrast is perhaps best seen in FIG. 10. FIG. 10 shows a plot of the amplitude/frequency space and regions in that space that can be operationally achieved by unbalanced electrical motors and by linear ORMs. Unbalanced electric motors can be implemented to produce amplitude/frequency combinations roughly within the cross-hatched square region 1002 within amplitude/frequency space. By contrast, linear ORMs can be designed and implemented to produce amplitude/frequency combinations underlying curve 1004. Thus, linear ORMs can achieve much higher operational frequencies and much lower operational frequencies than can be practically obtained by unbalanced electric motors, and can produce much higher amplitudes and vibrational forces than can be achieved by relatively low-powered unbalanced electrical motors used in hand-held appliances and other commonly encountered devices and systems. Furthermore, when larger vibrational forces are needed, balanced electrical motors are generally impractical or infeasible, due to the destructive forces produced within the electrical motors. In general, a single implemented linear ORM can access a much larger region of amplitude/frequency space than currently available vibration modules, which generally operate at fixed amplitudes and/or fixed frequencies, as further discussed below.

Figure 11:
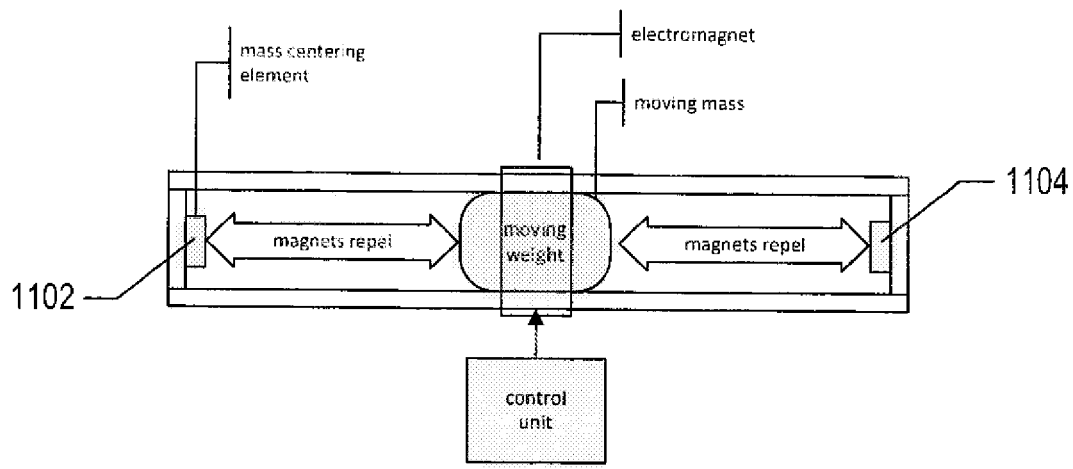
FIGS. 11-18 show a variety of different alternative implementations of ORMs.

FIGS. 11-18 show a variety of different alternative implementations of ORMs. FIG. 11 provides a schematic illustration of an ORM similar to that discussed above with reference to FIG. 4A. Note that, in place of the end magnets 1102 and 1104, mechanical springs may alternatively be used. These may be traditional helical springs made from metal or springs made from a compressible and durable material or mechanical device that seeks to restore its initial shape when depressed or compressed. Note that the weight and chamber may be cylindrical, in cross section, as discussed above with reference to FIG. 5A, or may have other shapes, including rectangular or hexagonal cross-sections.

Figure 12:
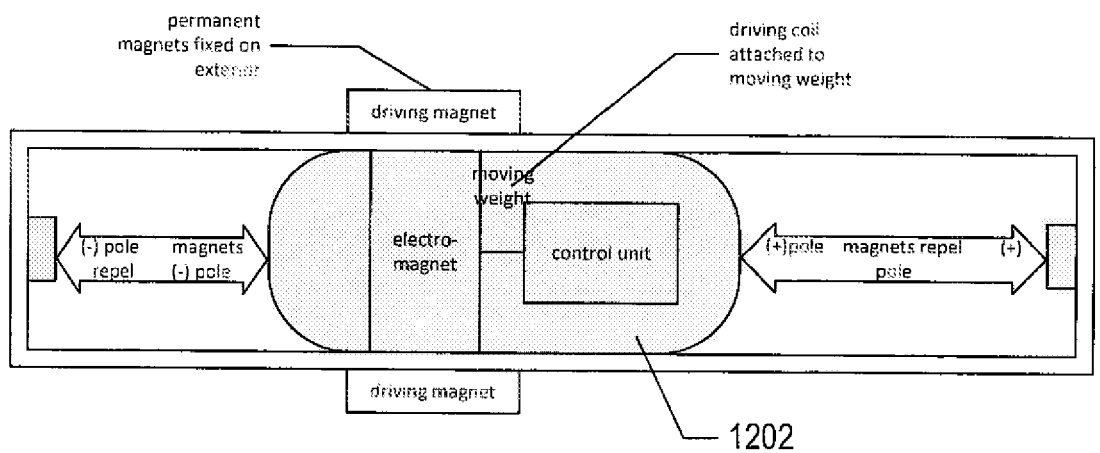

FIG. 12 shows a similar implementation in which the control unit and power supply are incorporated into the moving mass 1202. In this implementation, the relative masses of the moving mass 1202 and remaining components of the ORM is maximized, thus maximizing the vibrational forces produced at a given level of power consumption.

Figure 13:
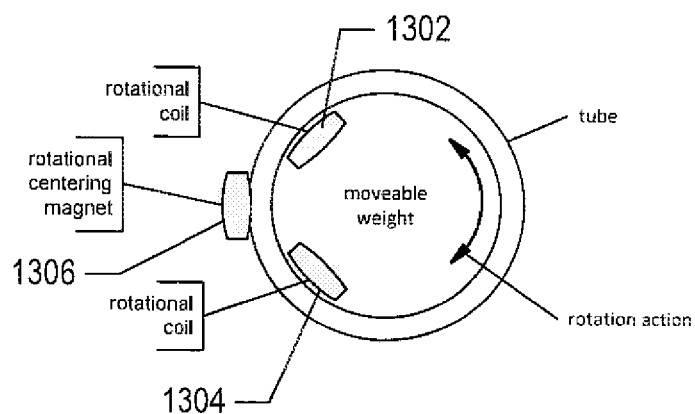

FIG. 13 shows yet an alternative ORM. In this alternative implementation, additional coils 1302 and 1304 are incorporated in the moving mass, and a centering magnet or coil 1306 is positioned in a fixed location on the housing so that, when the direction of the current applied to the coils 1302 and 1304 is alternated, an oscillating rotational force is generated to cause the movable weight to oscillate both in a plane perpendicular to the axis of the chamber as well as linearly oscillating the direction of the chamber.

Figure 14:
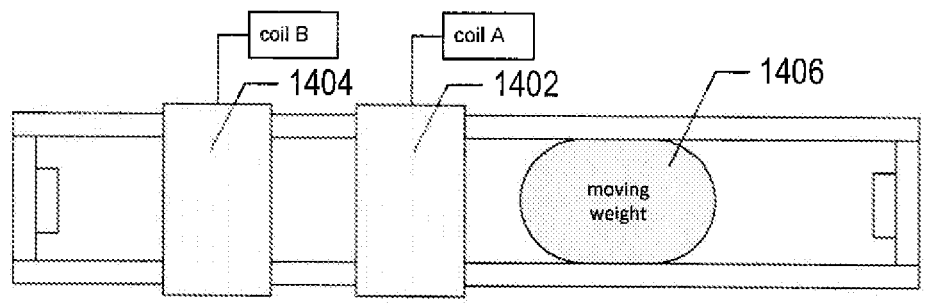

FIG. 14 illustrates an ORM in which multiple electromagnetic coils are employed. In FIG. 14, two coils 1402 and 1404 are placed in two different positions on the housing. The first coil 1402 may be used to drive linear oscillation of the moving mass 1406, while the second coil may be activated in order to shorten the length of the chamber within which the moving mass linearly oscillates, essentially serving as a second repelling magnet. In this implementation of the ORM, the moving mass may linearly oscillate with at least two different amplitudes, depending on whether or not the second coil 1404 is activated to repel the moving mass. Additionally more complex patterns of current reversal in the two coils can be employed to produce complex multi-component vibrational modes of the moving mass.

When the housing is fully enclosed, air within the chamber serves to dampen oscillation of the moving mass. This dampening may be minimized by providing channels, on the sides of the moving mass, to allow air to pass from one side of the moving mass to the other, by channels through the moving mass, or by providing openings in the housing to allow air to be forced from the housing and drawn into the housing. Additionally, different fluids or liquids may be employed within the chamber to change the dampening effect produced by displacement of the fluids and gasses as the moving mass linearly oscillates.

Figure 15:
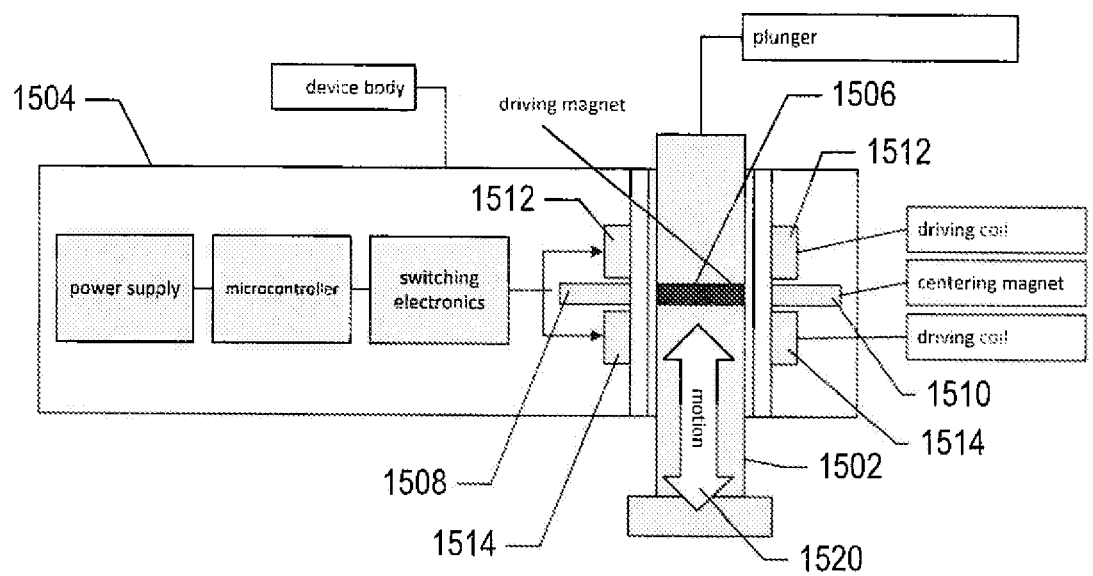

FIG. 15 illustrates an alternative ORM an implementation of the linear-resonant vibration module to which current document is directed in which a plunger linearly oscillates to produce a vibration. The plunger 1502 is slideably contained within a moveable-component track orthogonal to a long axis of the main housing 1504 of the ORM that includes the power supply, microcontroller, and other control components. The plunger is girdled by, or includes, a driving magnet 1506 that is attracted to, and seeks to be positioned in alignment with, a centering magnet 1508 mounted within the housing. Applying current to one of two driving coils 1512 and 1514 forces the driving magnet away from the equilibrium position shown in FIG. 15. By rapidly switching the direction of current applied to the driving coils, the microcontroller can control the plunger to linearly oscillate in an up-and-down fashion, as indicated by arrow 1520.

Figure 16:
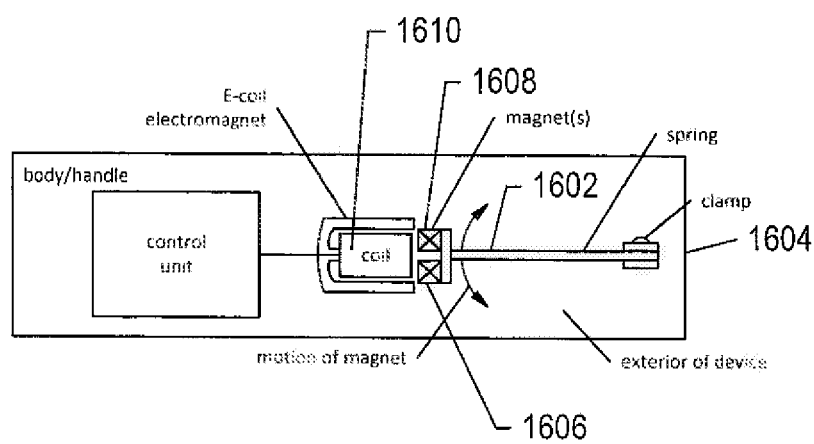

FIG. 16 shows yet another ORM an implementation of the linear-resonant vibration module to which current document is directed. In this an implementation of the linear-resonant vibration module to which current document is directed, a spring-like member 1602 is clamped at one end 1604 to the housing. Driving magnets 1606 and 1608 are fixed to the spring-like member 1602, and when current is rapidly reversed in a coil 1610, the spring-like member 1602 is induced to vibrate at a relatively high frequency.

Figure 17:
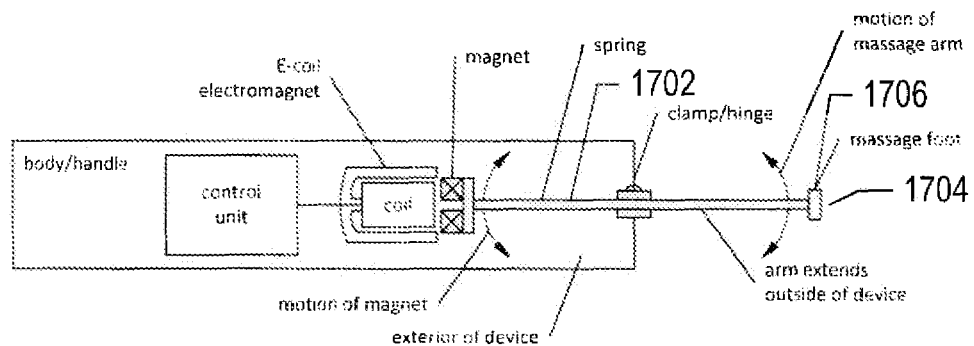

FIG. 17 shows another ORM similar to the ORM shown in FIG. 16. In this ORM, the spring member 1702 is extended to provide an external massage arm 1704 that extends out from the housing to provide a linearly oscillating massage-foot member 1706 for massaging human skin or some other substrate, depending on the application.

Figure 18:
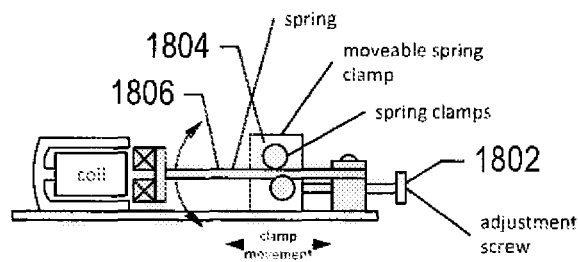

FIG. 18 shows a mechanical vibration adjustment feature that can be added to either of the ORMs shown in FIGS. 16 and 17. An adjustment screw 1802 can be manipulated to alter the position of a movable spring clamp 1804 that acts as a movable clamping point for the spring-like member 1806. Moving the movable spring clamp 1804 leftward, in FIG. 18, shortens the length of the spring-like member and thus tends to increase the resonant frequency at a particular power-consumption level. Conversely, moving the movable spring clamp rightward, in FIG. 18, lengthens the spring-like member and decreases the vibrational frequency.

Figure 19:
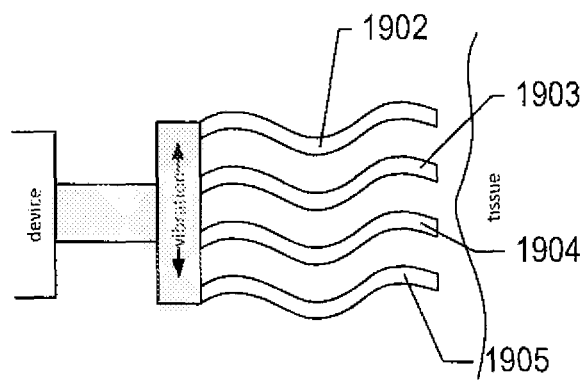
FIG. 19 illustrates an enhancement of an implementation of the ORM shown in FIG. 17.

FIG. 19 illustrates an enhancement of an implementation of the ORM shown in FIG. 17. In this implementation, the massage foot is enhanced to include elastomer bristles 1902-1906 to transfer the linear oscillation of the massage foot to human skin or another substrate. The elastomeric bristles, or pad or brush comprising numerous elastomeric bristles, allow transmission of vibration to a surface even at low operational powers, when a rigid or even semi-compliant massage foot would instead simply stop moving for inability to overcome frictional forces.

FIG. 20-23C illustrate a different type of ORM. This ORM comprises a motor incorporated within a printed circuit board ("PCB"). The motor includes moving and non-moving components that interact via electromagnetic forces to produce motion. The non-moving components include a stator that generates a magnetic field. A stator can be created by using one or more coils. In certain implementations, a stator adapted to integration with a planar substrate is produced using combinations of one or more spiral-shaped conductive traces.

Figure 20:
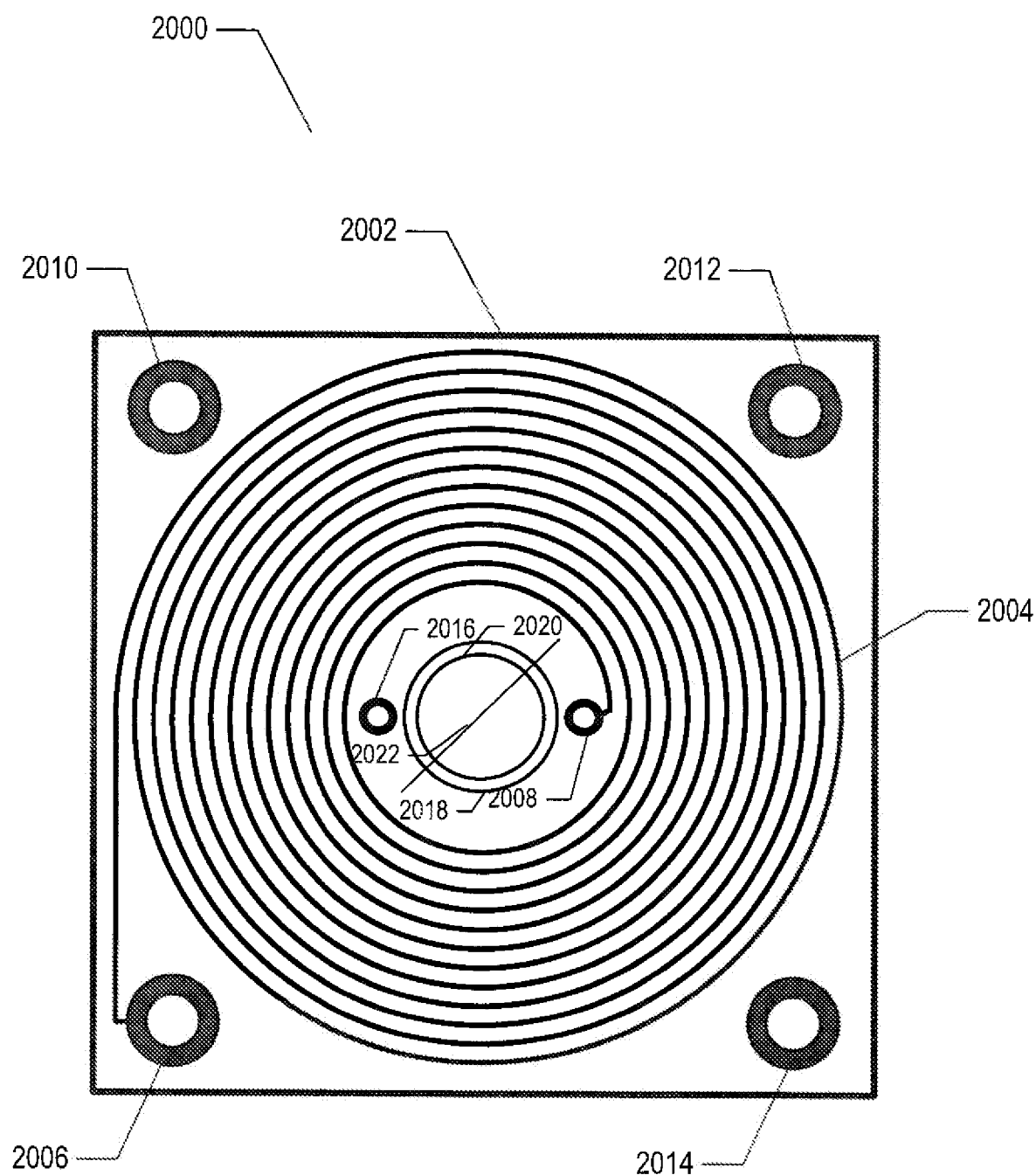
FIG. 20 illustrates a first coil layer.

FIG. 20 illustrates a first coil layer. The first coil layer 2000 includes a substrate 2002 and a spiral-shaped trace 2004 that is wound in a clockwise direction from the outside of the spiral to the inside of the spiral. The spiral-shaped trace 2004 surrounds a central core and overlays the substrate 2002. In some implementations, the substrate 2002 is a printed circuit board. The width and thickness of the trace influence the conductivity of the resulting coil. In general, thicker and wider traces have lower electrical resistance and result in coils with lower resistance and higher current carrying capacity. Spirals with a larger core diameter and spirals having a larger number of turns produce coils with correspondingly higher inductance. The inductance of the spiral-shaped trace 2004 with an air core at the center of the spiral is expressed as:

$$L(uH) = \frac{r^2 N^2}{8r + 11W}$$

where:
r is the core radius in inches;
N is the number of turns; and
W is the total width of the windings in inches.

The inductance of the resulting coil can be adjusted by altering the above parameters, as well as through the selection of core materials.

A first connection pad 2006 and a second connection pad 2008 terminate the ends of the spiral-shaped trace 2004. In certain implementations, the first connection pad 2006 and/or the second connection pad 2008 are incorporated into one or more conductive vias connecting the first coil layer to other coil layers or to electrical circuits constructed on the substrate. Additional connection pads 2010, 2012, 2014, and 2016 can provide connection points or can be incorporated into vias that connect multiple layers of traces.

FIG. 20 additionally illustrates the placement of a number of motor elements in a particular motor implementation. At the center of the spiral-shaped trace 2004 is a circular opening 2018. The circular opening provides a space for an armature 2020. The armature 2020 can be made from a ferrous metal or a magnetic Material and moves in a direction substantially perpendicular to the surface of the substrate 2002 in response to a drive current applied to the coil layer. A centering spring 2022 retains the armature 2020 in the circular opening 2018 in the substrate 2002, and allows limited movement perpendicular to the substrate.

In certain implementations, the traces and connection pads are made from conductive material, such as metal, copper, aluminum, or conductive alloys. The traces and connection pads on the first coil layer 2000 can be fabricated using printed-circuit-board manufacturing techniques. In some implementations, foil decals are created and laminated onto the substrate 2002. The construction of multi-layer coils is achieved using a number of techniques, including: multi-layer PCB construction; laminated foil decals separated by insulating layers; and 2-sided PCB construction. In some implementations, the traces and connection pads are embedded into the substrate 2002.

Figure 21:
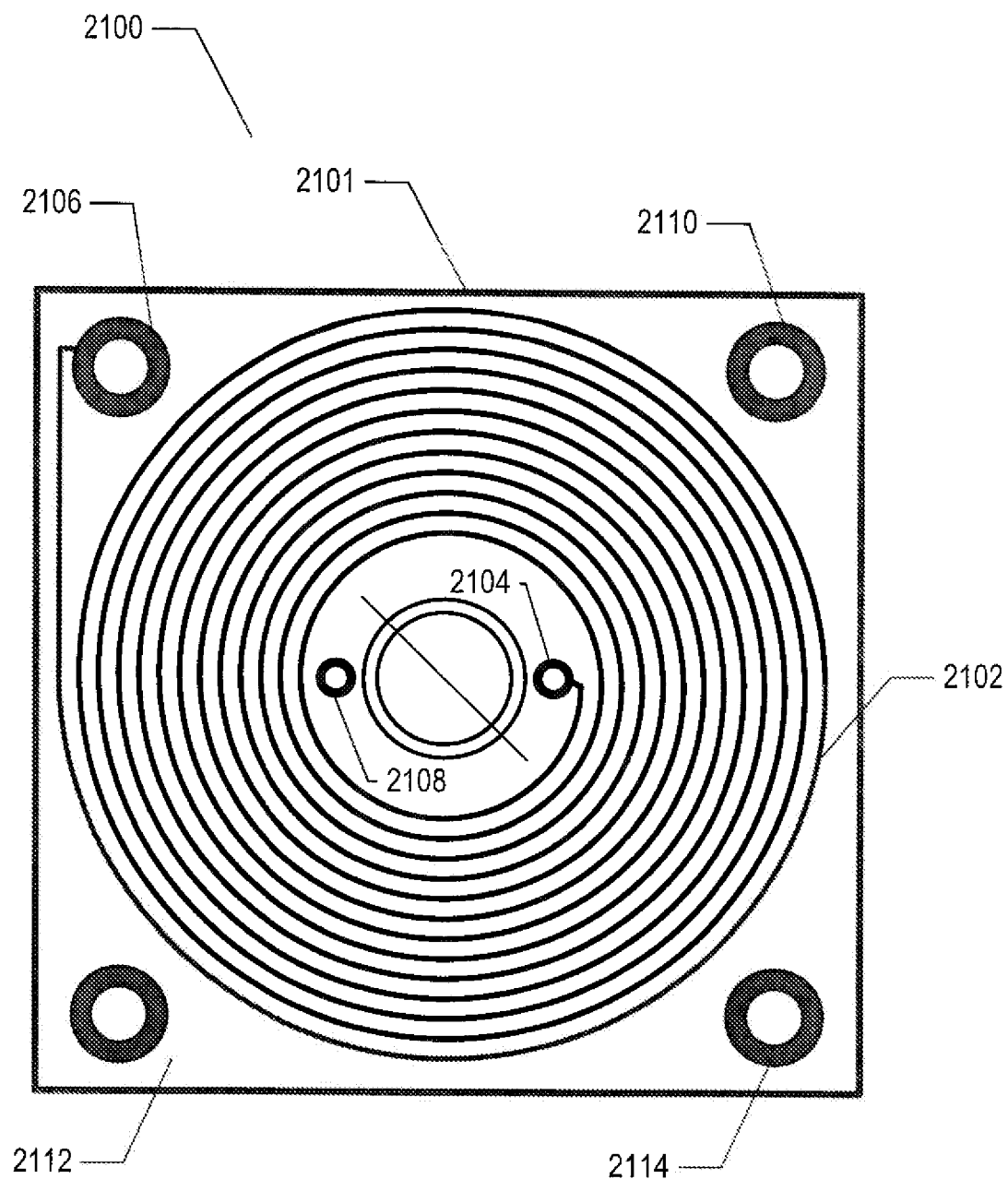
FIG. 21 illustrates a second coil layer.

FIG. 21 illustrates a second coil layer. The second coil layer 2100 is constructed using techniques already described for the construction of the first coil layer 2000. A spiral-shaped trace 2102 winds in a clockwise direction from the starting connection pad 2104 to the ending connection pad 2106. The coil layer of FIG. 20 is positioned over the coil layer of FIG. 21 and the two layers are aligned with one another so that the second connection pad 2008 in FIG. 20 overlays the starting connection pad 2104 in FIG. 21, and the connection pad 2010 in FIG. 20 aligns with the ending connection pad 2106 in FIG. 21. PCB vias form electrical connections between the second connection pad 2008 in FIG. 1 and the starting connection pad 2104. When the first coil layer 2000 in FIG. 20 and the second coil layer 2100 in FIG. 21 are connected in this way and energized, the inductance of the layers is additive. In one mode of operation, current flows into the coil layer of FIG. 20 starting at the first connection pad 2006, clockwise around the coil to the second connection pad 2008, through a via to the starting connection pad 2104, and clockwise to the ending connection pad 2106. Adding additional coil layers increases the total inductance of the resulting coil. Additional connection pads 2108, 2110, 2112, and 2114 provide connection points and support for vias that connect to additional coil layers. In certain implementations, additional coil layers can be added to the coil using similar methods to those described above. The additional coil layers are separated by insulating layers or placed on opposite sides of an insulating substrate. In certain implementations, the multi-layer coil is used as a stator in a motor.

Figure 22A:
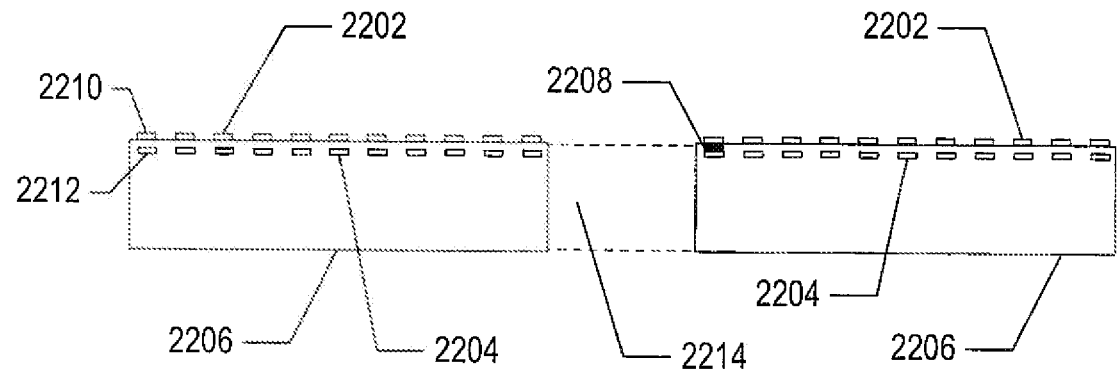
FIG. 22A illustrates a cross-section of a stator having two coil layers.

FIG. 22A illustrates a cross-section of a stator having two coil layers. A first coil layer 2202 and a second coil layer 2204 are laminated onto an insulating planar substrate 2206, such as a PCB. The first and second coil layers 2202 and 2204 are separated by an insulating layer and electrically connected to each other with a via 2208. The stator is driven by a first connection pad 2210 and a second connection pad 2212. In certain implementations, the second connection pad 2212 is routed to the front surface of the PCB using a via. An opening 2214 is provided for an armature that moves perpendicularly to the surface of the substrate in response to energizing the stator. The first and second coil layers can be constructed using the coil layers illustrated in FIGS. 20 and 21, or with similar trace patters arranged so that the coil layers produce a single direction of rotation around the opening 2214. The implementations illustrated in FIG. 22A can be extended to include additional coil layers laminated to both sides of a planar substrate.

Figure 22B:
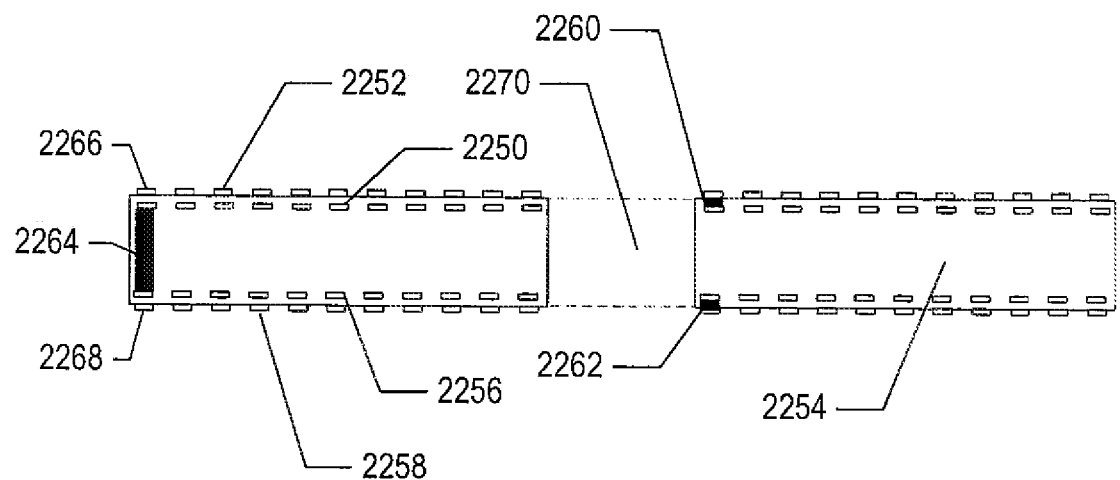
FIG. 22B illustrates a cross-section of a stator having four coil layers.

FIG. 22B illustrates a cross-section of a stator having four coil layers. A first-front coil layer 2250 and a second-front coil layer 2252 are laminated onto a front surface of an insulating planar substrate 2254, such as a PCB. A first-back coil layer 2256 and a second-back coil layer 2258 are laminated onto a back surface of the insulating planar substrate 2254. A first via 2260 electrically connects the end of the first-front coil layer 2250 to the beginning of second-front coil layer 2252. A second via 2262 electrically connects the end of the first-back coil layer 2256 to the beginning of second-back coil layer 2258. Cross-substrate via 2264 connects the end of first-front coil layer 2250 to the end of first-back coil layer 2256. When current enters at an entry connection pad 2266 and passes through the four coil layers, the current travels with a single direction of rotation until the current exits at an exit connection pad 2268. The inductance of the stator in FIG. 22B is approximately double that of the stator shown in FIG. 22A.

Figure 22C:
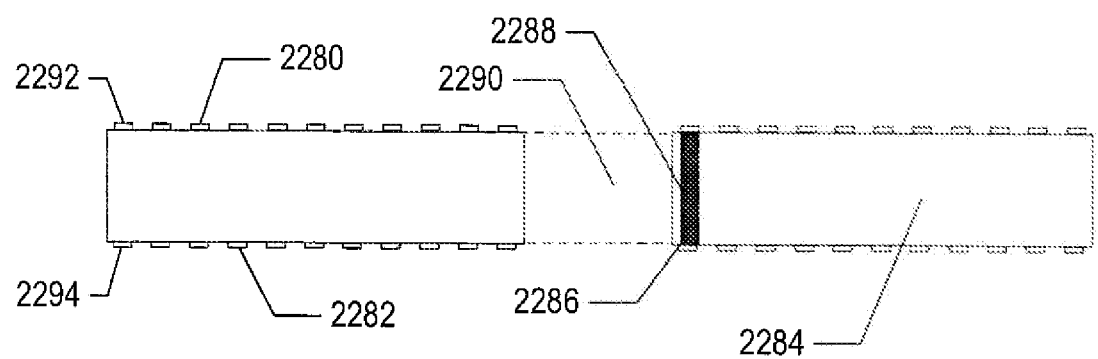
FIG. 22C illustrates a cross-section of a stator having two coil layers.

FIG. 22C illustrates a cross-section of a stator having two coil layers. A front coil layer 2280 and a back coil layer 2282 are laminated onto opposing sides of an insulating planar substrate 2284, such as a PCB. A via 2288 electrically connects the front coil layer 2280 to the back coil layer 2282 forming a coil wound in a single direction around the opening 2290. Connection pads 2292 and 2294 provide electrical contacts for connecting the coil to a drive current.

In some implementations, the coil layers that make up the stator are not interconnected to form a single coil. For example, cross-substrate via 2264 may be omitted, and the two front coil layers 2250 and 2252 are electrically driven independently from the two back coil layers 2256 and 2258. In other implementations, the two front coil layers 2250 and 2252 are counter-wound with respect to the two back coil layers 2256 and 2258. In this configuration, the magnetic fields generated in the opening 2270 by the two front coil layers oppose the magnetic field generated by the two back coil layers.

PCBs are suitable substrates for making the coils and motors described in the current document. A PCB can be constructed using a PCB process where layers of printed copper are separated by a hard laminate core, for example, using FR-4 glass-reinforced epoxy. A PCB made from polyimide can support a greater density of coils and increased mechanical flexibility. A PCB made from a ceramic, such as aluminum oxide, provides increased heat resistance. The stators described above can be constructed with any of these PCB materials.

In certain implementations, the coil layers described above are arranged to form one or more coils that overlay the front and/or back surfaces of a PCB. The coils form a stator that drives the armature of a motor.

Figure 23A:
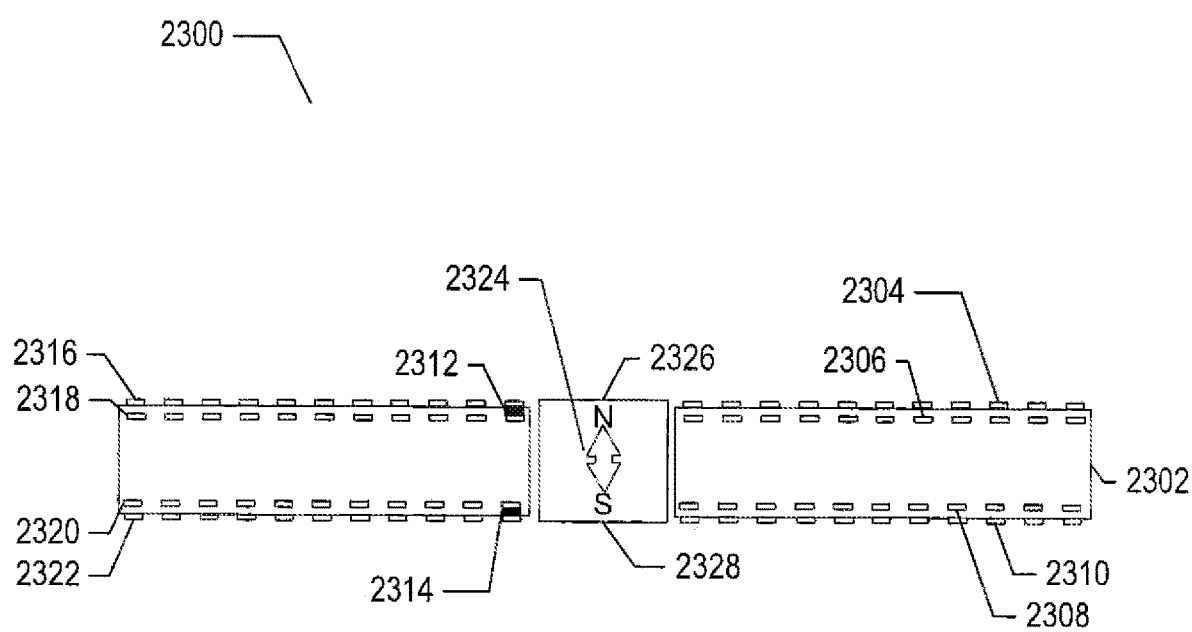
FIG. 23A illustrates a motor with a driving force that is perpendicular to the surface of a substrate.

FIG. 23A illustrates a motor with a driving force that is perpendicular to the surface of a substrate. The motor 2300 is constructed on a substrate 2302, such as a PCB. A first front coil layer 2304 and a second front coil layer 2306 overlay the front surface of the substrate 2302. A first back coil layer 2308 and a second back coil layer 2310 overlay the back surface of the substrate. A first via 2312 electrically connects the first front coil layer 2304 to the second front coil layer 2306 to form a front coil, and a second via 2314 electrically connects the first back coil layer 2308 to the second back coil layer 2310 to form a back coil. Front coil connections 2316 and 2318 provide electrical connectivity for driving the front coil, and back coil connections 2320 and 2322 provide electrical connectivity for driving the back coil.

A magnetic armature 2324 having a north pole 2326 and a south pole 2328 is positioned in an opening in the substrate 2302 through the center of the front and back coils. In order to drive the magnetic armature 2324 into vibration, a first oscillating current is applied to the front coil connections 2316 and 2318, and a second oscillating current is applied to the back coil connections 2320 and 2322. When the motor is operated, the current that flows through the front coil and the current that flows through the back coil flow with opposite directions of rotation. In certain implementations, this is accomplished by applying the same oscillating current to both front and back coils provided the coils are counter-wound. In an alternative implementation, where the coils are not counter-wound, the second oscillating current is 180 degrees out of phase with the first oscillating current. The resulting oscillating magnetic field provides a magneto-motive force to the north pole 2326 and the south pole 2328 in synchrony, driving the magnetic armature 2324 into vibration at a frequency proportional to the frequency at which the oscillating current is applied. In an alternative implementation, the second front coil layer 2306 is connected to the first back coil layer 2308 with a third conductive via to form a single-drive counter-wound stator that is driven with a single oscillating current to produce vibratory motion of the armature.

The magnetic armature is constructed from an axially polarized magnet. In one implementation, the magnet is a neodymium grade N-42 disk magnet. The size and shape of the magnet is adapted based, in part, on the desired vibration profile of the motor.

Figure 23B:
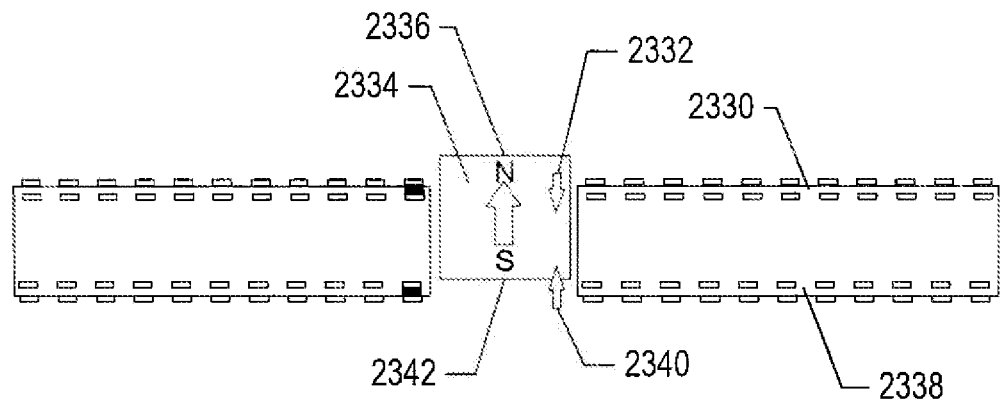
FIG. 23B illustrates the motor with a magnetic armature in an upward position.

FIG. 23B illustrates the motor with the magnetic armature in an upward position. When a first driving current is applied to a front coil 2330, the front coil 2330 generates a downward magnetic flux 2332. In response to the downward magnetic flux 2332, an upward vertical force is exerted on the north pole 2336. As the first driving current is applied, a second driving current is applied to a back coil 2338 and an upward magnetic flux 2340 is generated. In response to the upward magnetic flux 2340, an upward vertical force is exerted on the south pole 2342 of the magnet. In response to the upward forces, the magnetic armature 2334 moves upwards as illustrated in FIG. 23B.

Figure 23C:
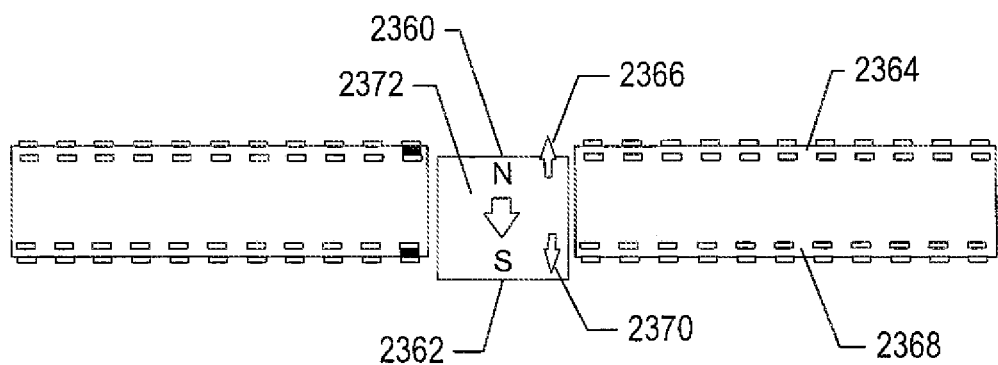
FIG. 23C illustrates the motor with a magnetic armature in a downward position.

FIG. 23C illustrates the motor with the magnetic armature in a downward position. When the direction of the first and second driving currents is reversed, the forces on the north pole 2360 and south pole 2362 are reversed. When the first reversed current is applied to a front coil 2364, the front coil 2364 generates an upward magnetic flux 2366, and a downward vertical force is exerted on the north pole 2360. When the second reversed current is applied to a back coil 2368 a downward magnetic flux 2370 is generated. A downward vertical force is exerted on the south pole 2362 of the magnetic armature 2372. In response to these two forces, the magnetic armature 2372 moves downwards as illustrated in FIG. 23C.

The drive currents are alternated to cause the magnetic armature to vibrate perpendicularly to the surface of the substrate at a chosen frequency. In one implementation, the front coil and back coil are counter-wound with respect to each other. The front and back coils are connected with a conductive via or wire and driven with one drive current. This arrangement causes the front and back coils to generate simultaneous magnetic flux signals in opposing directions, which, in turn, acts on the north and south poles of the magnetic armature to drive the magnetic armature into vibration.

In alternative implementations, additional coil layers are employed. For example, an 8-layer PCB can have four front coil layers and four back coil layers. The four front coil layers are connected to form a front coil, and the four back coil layers are connected to form a back coil. In certain implementations, the front coil and back coil are counter wound, and driven with a single drive current as explained above.

Figure 24A:
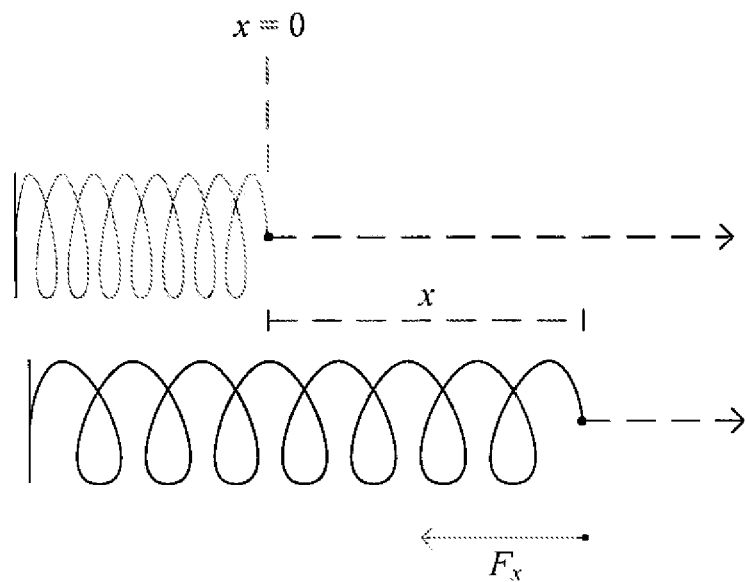
FIGS. 24A-D provide illustrations of various physical and mathematical concepts related to oscillation.
Figure 24B:
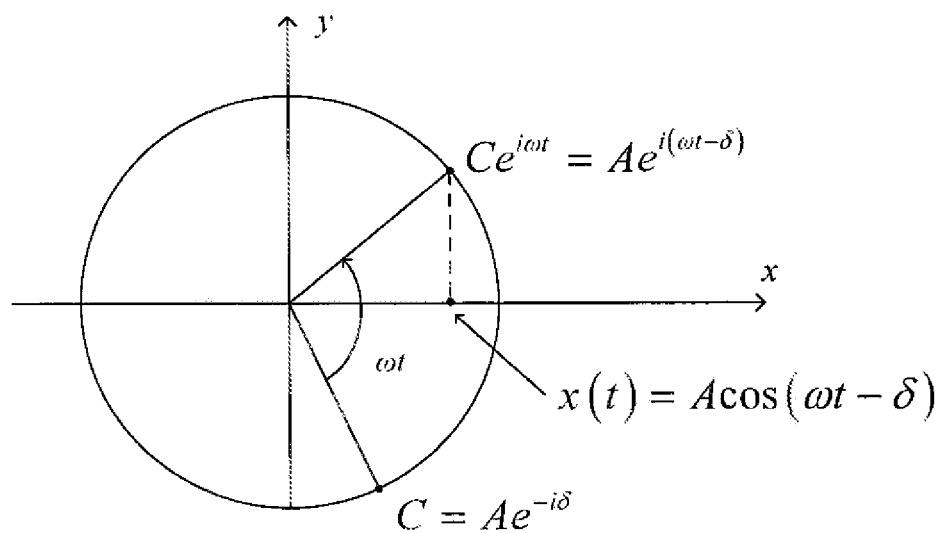

Next, a slightly more mathematically descriptive explanation of oscillation, resonance, and the Q factor is provided. FIGS. 24A-D provide illustrations of various physical and mathematical concepts related to oscillation. Great insight into harmonic oscillators can be provided by considering a simple, one-dimensional spring. FIG. 24A illustrates a spring that can be extended in the x direction. In a first diagram 2402, the spring is shown in an equilibrium, resting state with a point or mass 2404 at the end of the spring located at the position x=0. In a second diagram 2406, the spring has been pulled rightward, along the x direction, with the mass 2404 now located at a position x. As is well known, the extended spring has potential energy that results in a force $F_x$ 2408 that points in the opposite direction. In other words, were the spring released, the mass would travel leftward, oscillate back and forth, and eventually settle back to the 0 position shown in diagram 2402. Were the spring frictionless, however, the mass would continue to oscillate back and forth, in a manner similar to the linear ORM described in FIGS. 4A-B, indefinitely.

The frictionless spring can be mathematically modeled as follows:

$$F_x(x) = -kx,$$

where $F_x(x)$ is the force exerted by the spring:
x is the position of the spring end; and
k is the force constant.
The force constant k is a property of the spring, including all of the parameters that contribute to its elasticity, compressibility, and other physical characteristics of the spring. In more complex, realistic situations, many different factors may contribute to the force constants associated with harmonic oscillators, including interaction with other harmonic-oscillation modes within a physical device or module.

The potential energy of the spring system illustrated in FIG. 24A can be modeled as:

$$U(x) = \frac{1}{2}kx^2,$$

where U(x) is the potential energy of the spring system. Using Newton's second law, the equation that models the force exerted by the spring when it is extended or compressed can be modeled as a simple, second-order differential equation:

$$m\ddot{x} = Fx = -kx,$$

where m=mass of oscillator; and $$\ddot{x} = \frac{d^2x}{dt^2}.$$

This differential equation can be simplified as:

$$\ddot{x} = \frac{-k}{m}x = -\omega^2 x,$$

where $$\omega = \sqrt{\frac{k}{m}}.$$

The general solution for this simple, second-order differential equation is, in one form:

$$x(t) = C_1 e^{i\omega t} + C_2 e^{-i\omega t}.$$

In this equation, $C_1$ and $C_2$ are arbitrary constants that are determined by the initial conditions of a particular spring system. This solution can be recast as:

$$x(t) = B_1 \cos(\omega t) + B_2 \sin(\omega t),$$

where $B_1 = C_1 + C_2$; and
$B_2 = i(C_1 - C_2)$.

A final, perhaps most elegant form of the solution is:

$$x(t) = \text{Re}[Ae^{i(\omega t - \delta)}],$$

where $Ae^{-i\delta} = B_1 - iB_2 = C$.

In this equation, A is the amplitude of the oscillation, ω is an angular velocity of the oscillation, as discussed above with reference to FIG. 24B, and δ is an initial phase offset. This final expression describes the mapping of a rotation to linear harmonic oscillation, as discussed above with reference to FIG. 4B, shown again, in FIG. 24B, with annotations taken from final expression for the solution to the differential equation.

As mentioned above, a frictionless spring would continue to oscillate indefinitely after being released from an extended position. However, in actual systems, there are always resistive forces, such as friction, that dampen the oscillation so that, over time, the amplitude of the oscillation decreases and the oscillation finally stops. This more complex and more realistic scenario can be modeled by including a resistive-force term in the second-order differential equation:

$$m\ddot{x} + b\dot{x} + kx = 0,$$

where $-b\dot{x}$ is a resistive force; and $$\dot{x} = \frac{dx}{dt}.$$

Figure 24C:
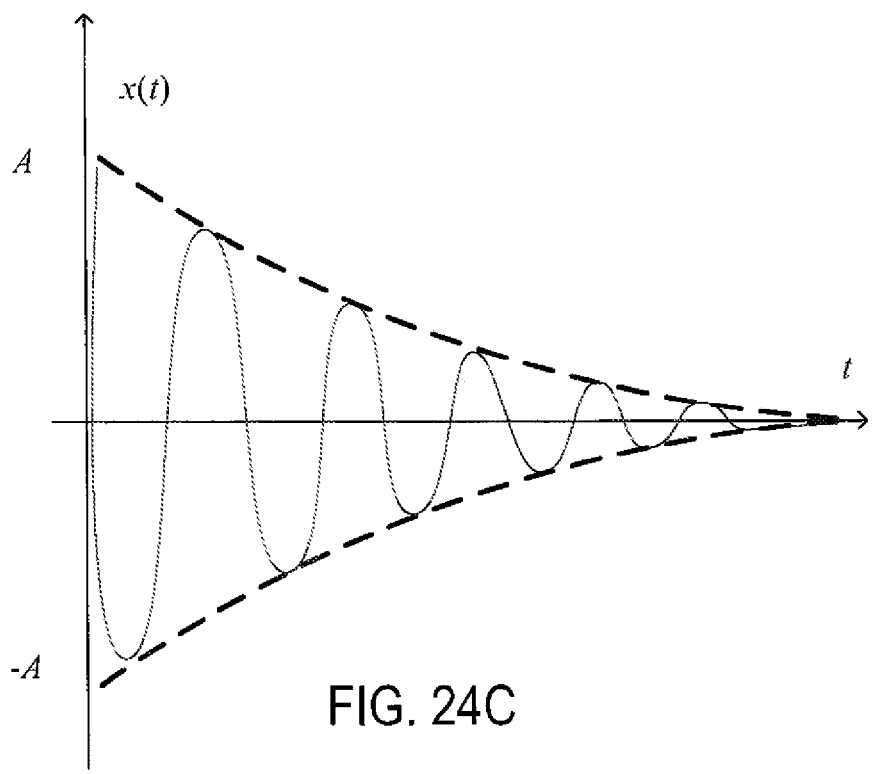
Figure 24D:
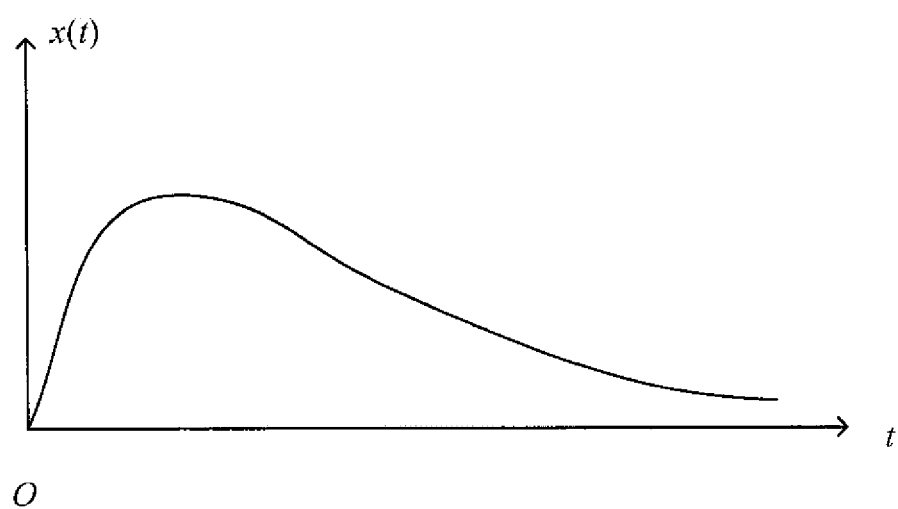

Defining several new constants as follows:

$$\beta = \frac{b}{2m} = \text{damping constant, and}$$

$$\omega_0 = \sqrt{\frac{k}{m}} = \text{natural frequency}$$

and solving the above modified second-order ordinary differential equation, the following result is obtained:

$$x(t) = Ae^{-\beta t} \cos(\omega_1 t - \delta)$$

where $\omega_1 = \sqrt{\omega_0^2 - \beta^2}$; and
$\beta < \omega_0$.

when, as indicated above, the damping constant β has a value less than the value of the natural frequency $\omega_0$, the system in under-damped and the amplitude of the oscillations decrease non-linearly, as shown in FIG. 24C. When β is greater than $\omega_0$, the system is over-damped, in which case only a single oscillation may occur, as shown in FIG. 24D.

Most physical systems have one or more natural frequencies at which they oscillate, when mechanically perturbed from their equilibrium states. In ORMs, a motor is used to continuously perturb the system in order to drive the ORM to oscillate and generate vibration. A device in which an ORM is incorporated vibrates in response to a driving vibration generated by the ORM. In this case, an external driving force F (t) is applied by the ORM to drive continuous oscillation of the device in which it is included. An external-force-driven linear oscillator can be modeled by the following expression:

$$m\ddot{x} + b\dot{x} + kx = F(t),$$

where F (t) is an external driving force.
With the definition:

$$f(t) = \frac{F(t)}{m},$$

the mathematical model becomes:

$$\ddot{x} + 2\beta\dot{x} + \omega_0^2 x = f(t).$$

A solution for this expression is:

$$x(t) = A\cos(\omega t - \delta)$$

where $f(t) = f_0 \cos(\omega t)$:

$$A^2 = \frac{f_0^2}{(\omega_0^2 - \omega^2)^2 + 4\beta^2\omega^2}; \text{ and}$$

$$\delta = \arctan\left(\frac{2\beta\omega}{\omega_0^2 - \omega^2}\right).$$

In this expression, the constant ω is the driving frequency of the driving force, which is somewhat less than the natural frequency $\omega_0$. As can be seen in the expression for the square of the amplitude, which is proportional to the energy of the vibration, the amplitude is maximized when the denominator of this expression is a value approaching 0. Maximizing the expression can be carried out either by varying the physical device in order to vary the natural frequency $\omega_0$, while the external-driving-force frequency remains fixed ω, or by varying the driving frequency ω when the natural frequency $\omega_0$ is fixed. When $\omega_0$ varies and ω is fixed, A is maximum when $\omega_0 = \omega$; and when $\omega$ varies and $\omega_0$, A is maximum when $\omega = \sqrt{\omega_0^2 - 2\beta^2}$. This is where the term "resonance" arises. The resonant frequency is the frequency at which the amplitude A is maximized. As can be seen, this occurs, in general, when the driving frequency of the motor or other mechanical-force-input mechanism has a frequency close to or equal to the natural frequency $\omega_0$ of the physical system. A quality factor Q can be expressed, in terms of the natural frequency and damping factor, as:

$$Q = \frac{\omega_0}{2\beta}.$$

This is the reciprocal of the ratio of the width of the amplitude peak at half its maximum value to the natural frequency $\omega_0$.

An ORM Controller

Figure 25:
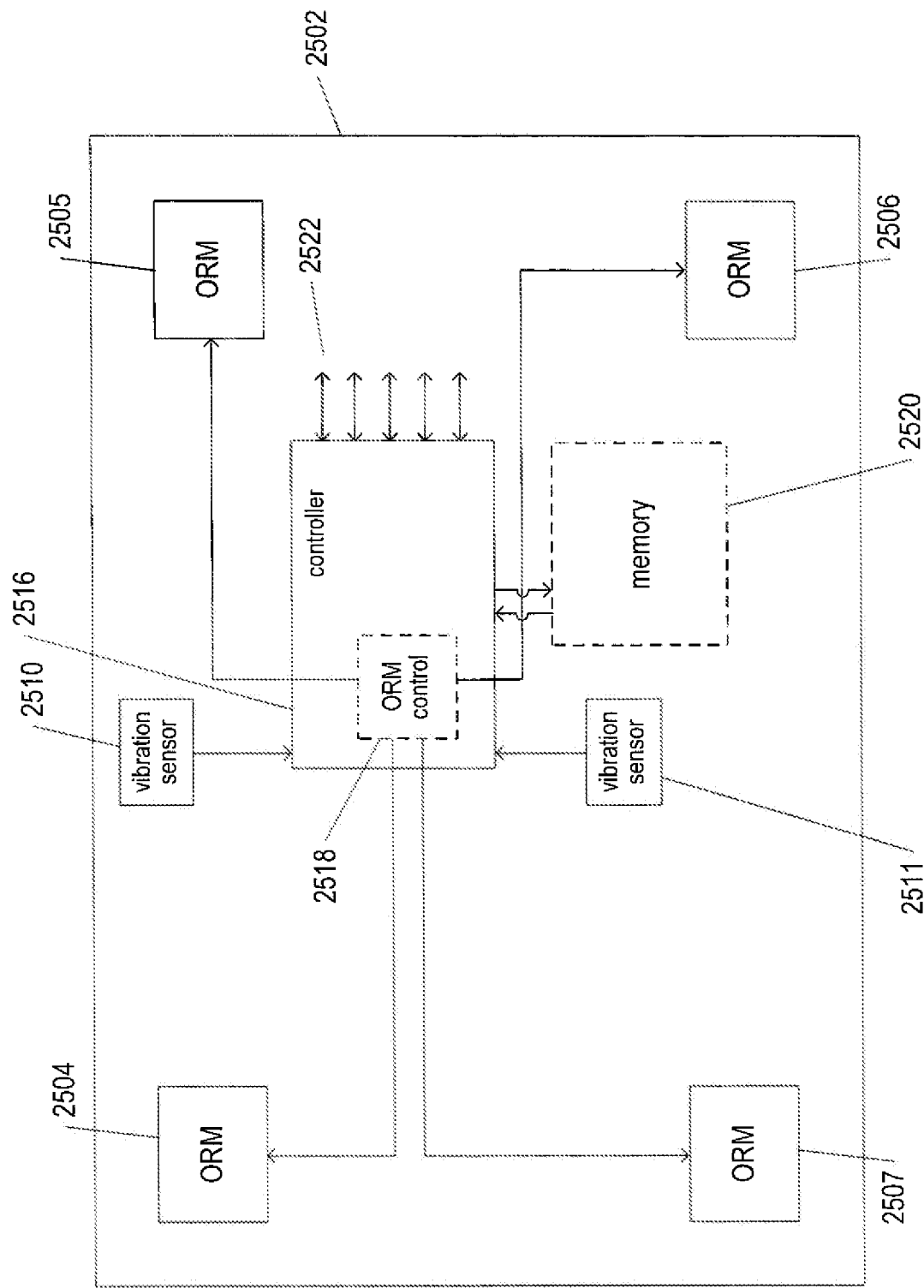
FIG. 25 shows a block diagram of a generic device, appliance, or system that employs ORMs to generate vibration.

FIG. 25 shows a block diagram of a generic device, appliance, or system that employs ORMs to generate vibration. The vibration may be generated for application to people, animals, or objects for various purposes, including therapeutic purposes, or may instead be generated to provide haptic feedback, such as vibration in mobile phones, vibration-based notification, or vibration-based communications. Thus, the current document is directed to particular features of a generic ORM-containing device or system that may be used in a wide variety of different types of applications or included in larger devices and systems. In FIG. 25, the device, appliance, or system is represented by an outer rectangle 2502. The device includes four ORMs 2504-2507. The ORMs may be of any of many different types, including the types of ORM discussed above. In general, the ORMs convert input energy, such as an electrical current, to mechanical vibration. The device also includes several vibration sensor 2510-2511. There are a variety of different types of vibration sensors, including piezoelectric accelerometers that measure acceleration in one, two, or three different orthogonal directions. Other types of sensors may include membranes attached to moving coils that generate electronic signals when the membrane vibrates, similar to a reverse audio speaker. In addition, the device or system contains a controller 2516. The controller includes ORM control logic 2418 that transmits control signals, in certain cases electrical signals that also serve to power the ORMs. The ORM control logic may be implemented as a sequence of processor instructions, when the controller 2516 is a processor or processor-controlled controller subsystem. In many of the ORM devices and systems, the controller accesses some type of electronic memory 2520, which stores processor instructions and other types of data for implementing ORM control logic 2518. Not shown in FIG. 25 are various standard components and signal lines, including a power supply and power-transmitting circuitry, display screens, push buttons, other user-interface-related components, and other types of logic and logic-controlled subcomponents particular to particular types of devices, such as transceivers and communications subsystems within mobile phones. A set of double-headed arrows, such as double-headed arrow 2522, represent the fact that the controller may control many other subcomponents and features of the device or system in addition to the ORMs.

In the previous discussion of oscillation, vibration, and resonance, simple mathematical models for one-dimensional harmonic oscillation were developed. However, in the generic ORM-containing device or system, there may be multiple ORMs, activation of which produce very complex three-dimensional spatial vibration. Vibration modes of individual ORMs may couple to produce a large number of complex spatial-vibration modes. The physical characteristics of these vibration modes may be highly dependent on the exact geometry, weight and balance, and the material type of the housing and internal components of a particular device or system. As a result, there may be numerous different natural resonant frequencies for the device or system.

Figure 26A:
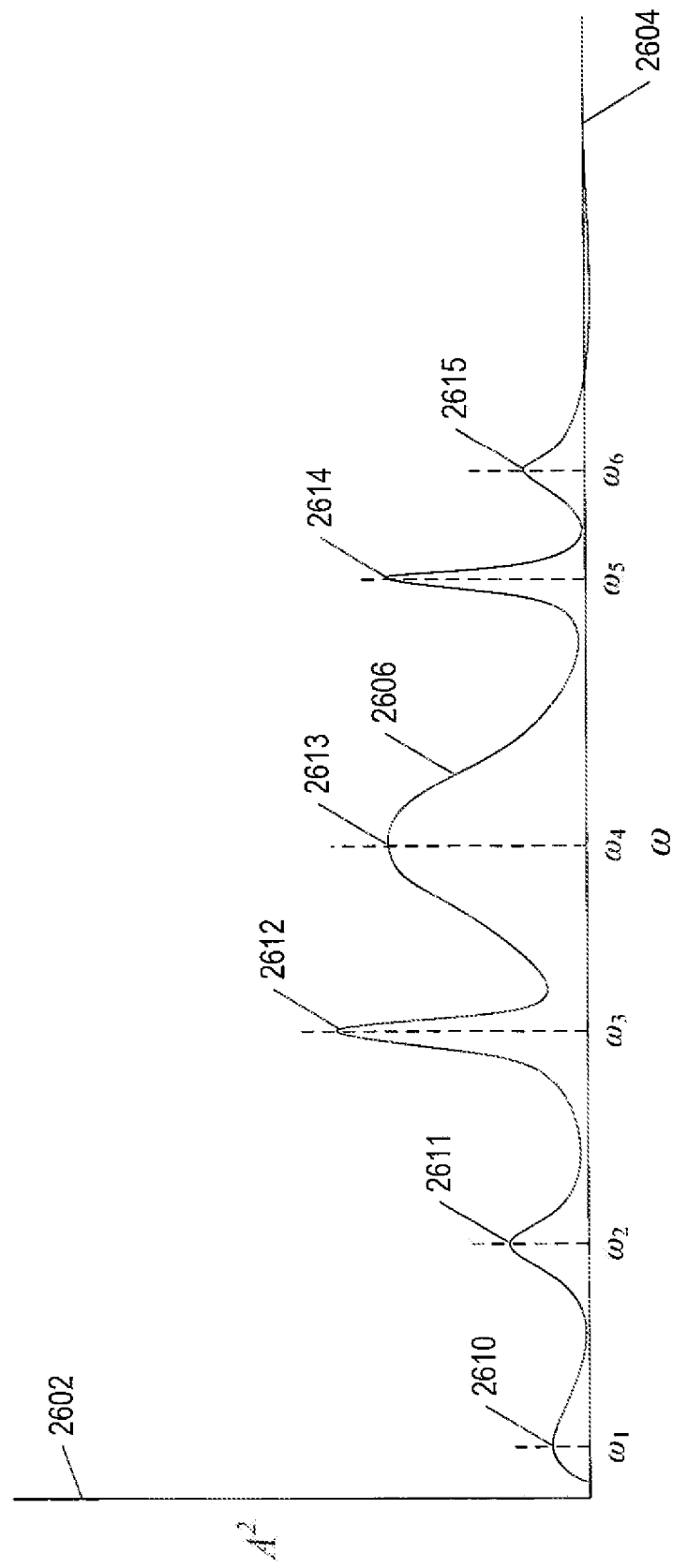
FIGS. 26A-B illustrate multiple resonant frequencies within a device or system.
Figure 26B:
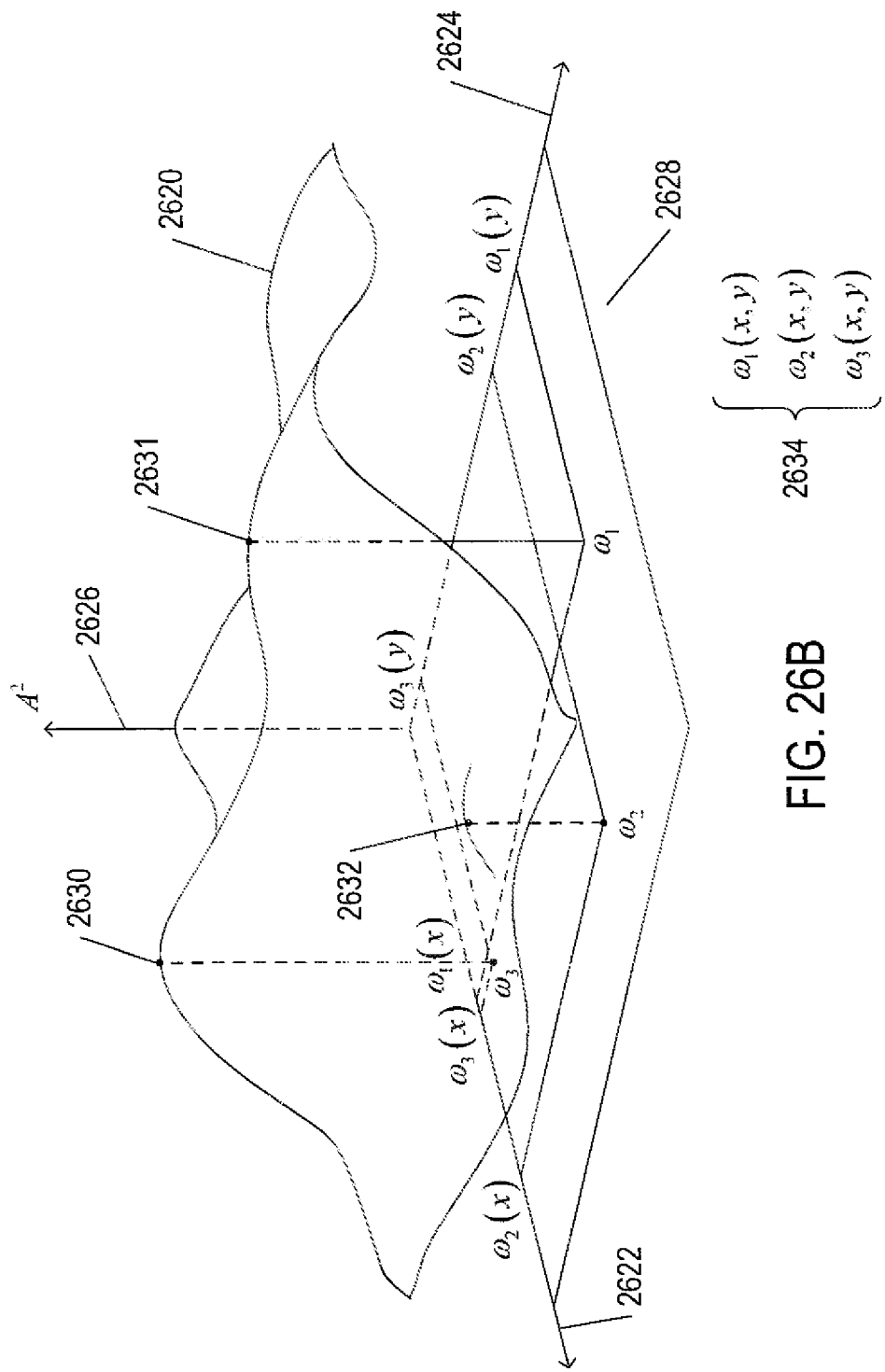

FIGS. 26A-B illustrate multiple resonant frequencies within a device or system. In FIG. 26A, the vibrational energy, or square of the amplitude of the vibration, is plotted with respect to frequency. The vertical axis represents the energy and vibration 2602 and the horizontal axis represents the frequency of vibration 2604. The plotted curve 2606 shows numerous different vibration-energy peaks 2610-2615. The heights and positions of these peaks along the frequency axis 2604 may vary considerably with slight changes to the physical characteristics of a device or system that is vibrated by ORM components.

FIG. 26B shows a more complex type of vibration-response plot. The vibration response is represented by a surface 2620 in the plot shown in FIG. 26B. Measured amplitudes or vibration energies produce a surface 2620 in a three-dimensional Cartesian coordinate system that includes an x-direction vibration frequency axis 2522, a y-direction frequency axis 2624, and a vibration-energy axis 2626. The device or system for which the vibration-response surface 2620 is obtained includes two ORMs, one of which generates vibrations in the x direction and one of which generates vibrations in the y direction. The two ORMs can be independently controlled to generate vibrations in their respective directions at different frequencies. The x, y plane 2628 below the plotted vibration-energy surface 2620 represents all possible x-direction vibration frequencies and v-direction vibration frequencies that can be generated by the two ORMs within the device or system. As shown in FIG. 26B, the surface includes three local vibration-energy maxima 2630-2632. These three local maxima are each associated with x-direction frequency and y-direction frequency components 2634. Thus, in the case shown in FIG. 26B, two ORMs which generate vibrations in two different directions within the device or system may generate a complex vibration-response surface with respect to the frequencies at which the two ORMs are operated. Depending on the types and numbers of ORMs, the vibration response may be a hyper-dimensional surface in a much higher dimensional frequency space. In all cases, however, the device or system generally has some number of characteristic resonant frequencies that represent maximal vibration energy or amplitude with respect to the frequencies at which individual ORMs are driven with the device or system. In general, the number of resonant frequencies is equal to the number of vibrational degrees of freedom in the device, appliance, or system.

Figure 27:
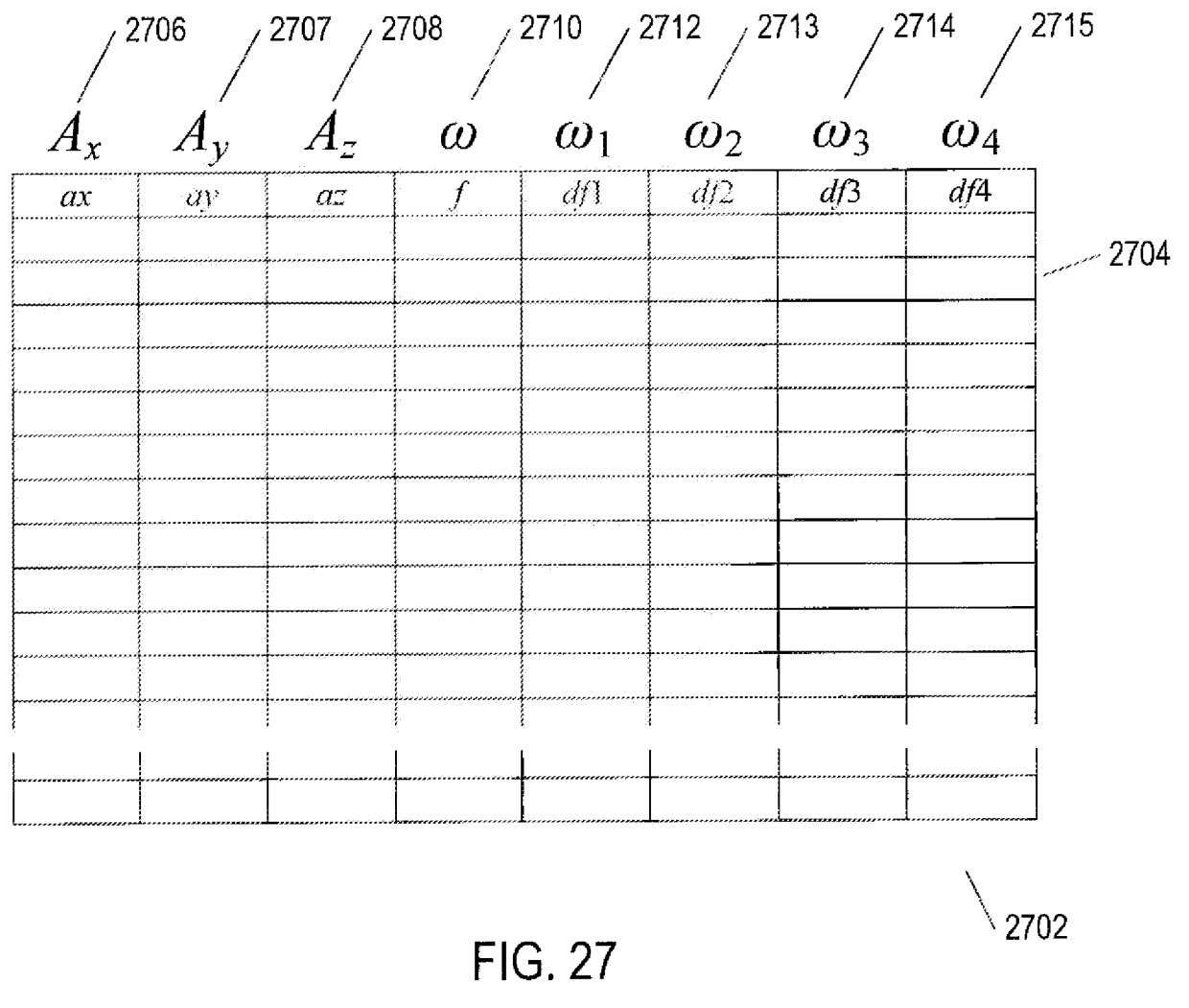

A vibration-response obtained for a device or system by measuring sensor output can be used to identify and tabulate the natural resonant frequencies for the device or system. FIG. 27 provides an example resonant-frequency table for the generic ORM-containing device discussed above with reference to FIG. 25. Each row in the resonant-frequency table 2702, such as row 2704, represents a local maxima, or peak, in the vibration response for the generic device. In the example table shown in FIG. 27, each peak is characterized by an amplitude in the x 2706, y 2707, and z 2708 directions as well as by the frequency of vibration represented by the peak ω 2710 and by the frequency at which each of the four ORMs are driven by the ORM control logic 2712-2715. Thus, to achieve maximum vibration energy of the vibration of the generic device at any of the resonant frequencies for the device, the ORMs are driven at the control frequencies for that resonant frequency.

FIGS. 28A-C illustrate how an ORM control scheme combines with a resonant frequency to produce a vibration response. FIG. 28A shows the vibration-response for a simple device, vibration of which is stimulated by a single ORM. There is a single natural frequency $\omega_1$ 2802 corresponding to the vibration-energy peak 2804 in the vibration-response plot of vibration energy with response to frequency. FIG. 28B shows a plot of the frequency of vibration generated by an ORM with respect to time over a time interval that represents an ORM control scheme. In FIG. 28B, the vertical axis 2810 represents the frequency at which the ORM is driven by ORM-control input and the horizontal axis 2812 represents time. The control curve 2814 indicates that the ORM is non-linearly driven over an initial time period 2816 to the natural frequency $\omega_1$ 2818 for the device in which the ORM is included. At a final point in time $t_f$ 2820, input to the ORM is discontinued. FIG. 28C shows a vibration-response curve for the device containing the ORM when the ORM is operated according to the control curve 2814 discussed above with reference to FIG. 28B. As shown in the vibration-response curve 2822, there is an initial lag time 2824 following initiation of the control scheme before a perceptible device vibration occurs, at time $t_i$ 2826. The vibrational energy, or amplitude of vibration, very steeply increases from this point on as the ORM is controlled to approach and equal the natural frequency an for the device. At time $t_f$ 2820, the vibrational energy of the device relatively steeply falls, since the ORM is no longer being driven. However, the vibrational energy does not immediately fall to 0, as in the control curve, but over a short period of time 2828 after the ORM ceases to be driven.

Figure 29:
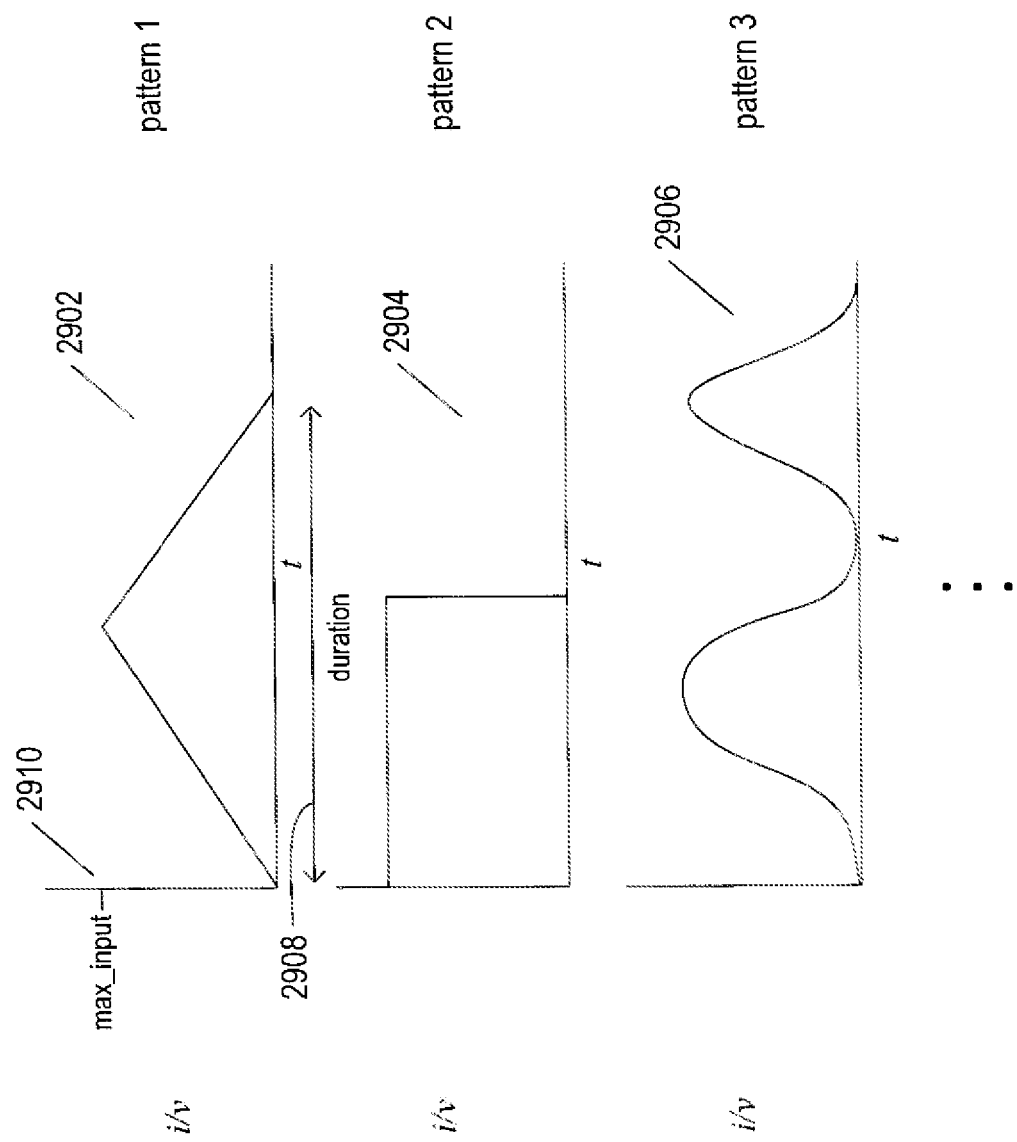
FIG. 29 shows a few examples of control patterns that may be applied to ORMs by the control logic within the generic device.

The generic device, as discussed above, contains a memory that may store various types of control schemes, or control patterns, for the ORMs that are controlled by the ORM control logic. FIG. 29 shows a few examples of control patterns that may be applied to ORMs by the control logic within the generic device. The example patterns include a linear ramp-up and ramp-down pattern 2802, a constant control over a specified duration of time 2904, and an oscillating control 2906. The patterns may be parameterized by the duration of the pattern 2908 and the maximum input to the ORM 2910. The input may be specified as the current or voltage, for certain types of ORMs. Other ORMs may be controlled by digital control signals in which numerically encoded commands are transmitted to the ORM. The control patterns can be scaled in both time and frequency in order to generate a variety of equivalent vibration responses for the ORM with similar forms, but different maximum amplitudes and over different periods of time.

Figure 30:
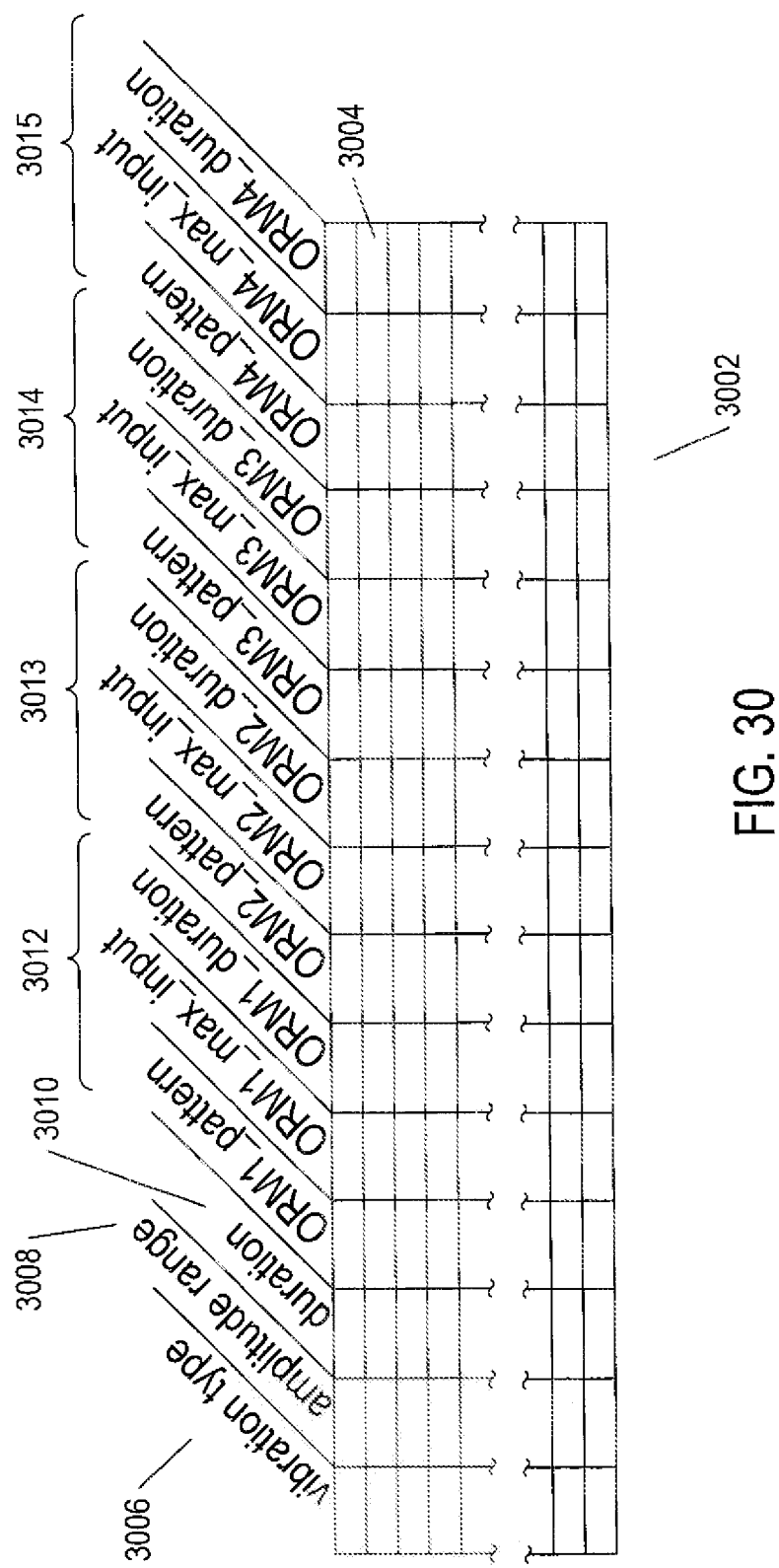
FIG. 30 shows an example vibration-type table that may be prepared for the generic device shown in FIG. 25.

A set of scalable control patterns, such as those shown in FIG. 29, and a table of resonant frequencies, such as that shown in FIG. 27, can be used to generate a table of different types of vibration that can be generated in the generic device by controlling the ORMs within the device according to scaled control patterns. FIG. 30 shows an example vibration-type table that may be prepared for the generic device shown in FIG. 25. Each row in the table, such as row 3004, represents a different vibration type that can be produced in the generic device by controlling the ORMs within the device. For example, a cell phone may use a variety of different haptic vibration signals to alert the cell phone user of many different types of events. Each different vibration signal corresponds to a different vibration-type. Each vibration type is characterized by a vibration-type identifier 3006, an amplitude range for the vibration 3008, a reference duration for the vibration 3010, and the control pattern and scaling parameters for the pattern for each of the ORMs 3012-3015, Each vibration type can be scaled within the amplitude range and may also be scaled for a desired duration.

By using either external or internal sensors to characterize the natural resonant frequencies for a physical device or system that contains ORMs, a large number of different vibration responses for the physical device or system can be compiled based on the resonant frequencies as well as a set of ORM control patterns. In alternative vibration-control approaches, the different types of vibration responses may be computed, on the fly, rather than tabulated based on a set of control patterns. However, in all cases, characterization of the resonant frequencies of the device or system that is vibrated by the ORMs contained within the device or system is a necessary step in producing predictable vibration responses via ORM control.

Figure 31:
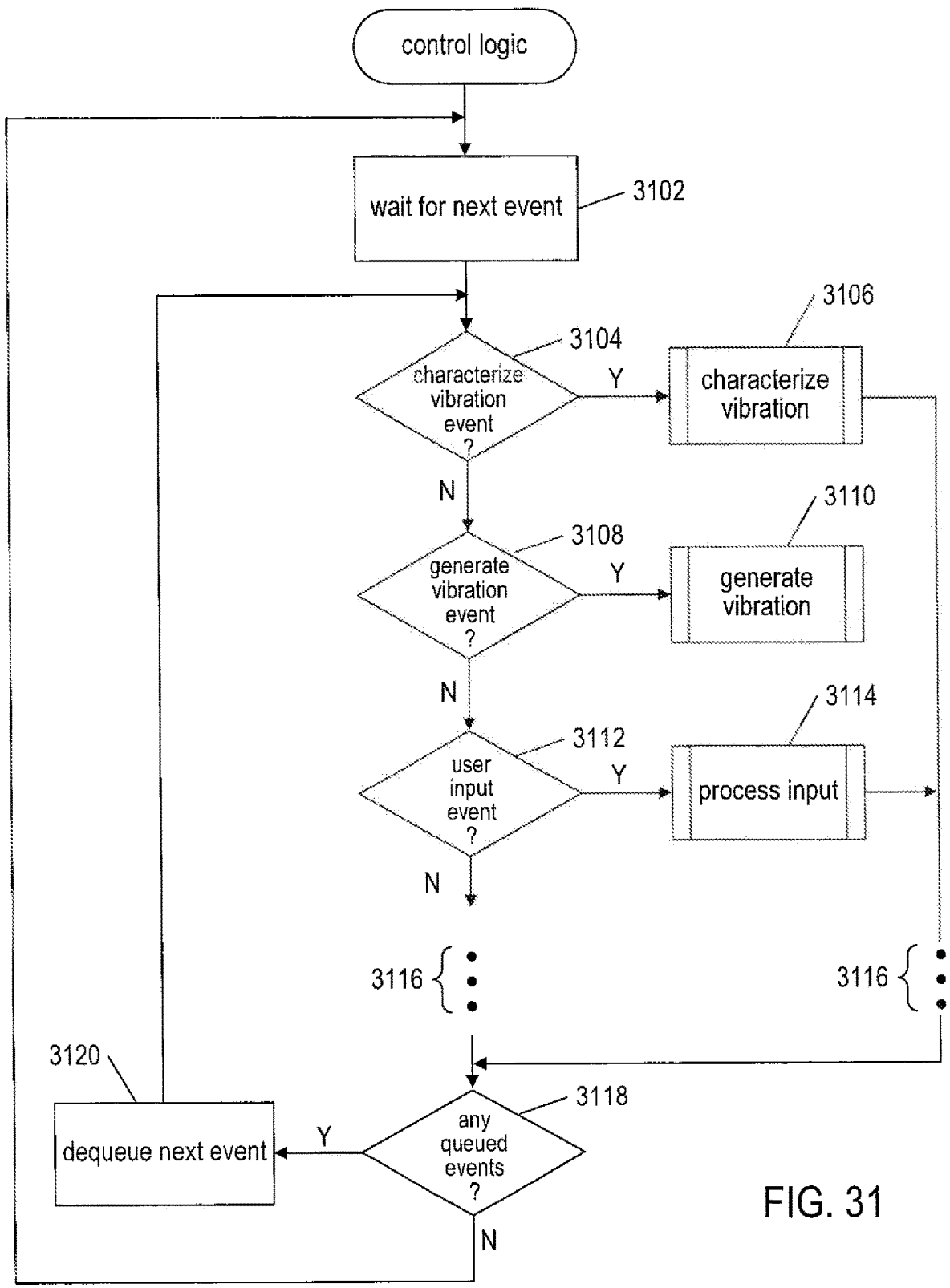
FIGS. 31-36 provide control-flow diagrams to illustrate control logic used in the generic device, discussed above with reference to FIG. 25, to produce well-defined vibration modes or vibration responses in the physical device or system.

FIGS. 31-36 provide control-flow diagrams to illustrate control logic used in the generic device, discussed above with reference to FIG. 25, to produce well-defined vibration modes or vibration responses in the physical device or system. FIG. 31 illustrates the inner control loop of the control logic within the physical device shown in FIG. 25. The inner control loop waits, in step 3102, fora next event and then handles the event that occurs. When the event is a characterize-vibration event, as determined in step 3104, the routine characterize vibration is called to handle the event in step 3106. When the event is a generate-vibration event, as determined in step 3108, a generate-vibration routine is called in step 3110 to generate a vibration in response to the generate-vibration event. When the next event is a user-input event, as determined in step 3112, a process-input routine is called, in step 3114, to handle the input from the user. Ellipses 3116 are used in FIG. 31 to indicate that many other types of events are handled by the inner event loop of the control logic. When, after handling the most recently occurring event, there are other events that are queued for handling which arose while handling the most recently handled event, as determined in step 3118, then a next event is dequeued in step 3120 with control flowing back to step 3104. Otherwise, control flows back to step 3102 where the inner event loop waits for a next event to occur.

The characterize-vibration event 3104 is an event that is raised by control-logic routines, timer-expiration handlers, and by other control logic in order to control the ORMs and sensors within the generic device to carry out a re-characterization of the vibration-response for the physical device, as discussed above with reference to FIGS. 26A-B, in order to update the resonant-frequency table, such as the resonant-frequency table discussed above with reference to FIG. 27. In devices that employ a vibration-type table, such as the vibration-type table discussed with reference to FIG. 30, the vibration-type table is also updated following update of the resonant-frequency table.

A generate-vibration event is raised by control logic in order to vibrate the generic device for a variety of different reasons. As one example, the device may be vibrated in response to user input. As another example, the device may be vibrated when the control logic determines that any of various alert conditions have arisen. As yet another example, generate-vibration events may be raised in order to communicate information to a device user.

Figure 32:
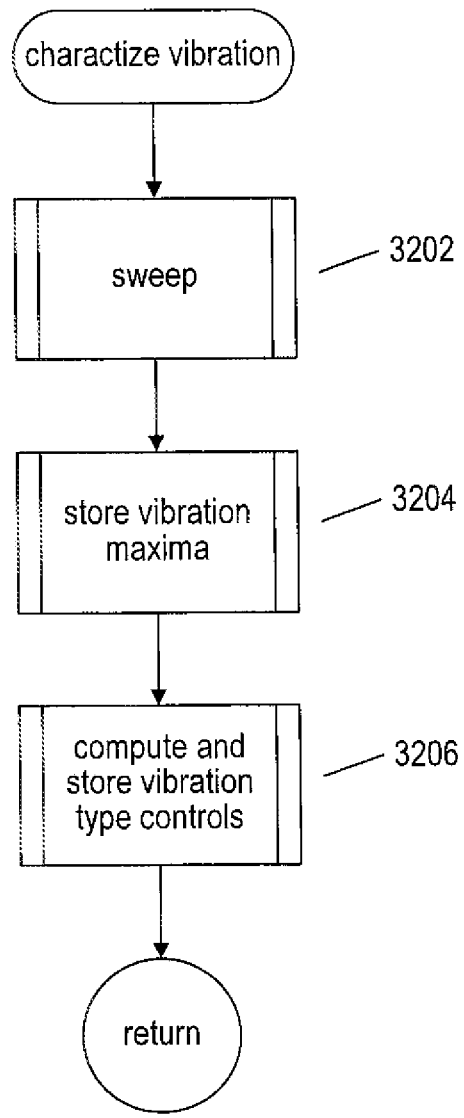

FIG. 32 provides a control-flow diagram for the characterize-vibration event handler, called in step 3106 of FIG. 31. In step 3202, the routine calls a subroutine sweep in order to generate a sampling of a vibration-response curve, surface, or hyper-dimensional surface. In step 3204, the routine calls a store-vibration-maxima subroutine in order to identify the resonant frequencies from the curve or surface sampled in step 3202. Finally, in step 3206, the routine calls a compute-and-store-vibration-type-controls subroutine in order to update the vibration-type table based on the new resonant-frequency determination made in steps 3202 and 3204.

Figure 33:
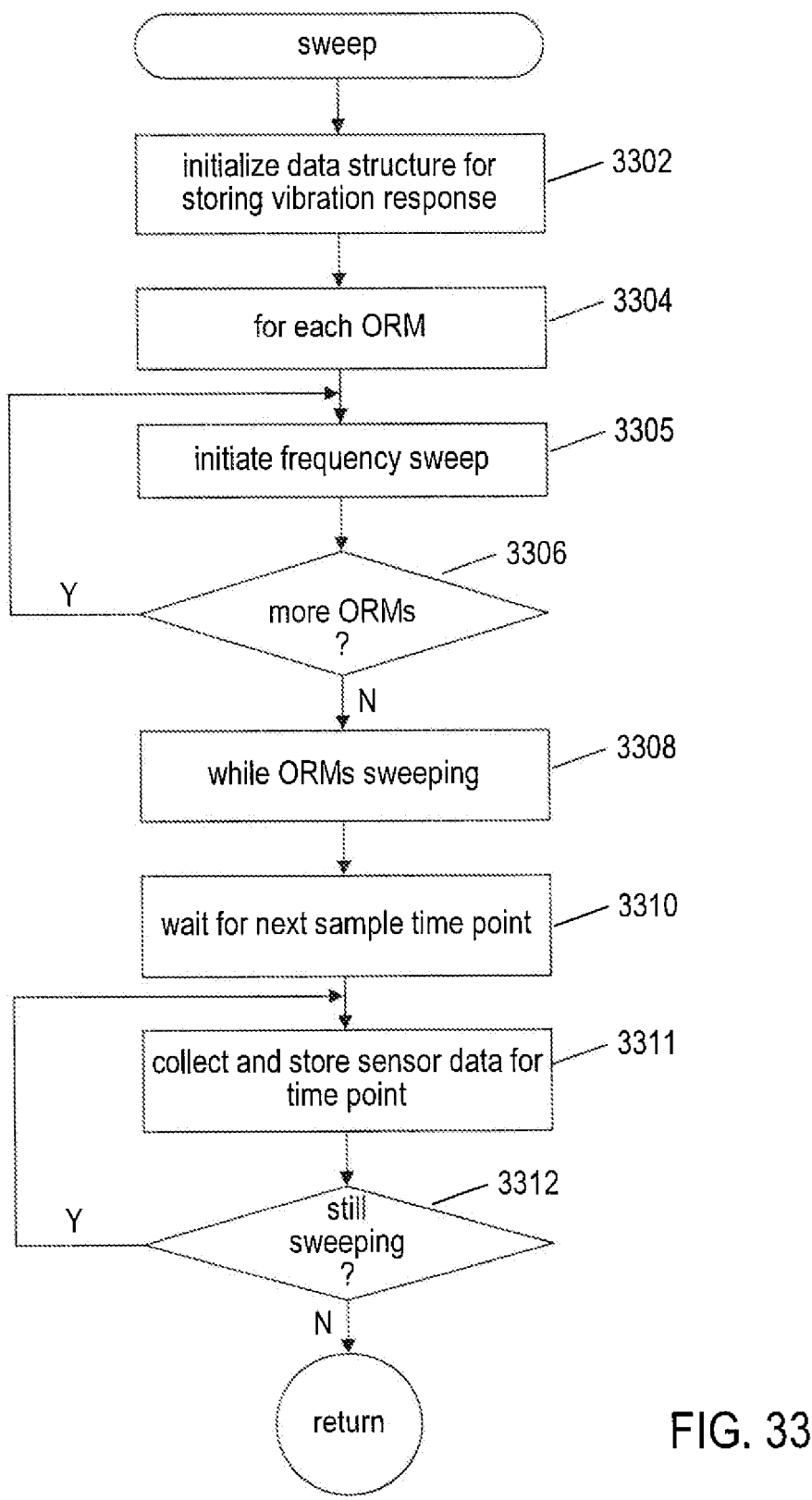

FIG. 33 provides a control-flow diagram for the subroutine sweep, called in step 3202 of FIG. 32. In step 3302, the subroutine sweep initializes a data structure for storing a vibration response. As discussed above, the vibration response may be a sampled curve, sampled surface, or sampled hyper-dimensional surface. In the for-loop of steps 3304-3306, a frequency sweep of each ORM is initiated. A frequency sweep is a control pattern that continuously sweeps each ORM over a wide range of driving frequencies. Each ORM repeats a single frequency sweep over a different time interval, so that following a number of iterations, the multi-dimensional ORM-driving-frequency space can be sampled. Then, in the for-loop of steps 3308-3312, the sweep routine continuously samples the vibration amplitude or vibrational energy produced in the device, using sensor output, while the driving-frequency sweeps take place. There are, of course, many alternative methods for sampling the multi-dimensional driving-frequency space in order to generate a sampled vibration-response curve, surface, or hyper-surface.

Figure 34:
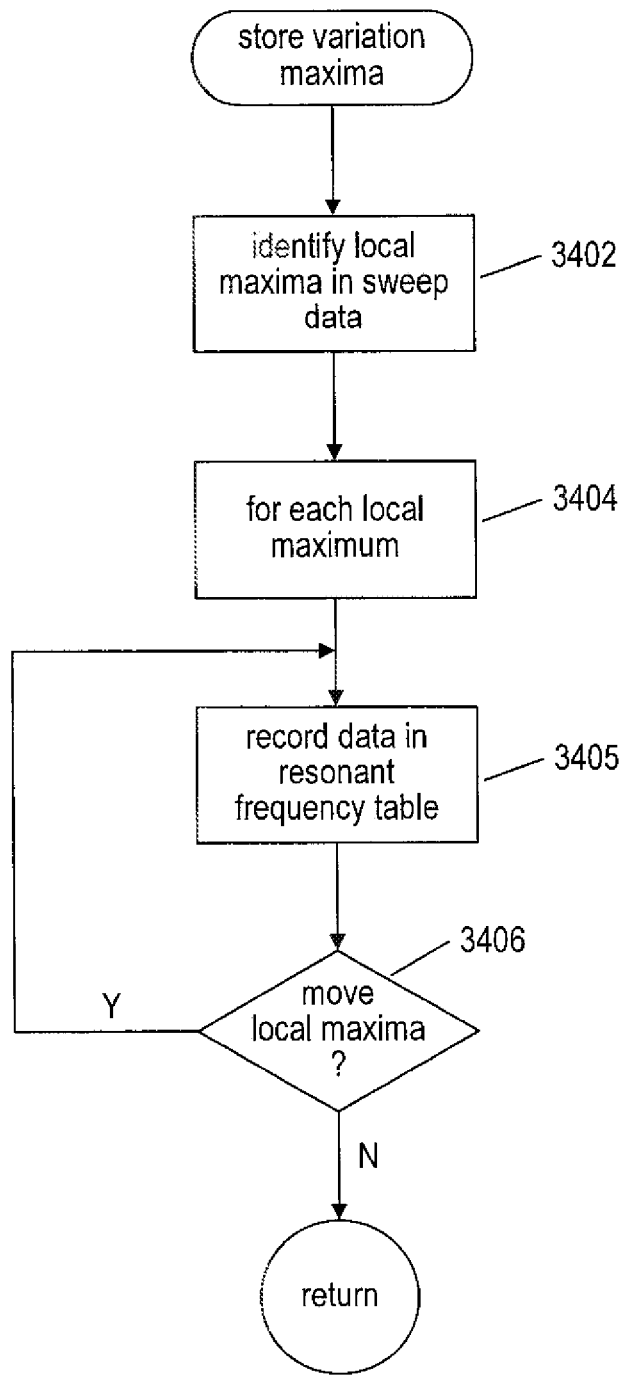

FIG. 34 provides a control-flow diagram for the store-variation-maxima subroutine called in step 3204 of FIG. 32. In step 3402, the routine identifies local maxima in the vibration-response curve or surface produced by the sweep routine. There are many well-known mathematical techniques for identifying local maxima within a curve, surface, or hyper-surface. Then, in the for-loop of steps 3404-3406, data that characterizes each of the local maxima are tabulated in the resonant-frequency table.

Figure 35:
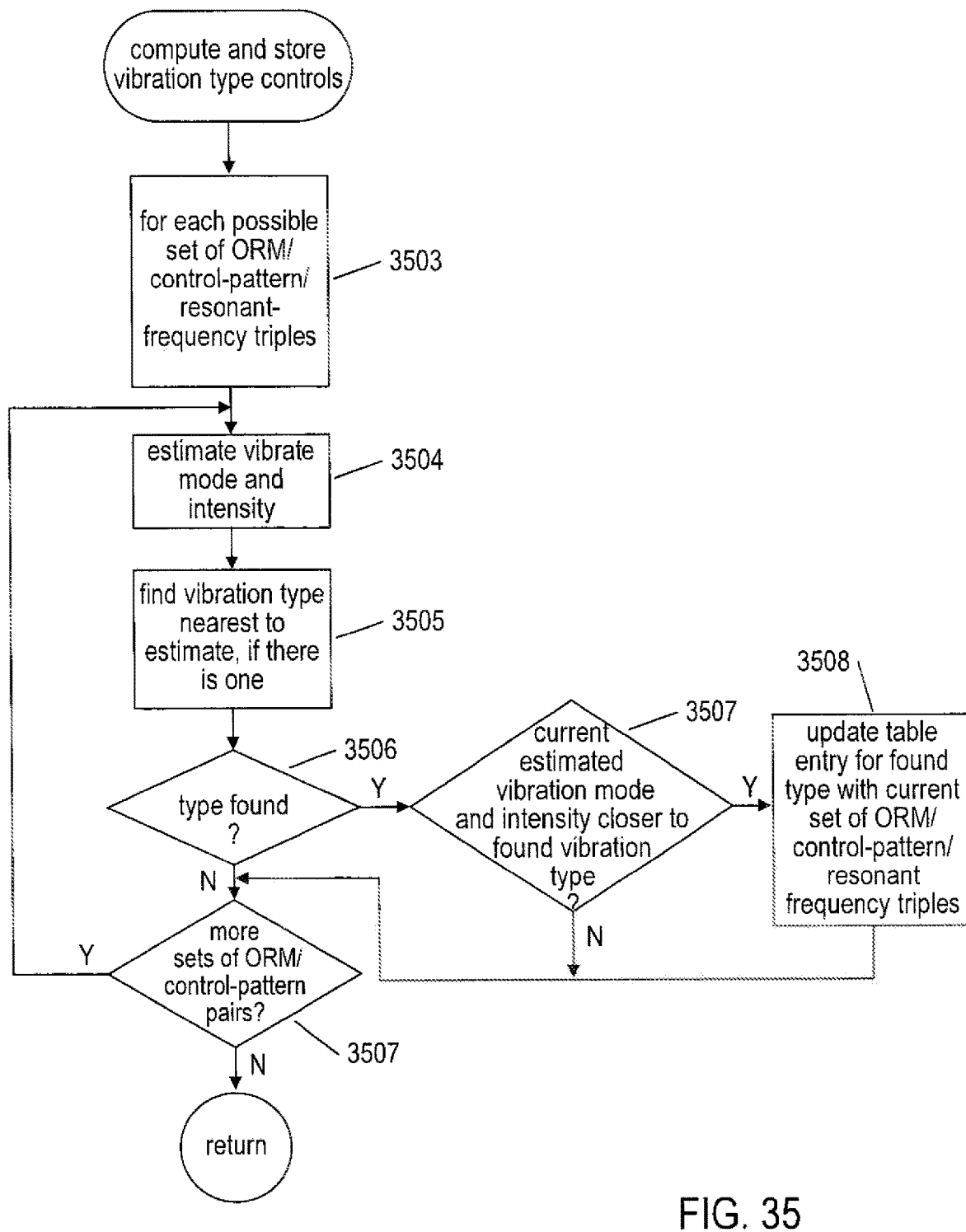

FIG. 35 provides a control-flow diagram for the compute-and-store-vibration-type-control subroutine called in step 3206 of FIG. 32. In a for-loop of steps 3503-3509, each possible set of ORM/control-pattern/resonant-frequency triples is considered. The currently considered triple is used to estimate the vibration mode and intensity of the resulting device vibration, in step 3504. In step 3505, the nearest vibration-type to the estimated vibration mode is identified, if there is one. If a nearest vibration type is found, as determined in step 3506, and when the current ORM/control-pattern/resonant-frequency triple provides a device response closer to the vibration type than the control parameters currently associated with the vibration-type, as determined in step 3507, then, in step 3508, the vibration-type table entry for the found vibration type is updated with the current control parameters represented by the currently considered ORM/control-pattern/resonant-frequency triple. Of course, in certain cases, there may be too many possible ORM/control-pattern/resonant-frequency triples to consider in a reasonable amount of time, in which case the resonant-frequency data may be used in other ways to find the best control parameters for the vibration types in the vibration-type table.

Figure 36:
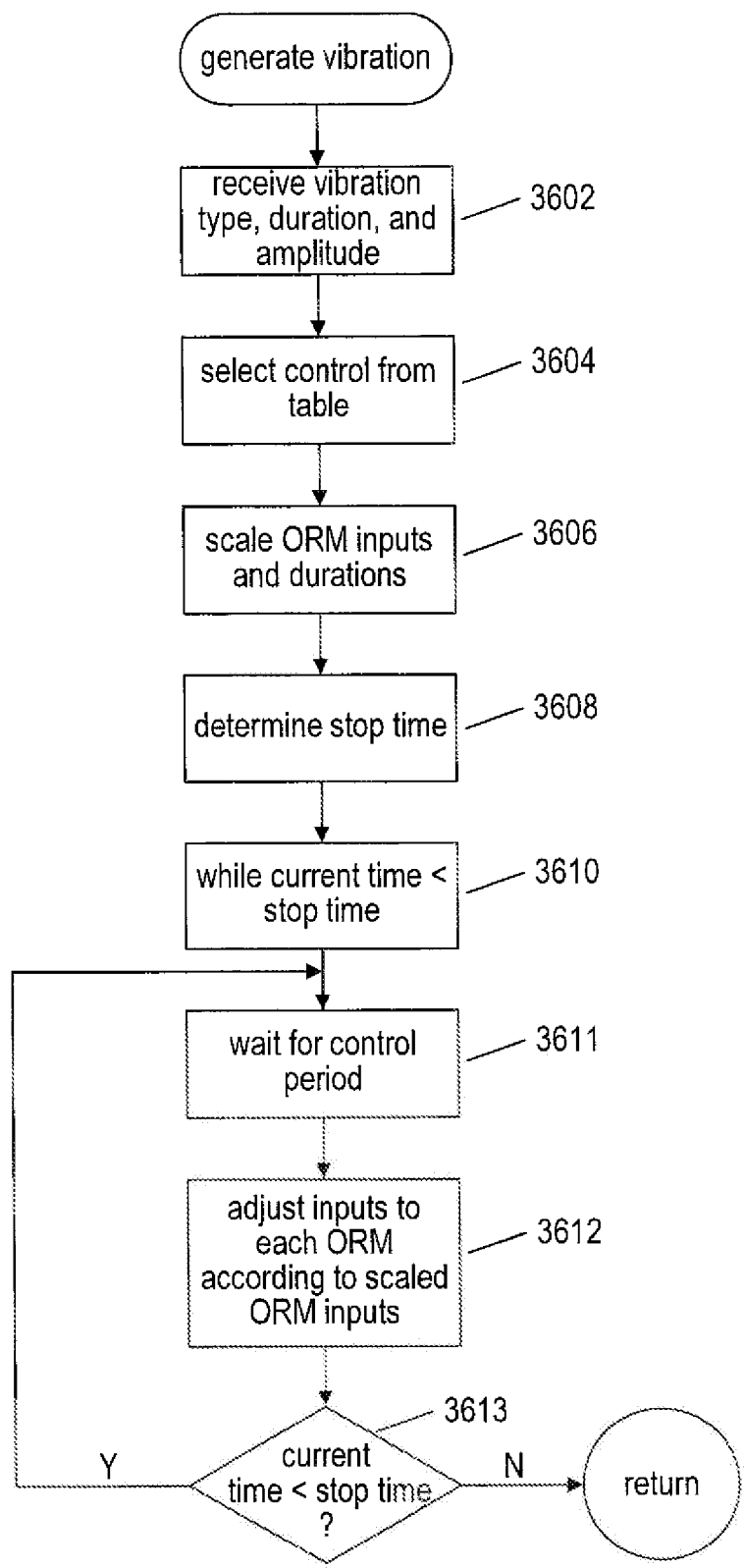

FIG. 36 provides a control-flow diagram for the generate-vibration handler called in step 3110 of FIG. 31. In step 3602, the handler receives a vibration type, duration, and amplitude associated with the generate-vibration event that is being handled. In step 3604, the appropriate ORM control parameters and patterns are selected from the vibration-type table, in step 3606, the ORM control parameters are scaled according to the received duration and amplitude. In step 3608, a stop time at which the vibration will finish is determined from the received duration. Then, in the for-loop of steps 3610-3613, the generate-vibration handler continuously adjusts inputs to each ORM according to the scaled ORM control parameters produced in step 3606.

Precise and Accurate Control of ORMs

The current document is directed to various approaches used within the control logic of an ORM-containing device, appliance, or system, to accurately and precisely control the ORMs to produce time-dependent driving oscillations in conformance with desired control patterns. As discussed above, the combination of controlling ORMs in accordance with control patterns and the accurate characterization of the resonant frequencies of the device, appliance, or system together allow for reproducible generation of many different types of vibration responses of the device, appliance, or system to the driving oscillations of control-pattern-controlled ORMs.

As further discussed below, many current control regimes fail to accurately reproduce the desired driving time-dependent oscillations in each ORM within a device, appliance, or system. As a result, the vibration response of the device, appliance, or system may vary significantly from a desired vibration response and, perhaps more importantly, may not be accurately reproduced at different points in time, due to the inability to accurately and deterministically control the ORMs to produce driving oscillations in conformance with desired control patterns.

Figure 37B:
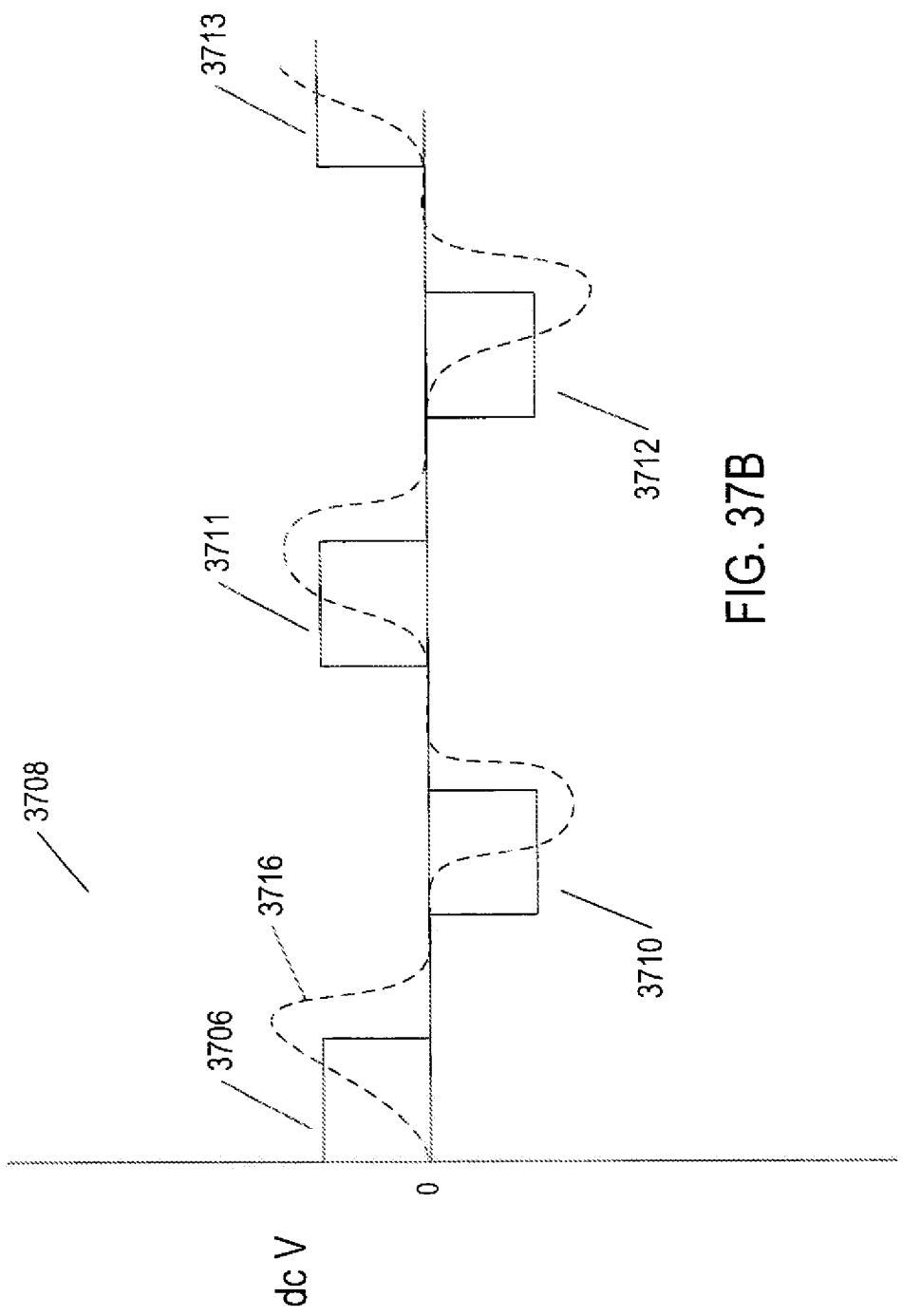

A first approach to more accurately controlling ORMs is to use pulse-width modulation control signals rather than conventional constant-duration control pulses. FIGS. 37A-D illustrate pulse-width modulation control of an ORM. FIG. 37A shows a desired vibration response for an ORM that represents a desired time-dependent driving oscillation for inducing at least a portion of the vibration response of a device, appliance, or system in which the ORM is included. The desired vibration response of the ORM is a sine-wave-like 3702 oscillation that is plotted, in FIG. 37A, on an amplitude versus time coordinate system 3704. FIG. 37B illustrate a hypothetical control regime that attempts to produce the desired driving oscillation discussed above with reference to FIG. 37A in a hypothetical ORM. Constant-width voltage pulses, such as voltage pulse 3706, are input to the ORM to drive the weight or mass in forward and backward directions along the oscillation path. These pulses are plotted in FIG. 37B in a voltage versus time coordinate system 3708. Because the constant-width pulses are a rather crude approximation of the desired sine-wave-like vibration response, the control regime shown in FIG. 37B comprises a series of positive-voltage, 0-voltage, and negative-voltage constant-width pulses 3706 and 3710-3713 that produce a vibration response, superimposed in FIG. 37B over the control pulses, as curve 3716. In general, the pulse widths are controlled by an oscillating clock or clock-based timing signal. The vibration-response curve 3716 differs significantly from the desired driving oscillation shown in FIG. 37A. FIG. 37C shows the desired vibration response 3702 plotted together with the vibration response produced by the constant-width voltage-pulse control 3716. In fact, this is actually a relatively favorable case, because the sequence of positive, 0-voltage, and negative voltage pulses shown in FIG. 37B has a period close to the period of the desired sine-wave-like vibration response. Otherwise, the actual vibration response would differ even more greatly from the desired vibration response, often having irregularly shaped wave forms.

Figure 37D:
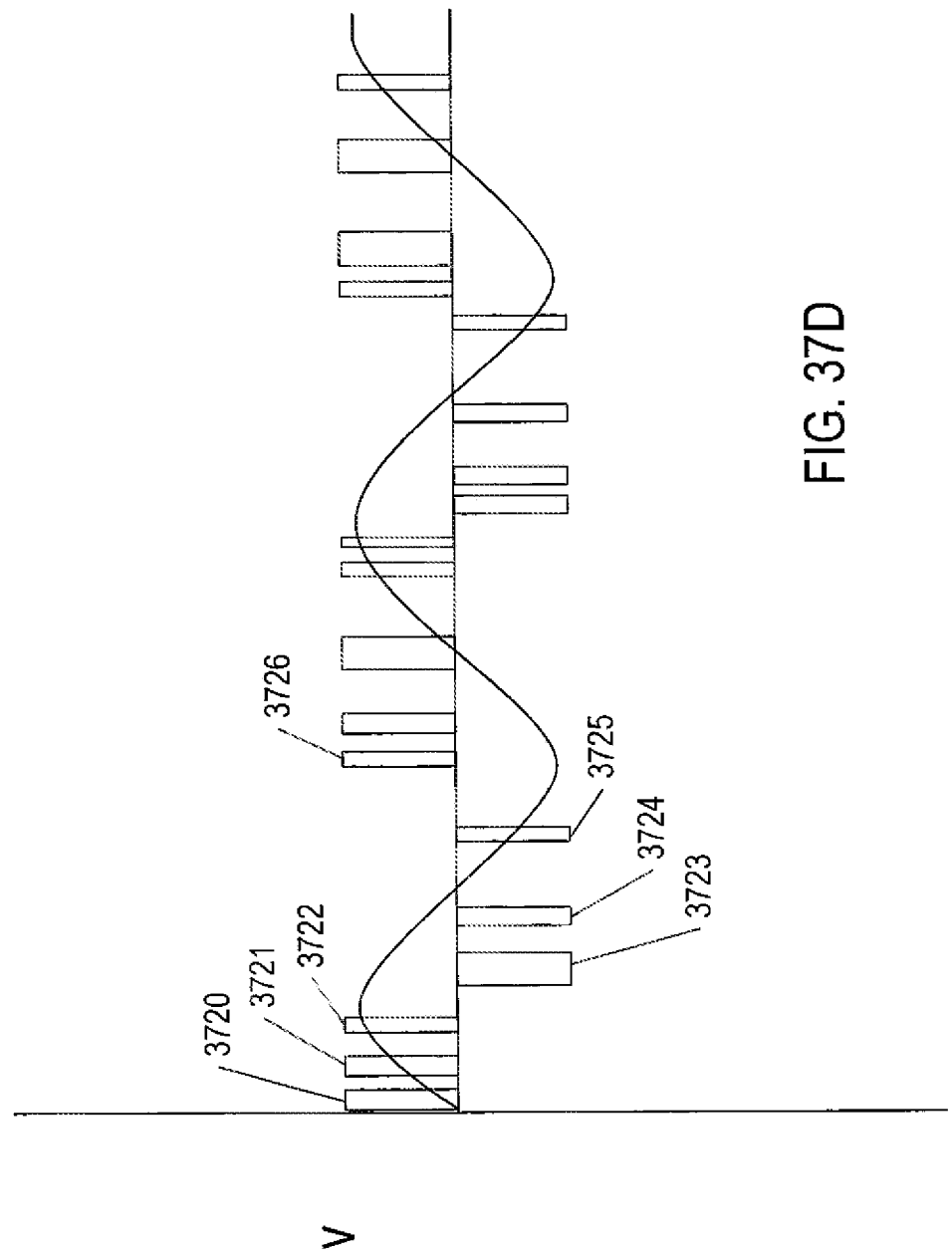

FIG. 37D illustrates pulse-width-modulation control of the ORM. In pulse-width-modulation control, rather than using constant-width voltage pulses to control the ORM, the controller instead uses variable-width pulses. Moreover, much shorter pulses can be used to more precisely control the vibration response of the ORM. In essence, pulse-width modulation allows a variable-frequency control signal to be used, rather than a constant-frequency control signal. Because a variable-frequency control signal can contain a much greater amount of information than a constant-frequency control signal, the pulse-width-modulation control signals can be used to much more precisely steer the vibration response of the ORM towards a desired wave form. As shown in FIG. 37D, many more voltage pulses are used in order to achieve the sine-wave-like vibration response of the ORM. For example, in the constant-width-pulse control shown in FIG. 37B, a positive-voltage pulse 3706, a 0-voltage pulse, and a negative-voltage pulse 3710 are used to attempt to approximate the first period of the desired vibration response. By contrast, as shown in FIG. 37D, four positive-voltage pulses 3720-3722 and 3726 and three negative-voltage pulses 3723-3725 are employed to produce the first period of the desired vibration response. Moreover, these seven pulses have varying pulse widths and are irregularly spaced along the time axis.

Another problem associated with conventional control of ORMs is that the vibration response produced by a control pattern is often very different from the vibration response that might be predicted from the control pattern or desired. For example, in FIG. 38A, a control pattern is shown that involves a constant-voltage signal 3802 from an initial time $t_i$ 3804 to a final, end time $t_f$ 3806. Of course, this control pattern may correspond to a large number of positive-voltage pulses in the time interval $t_i$ to $t_f$. The vibration response of the ORM is shown in FIG. 388. In this figure, the horizontal time axis 3808 has been resealed to show more detail. The control pattern 3802 shown in FIG. 38A might be initially assumed to produce a pulse of constant-amplitude vibrations over the time interval $t_i$ to $t_f$. However, as shown in FIG. 38B, the actual vibration response of the ORM, shown as curve 3810, includes an initial ramp-up interval 3812 in which the amplitude of the vibration response steadily increases to the desired amplitude, a middle period 3814 in which the ORM is oscillating at the desired amplitude, a short period 3816 at the end of the time interval $t_i$ to $t_f$ during which, in anticipation of the sharp control-pattern edge at time $t_f$, the control voltage is dropped to 0 so that the vibration will fall to a low level at time $t_f$, and a fourth undesired ramp-down interval 3818, extending well past the time $t_f$, during which vibration of the ORM continues at increasingly smaller amplitudes.

Figure 38A:
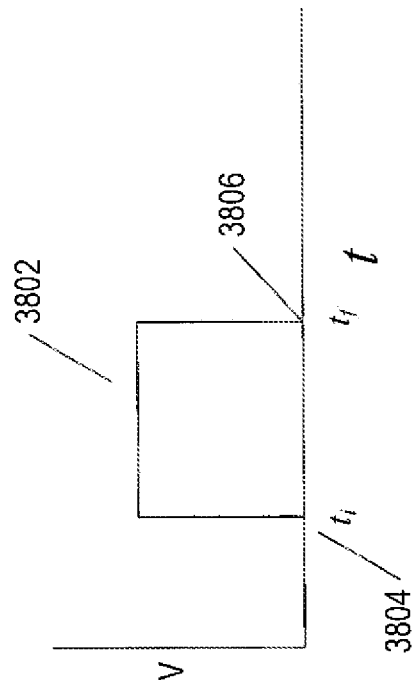
FIG. 38A illustrates a control pattern that involves a constant-voltage signal 3802 from an initial time $t_i$, 3804 to a final, end time $t_f$ 3806.
Figure 38B:
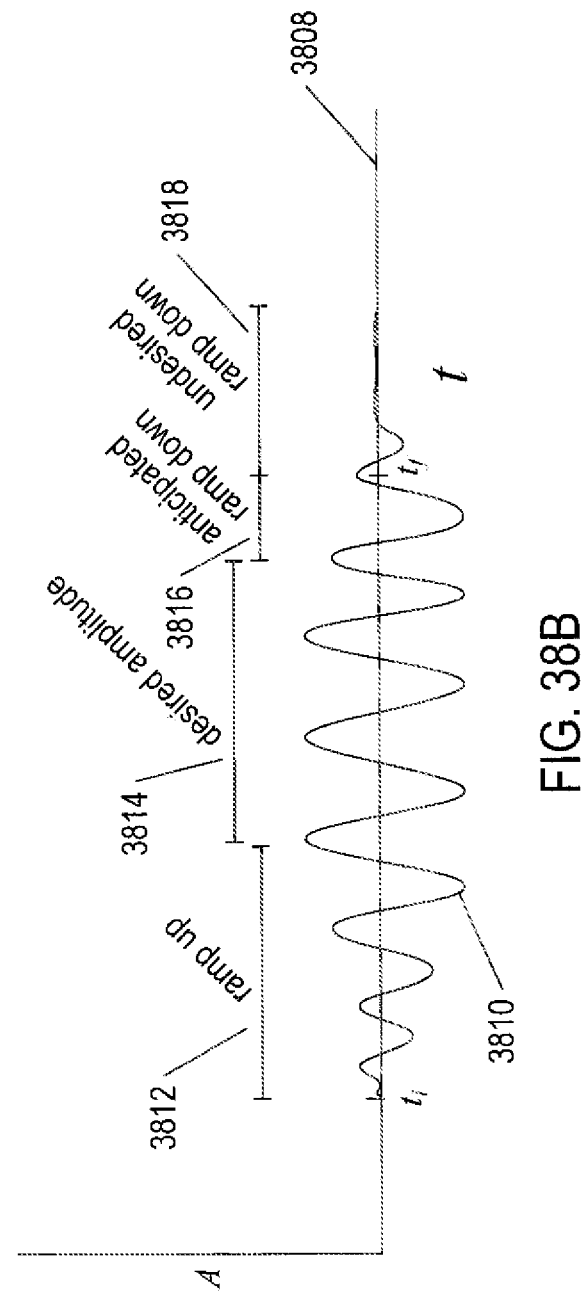
FIG. 38B illustrates the actual vibration response of the ORM.
Figure 39:
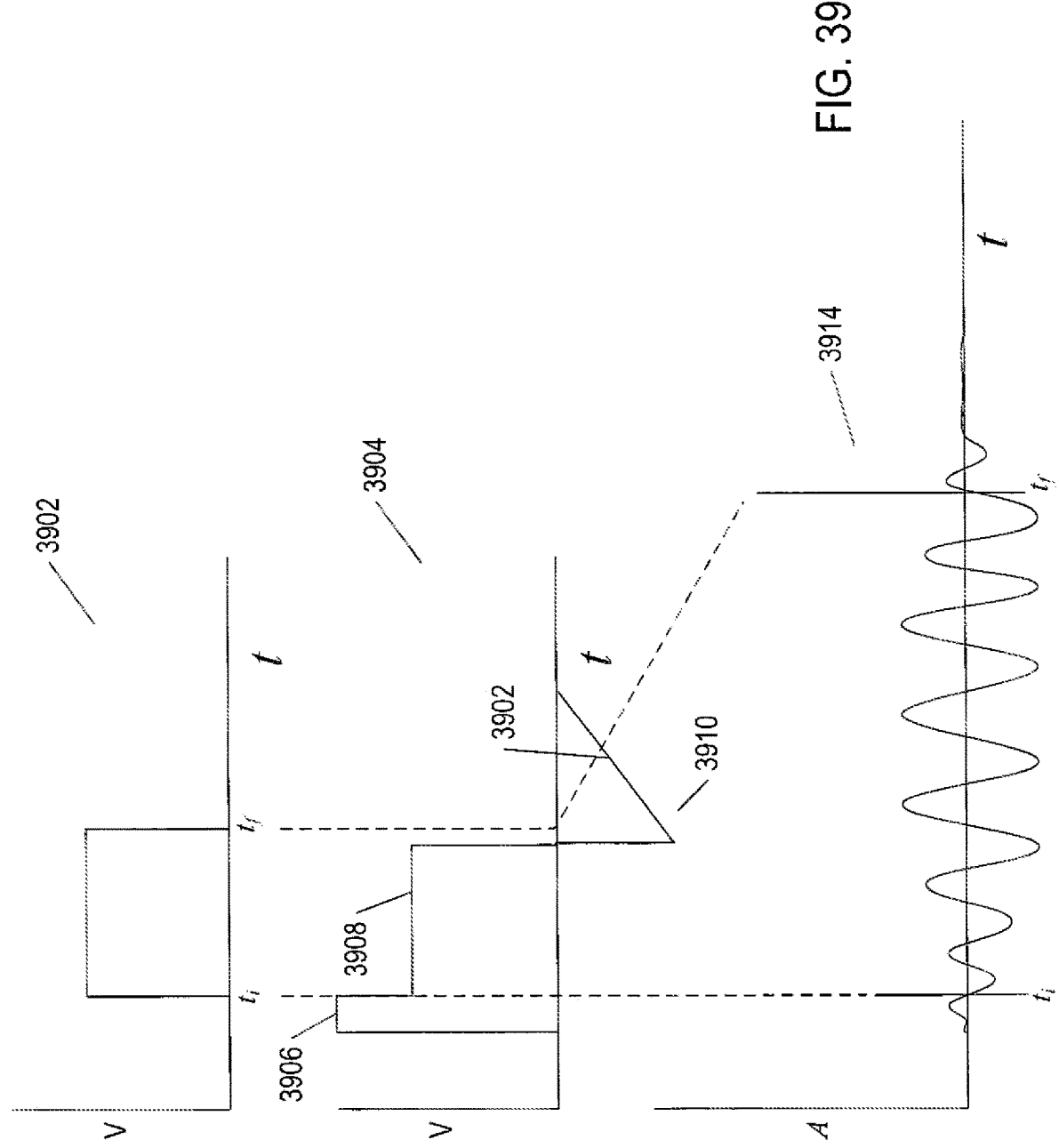
FIG. 39 illustrates modification of the naïve control pattern, shown in FIG. 38A, in order to achieve a better approximation of the desired constant-amplitude oscillation in the time interval $t_i$ to $t_f$.

FIG. 39 illustrates modification of the naïve control pattern, shown in FIG. 38A, in order to achieve a better approximation of the desired constant-amplitude oscillation in the time interval $t_i$ to $t_f$. In a first plot 3902, the naïve control pattern is shown. In a second plot 3904, the naïve control pattern is modified in order to produce the constant-amplitude oscillation that is desired. First, a large-voltage input 3906 occurs prior to time $t_i$ in order to quickly force the ORM to begin vibrating. From time $t_i$ to a time prior to time $t_f$ a lower-voltage input 3908 is provided in order to control the ORM to oscillate at the desired amplitude. Prior to time $t_f$, a negative-voltage control signal 3910 is input to the ORM in order to sharply drive the ORM towards oscillation out of phase with the desired driving oscillation during the time interval $t_i$ to $t_f$. This negative-voltage control signal is then relaxed linearly 3912 in order to stop ORM vibration in a relatively short period of time. As shown in plot 3914 in FIG. 39, the vibration response of the ORM much more closely approximates a desired constant-amplitude vibration between time intervals $t_i$ and $t_f$.

Many different types of control inputs can be used to shape the vibration response of an ORM. For example, short control pulses can push the vibration to a different phase, resulting in cancellation of the previously established oscillation. The various types of inputs depend on the type and form of control signals that can be transmitted to the ORM, which, in turn, depends on the type of ROM, the driving force used to induce oscillation of the moving mass within the ORM, and the type of logic circuitry that receives input signals and translates them into oscillations.

Thus, in addition to pulse-width modulation, a wide variety of different types of complex control signals may be devised in order to achieve the vibration response desired from the simple control patterns discussed above, including control pattern 3802 shown in FIG. 38A. Many different control-signal parameters may be varied in order to control an ORM to provide a desired vibration response, including varying the voltage of the control signal, using pulse-width modulation to finely tailor the control signal to produce a desired vibration response, and adjusting the control signal to include pre-response and post-response signals to remove undesired ramp-up and ramp-down periods in the vibration response.

In addition to varying the input control to an ORM, an ORM may be designed to include a variety of different mechanical controls to further increase the range of vibration responses of the ORM. FIGS. 40A-40F illustrate movable mechanical stops and mechanical latches, two types of mechanical control features that may be included in various types of ORMs. Equivalent electromagnetic features may be included in other types of ORMs. FIG. 40A illustrates a first type of ORM. In a first diagram 4002, the ORM is shown in an equilibrium, non-vibrating position. The ORM includes a moveable weight or mass 4002 that is connected to two ends of the ORM 4004 and 4006 by springs 4008 and 4010. Diagram 4012 shows the ORM when the movable mass 4002 has been moved, by application of a translational force, such as an electromagnetic force, to the furthest position in the leftward direction along the oscillation path. In this position, spring 4010 is compressed and spring 4008 is extended. In both cases, the springs have potential energy that produces forces that force the movable mass 4002 back in the rightward direction towards stop 4012. Diagram 4014 shows the ORM with the movable mass in the furthest rightward direction.

Figure 40B:
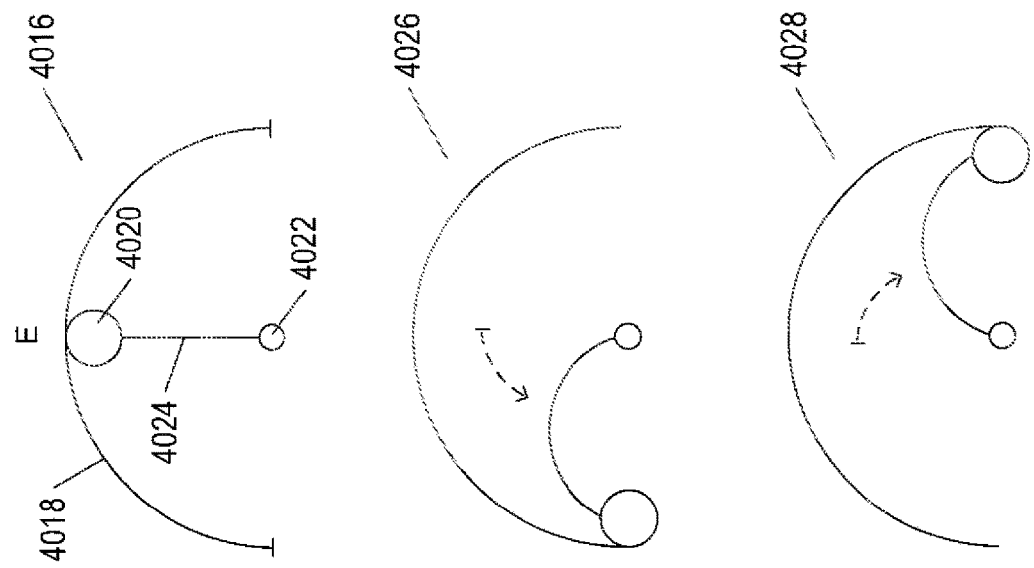
Figure 40A:
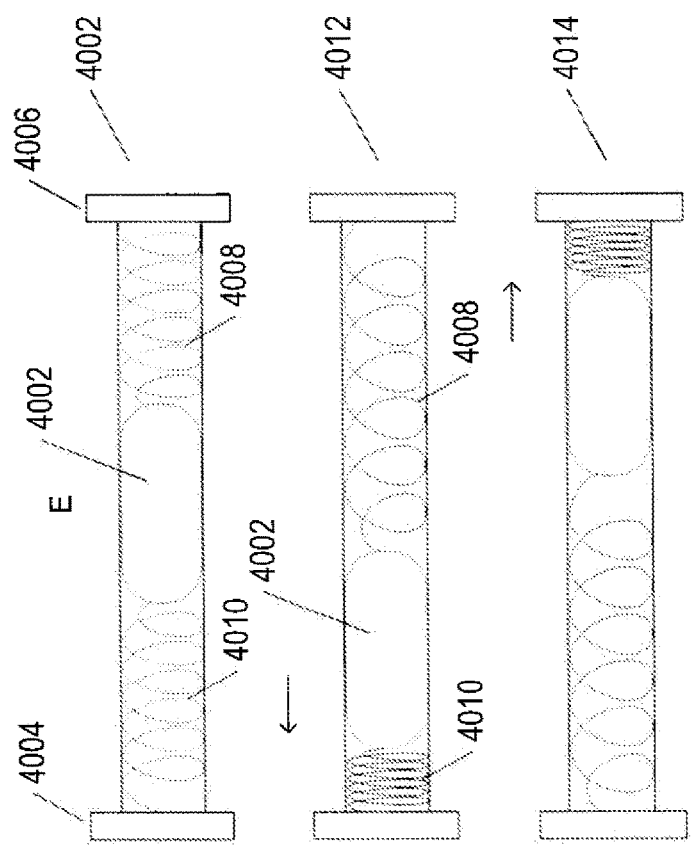
Figure 40D:
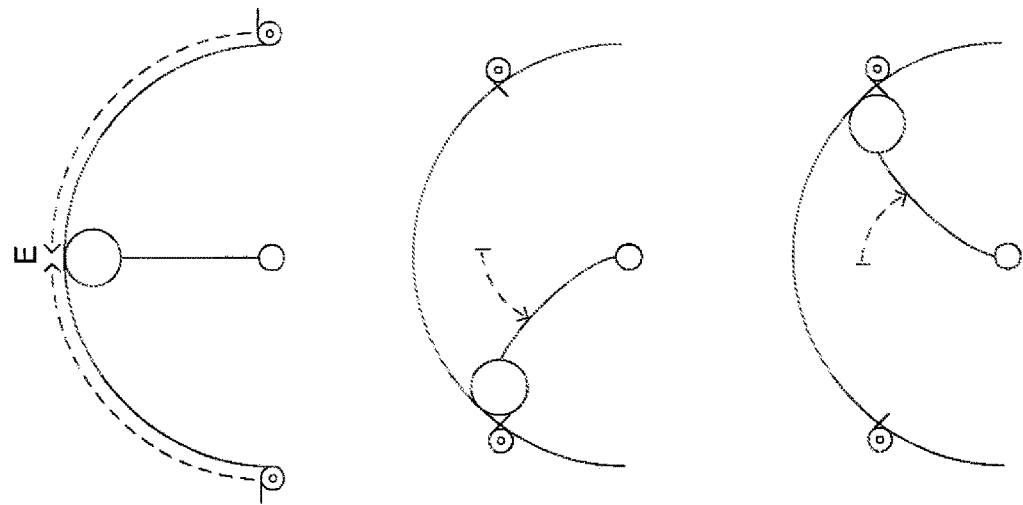

FIG. 40B shows the equilibrium and largest-amplitude positions of a movable mass in a different type of ORM. In a first diagram 4016, the ORM is shown in an equilibrium position. The ORM features an arc-like oscillation path 4018 along which the moving mass 4020, attached to a rotor 4022, oscillates. The moving mass 4020 is attached to the rotor 4022 by a flexible support 4024. Diagram 4026 shows the ORM with the movable mass in the furthest leftward position and diagram 4028 shows the ORM with the movable mass in the furthest rightward direction, similar to the positions shown for the ORM of FIG. 40A in diagrams 4012 and 4014.

Figure 40C:
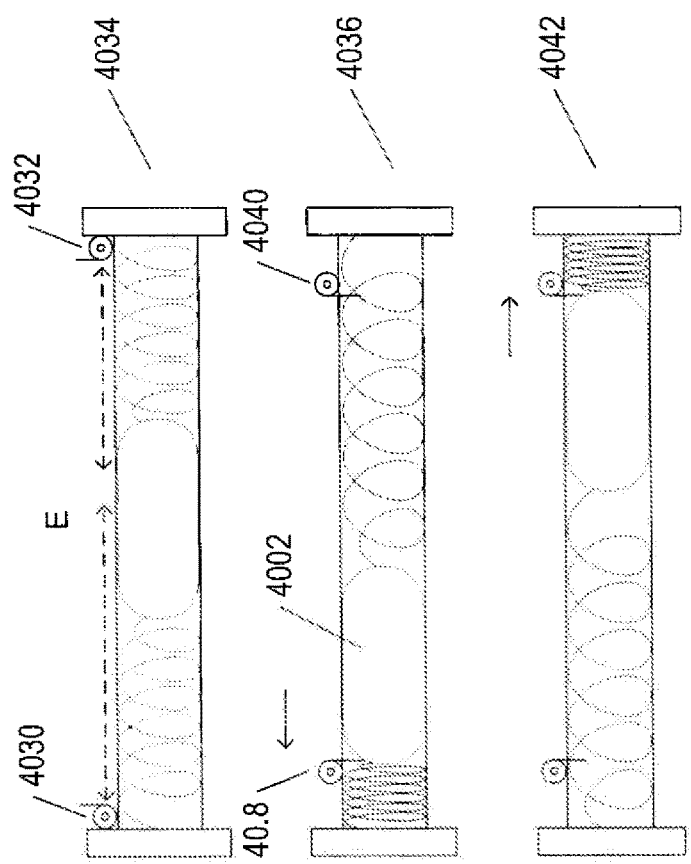

FIG. 40C illustrates movable mechanical stops included in the ORM discussed above with reference to FIG. 40A. The movable stops are depicted by features 4030 and 4032 in a first diagram 4034. Of course, the depictions do not necessarily reflect the shape, size, and structure of mechanical stops needed to stop motion of the moveable mass in the various different types of ORMs, but are instead used to illustrate positioning of the moveable stops and their deployment. In a second diagram 4036, the movable stops have been repositioned 4038 and 4040 in order to limit the length of travel of the moving mass 4002. The second diagram 4036 shows the leftward extent of motion of the moving mass 4002 with the movable stops deployed and diagram 4042 shows the rightward extent of travel of the moving mass when the movable stops are deployed. Similar illustration conventions are used, in FIG. 40D, to illustrate deployment of movable stops in the ORM discussed above with reference to FIG. 40B. Use of movable stops can significantly alter the vibration response of the ORM to a given control input. This may include changing the amplitude of the vibration response, the frequency of the vibration response, and changing the force imparted by the moving mass to the ORM when the moving mass strikes the stops versus the original end stops 4002 and 4004. In general, the vibration-response alterations are complex functions of the geometry, material composition, and driving forces used in the ORM.

FIGS. 40E-F illustrate use of the movable stops, discussed above with reference to FIGS. 40C and 40D, as latches. As shown in a first diagram 4048 in FIG. 40E, the movable stops have been repositioned 4050 and 4052 closer to the center of the oscillation path. As shown in diagram 4054, the left-hand movable stop 4056 has been deployed when the moving mass 4002 has just reached its leftward, stopped position. As a result, motion of the moving mass is stopped, resulting in an immediate cessation of the driving oscillation produced by the ORM and a higher force exerted in the last oscillation on the left-end stop 4004 of the ORM. Diagram 4058 shows the right-hand movable stop 4052 deployed to latch the moving mass 4002 at its furthest right-hand position. FIG. 40F shows similar deployment of the movable stops, in the ORM discussed above with reference to FIG. 40B, to latch the moving mass at its leftward and rightward extents. Latching of the moveable mass may trap the moveable mass in a high-potential-energy state, so that immediate, rapid oscillation may ensue when the latch is released. Latching may also significantly alter the relaxation of the oscillation at the end of control-pattern execution.

Figure 41:
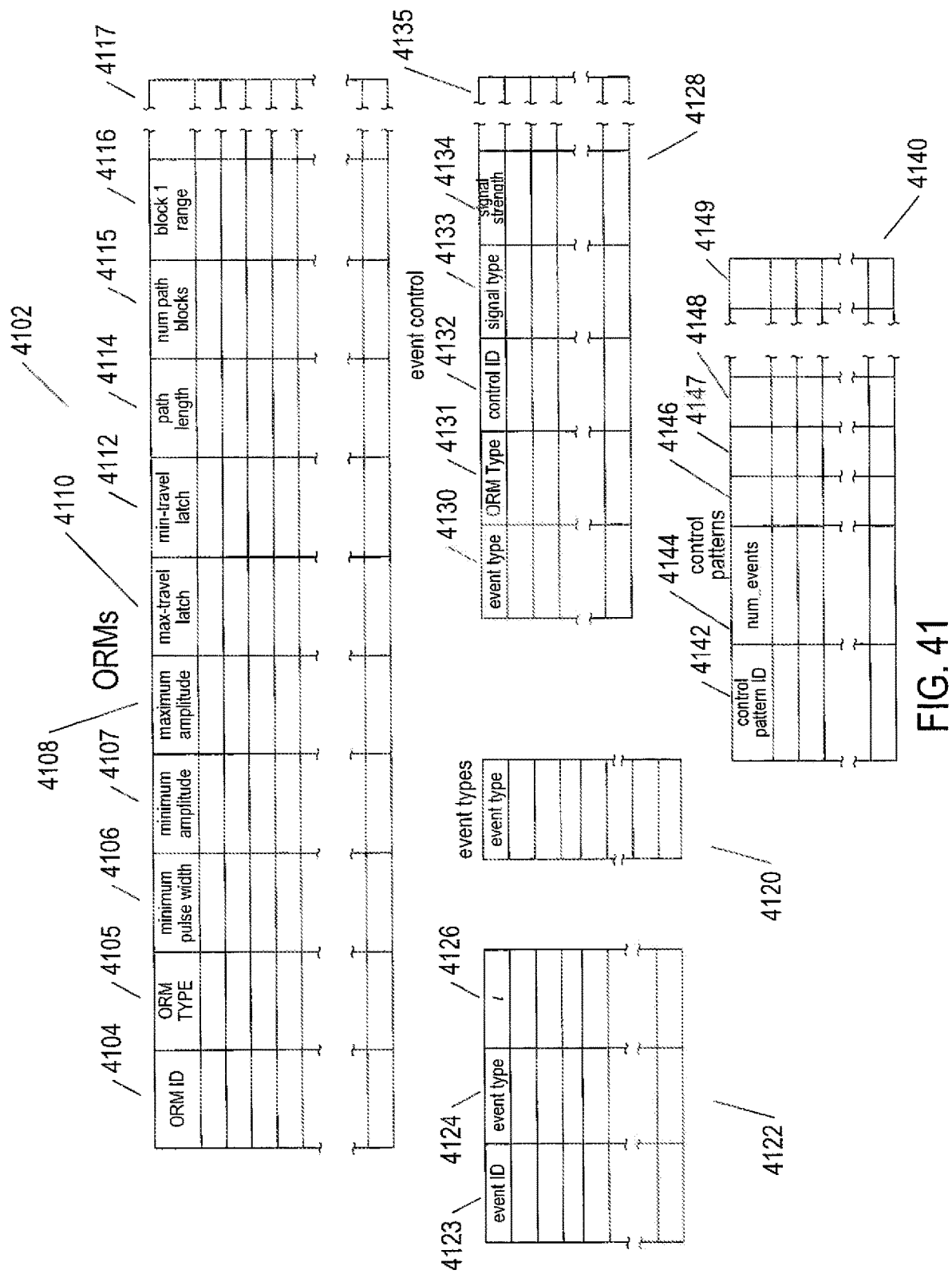
FIG. 41 shows example information that may be stored in order to more accurately control ORMs according to the methods and considerations disclosed in the current document.

The current document is directed to employing the various different types of alternative control of ORMs to more accurately generate desired vibration responses. This involves use of a much greater amount of information about the ORM than used in the vibration response table discussed above. FIG. 41 shows example information that may be stored in order to more accurately control ORMs according to the methods and considerations disclosed in the current document. The information is stored in five different tables. An ORM table 4102 stores control information for each different ORM in a device, appliance, or system. This information includes an identifier for the ORM 4104, an indication of the ORM type 4105, an indication of the minimum pulse width that can be input in a control signal 4106, an indication of the minimum amplitude 4107 and maximum amplitude 4108 of an input control signal, indications of whether or not mechanical or electromagnetic latches are available in the ORM 4110 and 4112, the oscillation path length within the ORM 4114, the number of movable stops, or path blocks included in the ORM 4115, and the positioning range for each moveable stop 4116-4117. An event-types table 4120 includes various different types of control events. These may include deployment of latches, movement of movable stops, and output of control pulses of various different widths and amplitudes. An events table 4122 includes ordered pairs of event types and relative times that each represents one of the many different types of control events that can be input to ORMs. Each control event includes an event ID 4123, an event type 4124, and a relative time that specifies a time point within a control pattern 4126 at which the event occurs. Table 4128 includes the actual control actions that a logic controller employs to initiate each type of event in each type of ORM. For each type of control, the table includes an indication of the event type 4130, the ORM type 4131, a control ID 4132, a signal type 4133, a signal strength 4134, and any of many different other characterizations of the type of control 4135 executed by the control logic in order to control an ORM to produce a particular type of event. Finally, table 4140 lists all of the different types of control patterns that can be used to control ORMs. These are equivalent to the previously discussed control patterns. Each control pattern includes a control-pattern identifier 4142, an indication of the number of events in the control pattern 4144, and the event identifiers for those events 4146-4149.

Figure 42:
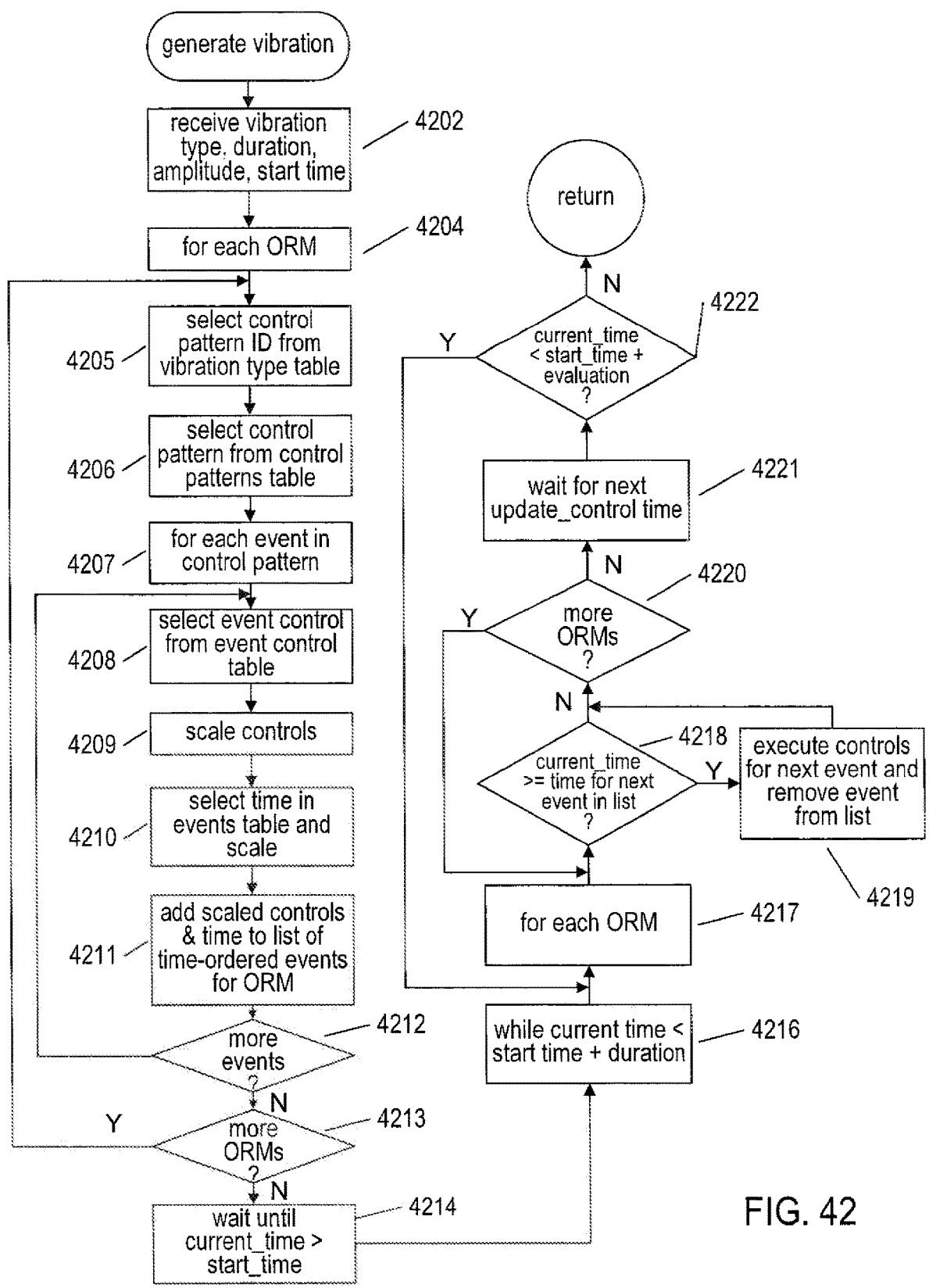
FIG. 42 provides an alternative implementation of the routine "generate vibration," discussed above with reference to FIG. 36.

FIG. 42 provides an alternative implementation of the routine "generate vibration," discussed above with reference to FIG. 36. The alternative information incorporates more accurate control of ORMs using the information and techniques discussed above with reference to FIGS. 37A-41. In step 4202, the routine receives a vibration type, duration, amplitude, and start time for a desired device, appliance, or system vibration response. Then, in the for-loop of steps 4204-4212, the routine prepares for controlling each of the ORMs in the device, appliance, or system. In step 4205, a control-pattern ID is selected from the vibration-type table for the ORM, modified with respect to the previously described vibration-type table to include the identifiers of control patterns that are tabulated in the control-patterns table 4149. In step 4206, the identified control pattern is selected from the control-patterns table. In the inner for-loop of steps 4207-4212, each event is selected from the control pattern selected in step 4206. For each event, a corresponding event control entry is selected from the event-control table, in step 4208. The controls are scaled, in step 4209, according to the desired duration and amplitude for the vibration response. In step 4210, the time associated with the event, selected from the events table, is also scaled. In step 4211, the scaled controls and times are added to a list of time-ordered events, the controls for which are issued to the ORM during generation of the desired vibration response. In step 4214, the routine waits until the desired start time for the vibration response. Note that the desired start time takes into consideration any pre-vibration-response controls needed to produce the desired vibration response. Then, in the while-loop of steps 4216-4222, the routine carries out ORM control over a set of time points spanning the desired vibration-response duration. In the inner for-loop of steps 4217-4220, the routine initiates a control sequence for each of the time-ordered events for each of the ORMs at the points in time in which the control sequence is specified for issuance. Then, in step 4221, the routine waits for a next update-control time point.

The above-discussed methods for more accurate and reliable control of ORMs provide increased opportunities for generating increasingly complex vibration responses in devices, appliances, and systems that contain ORMs. However, with increasing complexity, attention is needed to simplifying and increasing the efficiency of driving-oscillation sensing in order to provide feedback-based control to ORMs. In addition, with more accurate control, it is possible to increase the complexity of ORM time-dependent driving oscillations, significantly increasing the types of time-dependent driving oscillations that can be encoded in control patterns and thus increasing the device, appliance, and system vibration responses to controlled ORM driving oscillations.

Figure 43:
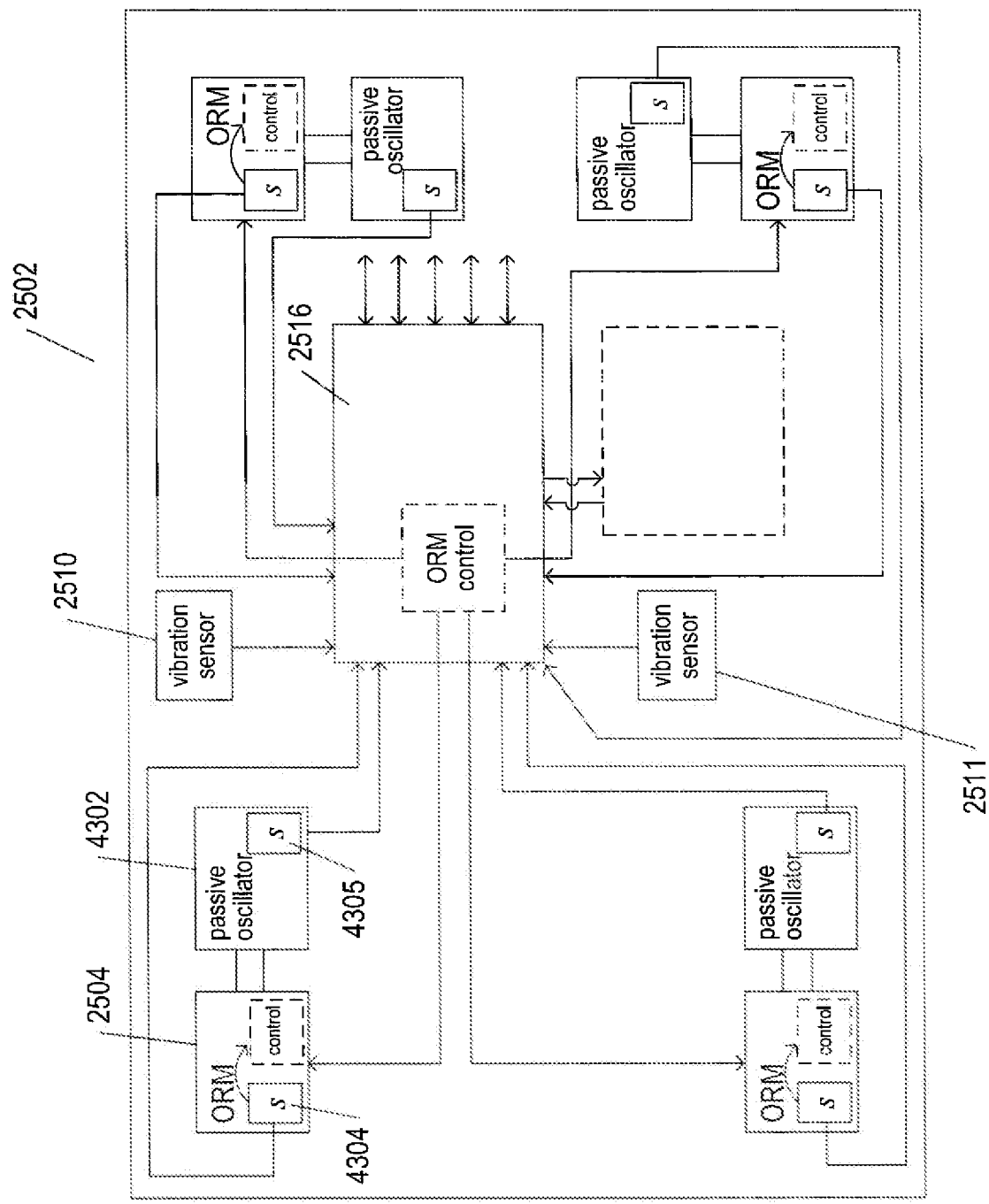
FIG. 43 illustrates both methods for increasing the complexity of ORM time-dependent driving oscillations as well as increasing and simplifying feedback control.

FIG. 43 illustrates both methods for increasing the complexity of ORM time-dependent driving oscillations as well as increasing and simplifying feedback control. FIG. 43 provides a simplified ORM-containing device architecture similar to that provided by FIG. 25, discussed above. However, as shown in FIG. 43, each of the ORMs, such as ORM 2504, is coupled to an additional passive oscillator, such as passive oscillator 4302. In various different implementations, a given ORM may be coupled to one, two, or more passive oscillators. When an ORM is mechanically coupled to one or more additional passive oscillators, the passive oscillators greatly increase the number of degrees of freedom for vibration of the combined ORM and one or more passive oscillators. The mathematical models for the vibration modes and resonant frequencies become far more complex, involving eigenvalue problems arising from coupled differential equations. As discussed above, the number of resonant frequencies for a system is generally proportional to the number of vibrational degrees of freedom. Furthermore, coupling passive oscillators to ORMs may provide new, complex vibrational modes with different frequencies and amplitudes. Thus, vibration components comprising an ORM and one or more passive oscillators can significantly increase the complexity of the time-dependent driving oscillations produced by these vibration components, and therefore greatly expand the types, frequencies, and modes of vibration responses produced in a device, appliance, or system containing the complex vibration components.

In the simpler system shown in FIG. 25, two vibration sensors 2510 and 2511 were included. These vibration sensors detected vibration in one, two, or three orthogonal directions of the device, appliance, or system 2502 in which multiple ORMs are included. However, as shown in FIG. 43, sensors that provide information regarding the driving oscillations produced by ORMs and passive oscillators, such as sensors 4304 and 4305 in ORM 2504 and passive oscillator 4302, respectively, may also provide information to local control logic, such as control logic 4306, within ORMs as well as the controller 2516 that controls one or more ORMs within the device, appliance, or system 2502. The sensors local to ORMs and passive oscillators may be designed to sense driving-oscillation characteristics while vibration sensors 2510 and 2511 are designed to sense the vibration response of the entire device, appliance, or system 2502.

By including a variety of different types of sensors within different positions and components of an ORM-containing device, appliance, or system, an opportunity is provided for hierarchical sensing and corresponding feedback control within a device, appliance, or system. In many cases, the output from a vibration sensor may be difficult to translate into accurate feedback information and corresponding control signals. For example, the vibration sensed by the vibration sensors 2510-2511 may be rather indirectly related to the individual driving oscillations produced by the ORM-based vibration components, such as the vibration component comprising ORM 2504 and mechanically coupled passive oscillator 4302. In such cases, a significant amount of inference may be necessary to logically infer the driving oscillations of the vibration components producing the vibration-sensor signals and to compute corresponding adjustments to ORM control. Furthermore, there may be significant temporal lags between sensor vibration and the driving oscillations that produce the sensor vibration. Many of the common techniques for sensing ORM driving oscillations in order to provide local feedback to ORMs may suffer similar problems. Furthermore, there may be many different types of interferences and couplings between electromechanical driving forces, electromagnetic sensors, and other device components that mask or entirely prevent accurate inference of the real-time characteristics of ORMs and the vibration-response of the entire device, appliance, or system. For this reason, simpler and more direct types of sensing and control can provide enormous benefits in achieving desired vibration responses of the entire device, appliance, or system, particularly in devices, appliances, and systems that include multiple vibration components, each consisting of an ORM and one or more passive oscillators as well as various types of vibration sensors external to ORMs and passive oscillators as well as sensors within, or coupled to, ORMs and passive oscillators.

Figure 44:
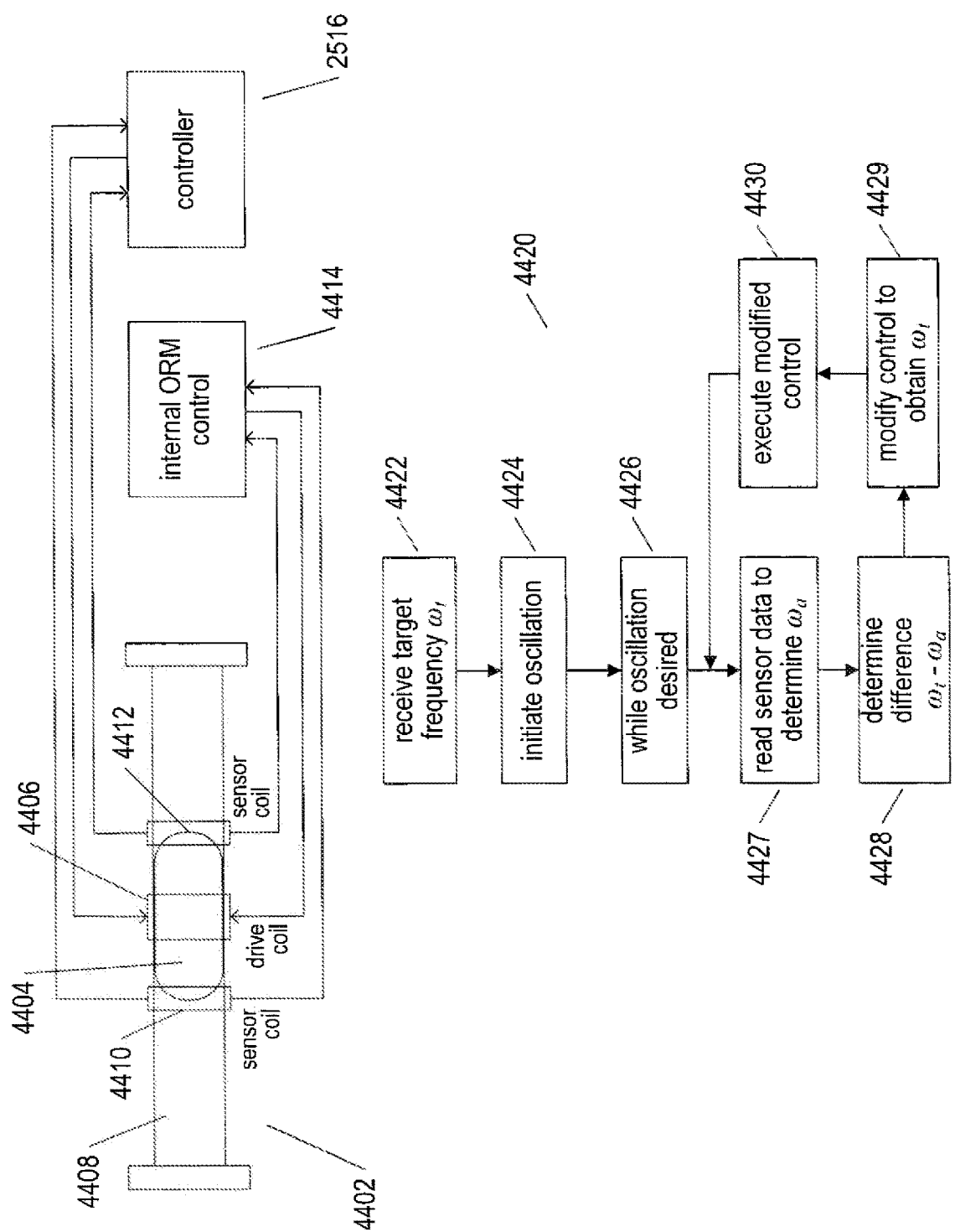
FIG. 44 illustrates one type of ORM driving-oscillation sensor that can be employed to provide feedback information for ORM control.

FIG. 44 illustrates one type of ORM driving-oscillation sensor that can be employed to provide feedback information for ORM control. In FIG. 44, a linear ORM 4402, used in previous examples, is again shown as an example ORM. The linear ORM includes a mass or weight 4404 that is driven electromagnetically by a drive coil 4406 to oscillate along a linear tube 4408. In this ORM, two sensor coils 4410 and 4412 are additionally included in order to detect motion of the weight or mass 4404 within the ORM as it is driven to oscillate. The sensor information may be provided to an internal ORM control logic 4414 or to the controller 2516 within the device, appliance, or system that includes the ORM. In certain cases, both the internal ORM control logic as well as the device controller may receive sensor information, for various different types of feedback-based control purposes. In the lower portion 4420 of FIG. 44, a small control-flow diagram is provided to indicate how the sensor information is used. When a controller receives a target frequency ω, at which the ORM is to oscillate, in step 4422, the control logic or controller initiates oscillation of the weight or mass, in step 4424, and then, in the while-loop of steps 4426-4430, continues to monitor the sensor output and modify control input to the ORM in order that the ORM oscillates at the target frequency $\omega_t$. This involves reading the sensor data to determine the actual frequency of oscillation $\omega_o$, in step 4427, then determining a difference between the target and actual frequencies in step 4428, using the determined difference to compute modifications to the current control of the ORM and modify the control in a way estimated to result in the ORM achieving the target frequency $\omega_t$, in step 4429, and executing the modified control in step 4430. In many cases, the computations are sufficiently complex that the feedback-based control needs to be implemented by control routines running on a processor. Furthermore, because the sensors 4410 and 4412 are essentially external to the actual oscillating mass or weight and oscillation path, the data that they output does not directly correspond to position and velocity data for the moving mass or weight, but is instead a signal proportional to the current induced in the sensor coils by the moving mass. A fair amount of interpretation is required to convert the sensor information into velocity and position information, or even into information related to the actual frequency $\omega_r$, of oscillation. Moreover, there may be significant electromagnetic interference between the drive coil 4406 and the sensor coils 4410 and 4412, limiting the accuracy at which the actual frequency $\omega_r$, or mass position and velocity can be determined. Sensor-coil-based inferences may also suffer from significant lag times between passing of the moving weight through the sensor coil and generation of a corresponding signal. In a complex system in which many different sensors are being monitored for many different ORMs, as well as sensors that detect the vibration response for a device, appliance, or system containing the ORMs, use of inferential feedback information, such as that provided by the sensor coils shown in FIG. 44, may be problematic, at best.

Figure 45:
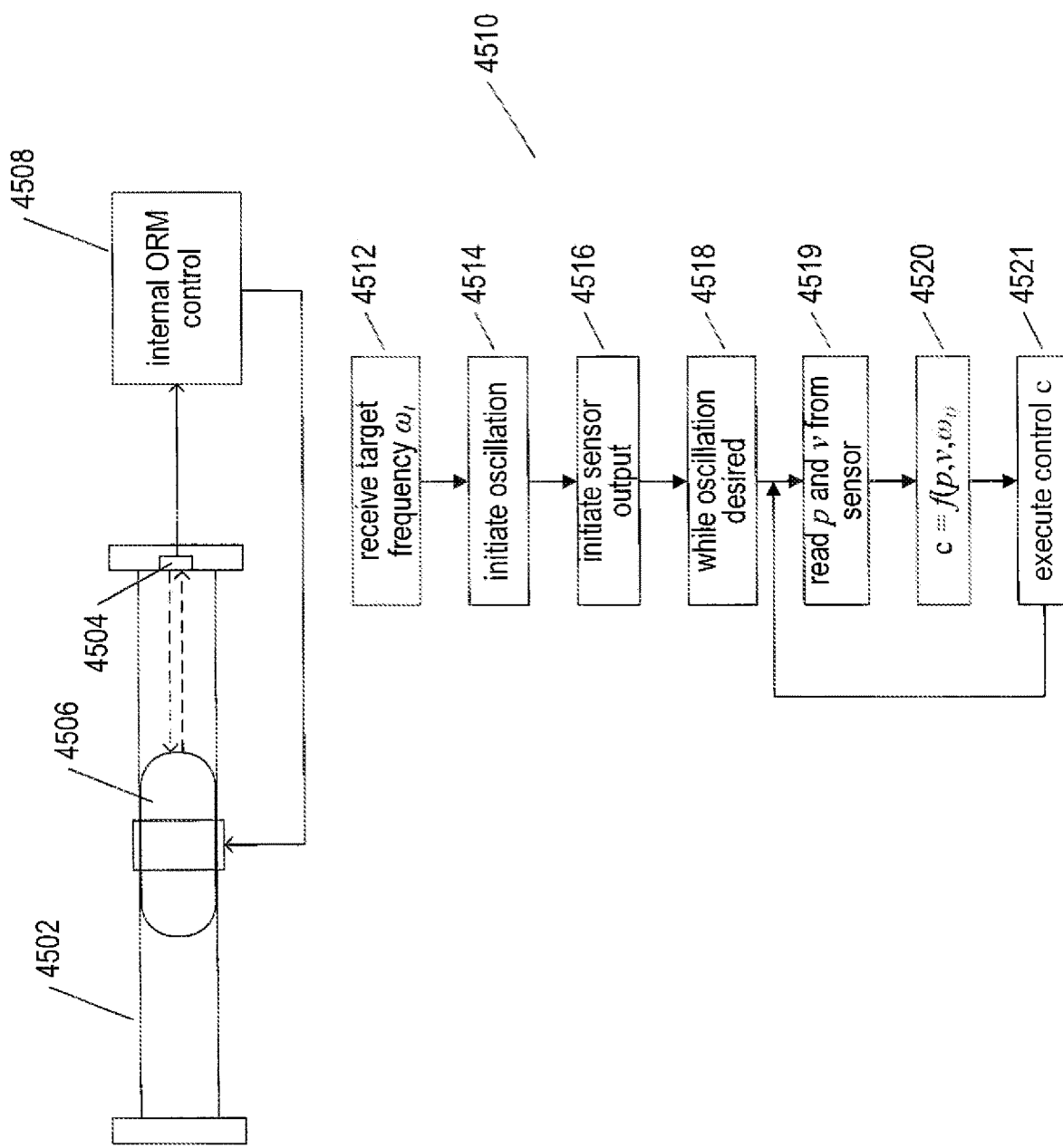
FIG. 45 illustrates an alternative approach to sensing the driving oscillations produced by an ORM.

FIG. 45 illustrates an alternative approach to sensing the driving oscillations produced by an ORM. In this approach, rather than inferential sensing, as described above with reference to FIG. 44, the ORM 4502 includes a direct sensor 4504 that directly determines the position and velocity of the moving weight or mass 4506. This direct position and velocity information is output to an internal ORM control logic 4508 that can directly use the position and velocity information to update ORM control in order to achieve a target frequency $\omega_r$. The lower portion of FIG. 45 4510, includes a small control-flow diagram, similar to that included in FIG. 44, to illustrate internal control using the direct sensor data. When a target frequency $\omega_t$ is received in step 4512, the control initiates oscillation of the mass in step 4514. In addition, in step 4616, the control logic initiates sensor output. Then, in the while-loop of steps 4518-4521, the control logic continuously receives position and velocity data from the sensor and executes immediate control based on that position and velocity data. In step 4519, the control logic reads the position and velocity data from the sensor. This may involve a certain amount of computation, such as computing the difference and position with time over several readings, but because of the direct nature of the position sensing, is generally far less inferential and computationally intensive than in the case of indirect sensing. Then, in step 4520, the appropriate control is computed based on the target frequency $\omega_t$, and the current position and velocity of the moving mass p and v. This computation may be made based on a predetermined function, based on tables with values, or computed as another of the initiation steps, including initiation steps 4514 and 4516. Finally, in step 4521, the computed control is executed by the controller. In many cases, the determination of the appropriate control corresponding to sensed velocity and position data can be made by logic circuitry, rather than a programmed processor. In many cases, the position and velocity data is more accurate and far more timely provided than position and velocity data derived from indirect sensing and inference.

Figure 46A:
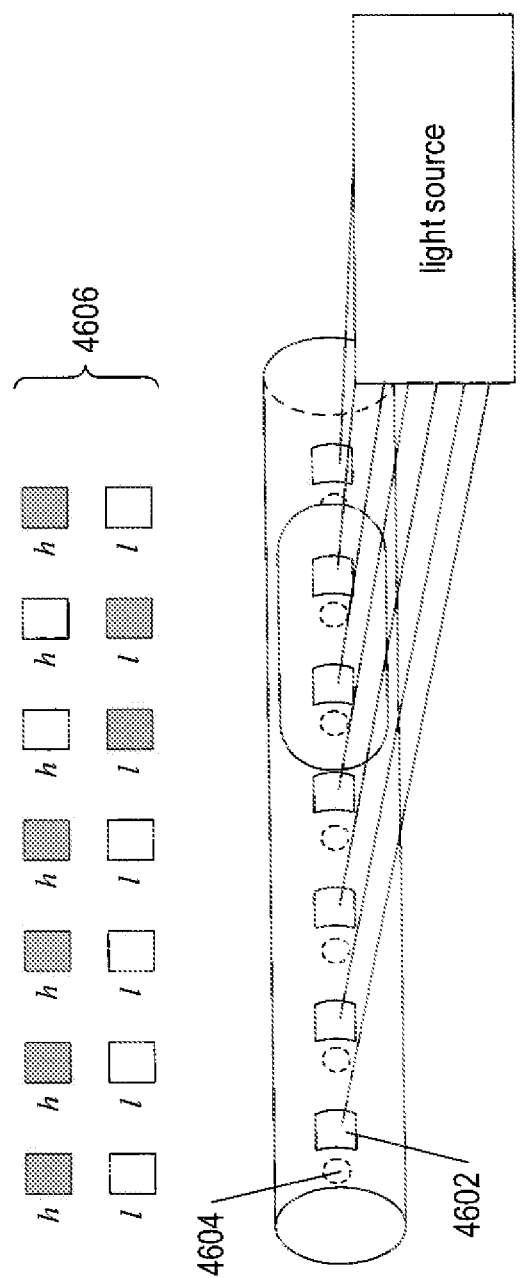
FIGS. 46A-B illustrate several possible direct-sensing approaches.
Figure 46B:
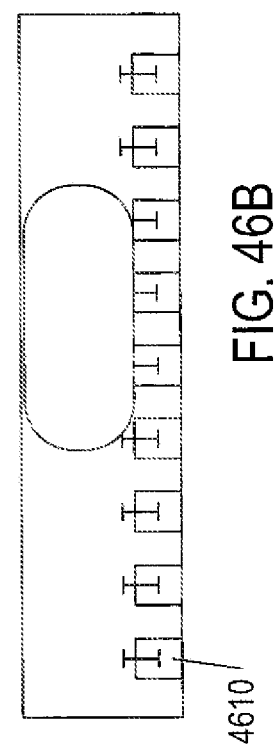

There are many different approaches to direct sensing of the position and velocity of a moving mass within an ORM. FIGS. 46A-B illustrate several possible direct-sensing approaches. As shown in FIG. 46A, the ORM may contain a series of apertures, such as aperture 4602, through which an illumination source shines light. Across the tubular channel containing the oscillation path, there is a photodiode sensor for each aperture, such as photodiode sensor 4604 corresponding to aperture 4602. The current position of the moving mass can be determined from the pattern of high and low photodiode-sensor outputs, shown above the ORM in FIG. 46A 4606. A series of captured photodiode-sensor outputs at consecutive points in time provides the information needed to accurately compute the velocity of the moving mass. As shown in FIG. 46B, another approach to computing the position and velocity of the moving mass involves a series of regularly spaced pressure or presence sensors, such as pressure or presence sensor 4610. Similar to the photodiode-sensor output, the output from the pressure or positions sensors provides a pattern in which the position of the moving mass can be recognized. Various types of Hall-effect electronic sensors, reflection-path sensors, and other types of sensors may be employed to directly determine the position and velocity of a moving mass within an ORM.

Although the present invention has been described in terms of particular embodiments, it is not intended that the invention be limited to these embodiments. Modifications will be apparent to those skilled in the art. For example, any of many different design and implementation parameters may be varied in order to provide different implementations of the ORM control logic discussed above, including choice of type of logic control, programming language, in the case of a processor-controlled controller, modular organization, data structures, control structures, logic circuitry, processor type, and many other such design and implementation parameters. Many different types of direct sensors that relatively directly determine the velocity and position of the oscillating mass within an ORM can be used in different types of ORMs. Various types of electromagnetic sensors that sense position, precious-metal brush-contact sensors, and Reed switches are examples of the many types of sensors that can be used to directly determine oscillating-mass position and velocity and induce direct, corresponding control of the ORM.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An oscillating resonant module comprising:
   an oscillation path, which represents a segment of a space curve, along which a point within a mass moves;
   a mass that is driven by energy supplied to the oscillating resonant module to oscillate back and forth along the oscillation path that represents a segment of a space curve;
   one or more sensors that output indications of the positions of the mass within the oscillation path at specific points in time; and
   a control component that
     receives control signals input to the oscillating resonant module,
     receives outputs from the one or more sensors, and
     controls oscillation of the mass to produce a vibration response according to the received control signals by generating, using one or more of the received sensor outputs, control outputs to an actuator that drives the mass to oscillate.

2. The oscillating resonant module of claim 1 wherein the one or more sensors are selected from among one or more:
   mechanical sensors;
   electromagnetic sensors; and
   optical sensors.

3. The oscillating resonant module of claim 1 wherein the control component determines, from the received sensor outputs, the velocity of the mass from the positions of the mass at two or more points in time.

4. The oscillating resonant module of claim 3 wherein the control outputs, output by the control component to the actuator, are computed as the output value of a function that takes, as input, the current position of the mass.

5. The oscillating resonant module of claim 3 wherein the control outputs, output by the control component to the actuator, are computed as the output value of a function that takes, as input, the current position of the mass and the current velocity of the mass.

6. The oscillating resonant module of claim 3 wherein the control outputs, output by the control component to the actuator, are computed from pre-computed values indexed by the current position of the mass and the current velocity of the mass.

7. The oscillating resonant module of claim 3 wherein the control outputs, output by the control component to the actuator, is are computed from pre-computed values indexed by the current position of the mass and the current velocity of the mass.

8. The oscillating resonant module of claim 1 mechanically coupled to one or more passive oscillating resonant modules to provide a wider range of vibration responses for the combination of the oscillating resonant module and the one or more passive oscillating resonant modules.

9. The oscillating resonant module of claim 8 wherein least one of the one or more sensors is a Hall-effect sensor.

10. A physical device that exhibits a vibration response when mechanical driven by one or more oscillating resonant modules included in the physical device, the physical device comprising:
   a controller; and
   the one or more oscillating resonant modules, each oscillating resonant including
      an oscillation path, which represents a segment of a space curve, along which a point within a mass moves;
      a mass that is driven by energy supplied to the oscillating resonant module to oscillate back and forth along the oscillation path that represents a segment of a space curve;
      one or more sensors that output indications of the positions of the mass within the oscillation path at specific points in time, and
      a control component that
         receives control signals input to the oscillating resonant module by the controller,
         receives outputs from the one or more sensors, and
         controls oscillation of the mass to produce a vibration response according to the received control signals by generating, using one or more of the received sensor outputs, control outputs to an actuator that drives the mass to oscillate.

11. The physical device of claim 10 further comprising:
   one or more vibration sensors;
   a stored characterization of the natural vibration frequencies of the physical device; and
   a controller that uses accesses the stored characterization of the natural vibration frequencies of the physical device to control the one or more oscillating resonant modules to drive the physical device to exhibit a predetermined vibration response.

12. The physical device of claim 10 wherein the characterization of the natural vibration frequencies of the physical device is determined by simultaneously sweeping the driving oscillations of the one or more oscillating resonant modules over driving-oscillation ranges and monitoring the physical device vibration response using output from the one or more vibration sensors to identify the maximum-amplitude frequencies.

13. The physical device of claim 12 wherein the characterization of the natural vibration frequencies of the physical device is determined periodically by the controller.

14. The physical device of claim 10 further including stored control information for the one or more oscillating resonant modules for each of one or more predetermined vibration responses that is based on the stored characterization of the natural vibration frequencies of the physical device.

15. The physical device of claim 10 wherein at least one of the each of the one or more oscillating resonant modules is mechanically coupled to one or more passive oscillating resonant modules to provide a wider range of vibration responses for the combination of the oscillating resonant module and the one or more passive oscillating resonant modules.

16. The physical device of claim 15 wherein the passive oscillating resonant modules are driven by the oscillating resonant module to which they are mechanically coupled.

17. The physical device of claim 1 further comprising:
   a controller, within the physical device, that
      receives control signals input to the physical device, and
      outputs control signals to one or more of the one or more oscillating resonant modules to controls the vibration response produced by the one or more oscillating resonant modules.

18. The physical device of claim 17 wherein, when the controller outputs control signals to a selected oscillating resonant module, other of the oscillating resonant modules passively respond to the vibration response produced by the selected oscillating resonant module.

19. The physical device of claim 17 wherein the controller passes at least a portion of the received control signals input to the physical device to one or more of the one or more oscillating resonant module.

20. The physical device of claim 17 wherein the controller controls the one or more oscillating resonant modules to each produce a vibration response, the vibration responses produced by the oscillating resonant modules together producing a resonant-frequency vibration mode in the physical device.

* * * * *